(12) United States Patent
Kuzuhara et al.

(10) Patent No.: US 7,199,848 B2
(45) Date of Patent: Apr. 3, 2007

(54) OPTICAL COMPENSATION SHEET AND LIQUID CRYSTAL DISPLAY

(75) Inventors: Noriyasu Kuzuhara, Hino (JP); Nobuo Kubo, Hino (JP); Hiroki Umeda, Hino (JP); Nobuyuki Takiyama, Hino (JP); Takatoshi Yajima, Hino (JP); Koji Tasaka, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/907,809

(22) Filed: Jul. 19, 2001

(65) Prior Publication Data

US 2002/0041352 A1    Apr. 11, 2002

(30) Foreign Application Priority Data

| Jul. 21, 2000 | (JP) | ............................. 2000-220538 |
| Sep. 13, 2000 | (JP) | ............................. 2000-277931 |
| Dec. 7, 2000 | (JP) | ............................. 2000-372741 |

(51) Int. Cl.
*G02F 1/1335* (2006.01)

(52) U.S. Cl. ........................ 349/117; 349/118; 349/126

(58) Field of Classification Search ................ 349/117, 349/118, 126
See application file for complete search history.

(56) References Cited

U.S. PATENT DOCUMENTS

| 5,249,071 A * | 9/1993 | Yoshimizu et al. ........... 359/63 |
| 5,491,001 A * | 2/1996 | Mazaki et al. ............... 427/162 |
| 5,568,290 A | 10/1996 | Nakamura |
| 5,583,679 A * | 12/1996 | Ito et al. ...................... 349/118 |
| 5,619,352 A | 4/1997 | Koch et al. |
| 5,867,240 A * | 2/1999 | Crowford et al. ........... 349/118 |
| 5,990,997 A | 11/1999 | Jones et al. |
| 6,081,312 A * | 6/2000 | Aminaka et al. ........... 349/118 |
| 6,261,649 B1 * | 7/2001 | Takagi et al. ................ 428/1.1 |
| 6,380,996 B1 * | 4/2002 | Yokayama et al. ......... 349/117 |
| 6,493,053 B1 * | 12/2002 | Miyachi et al. ............. 349/117 |
| 6,503,581 B1 * | 1/2003 | Shibue et al. ................ 428/1.1 |
| 6,970,218 B2 * | 11/2005 | Fukuda et al. .............. 349/114 |
| 2003/0067572 A1 * | 4/2003 | Umeda et al. .............. 349/117 |
| 2004/0151846 A1 * | 8/2004 | Aminaka et al. ............ 428/1.3 |
| 2004/0233363 A1 * | 11/2004 | Murayama et al. ......... 349/117 |
| 2004/0245499 A1 * | 12/2004 | Negoro et al. ......... 252/299.62 |

FOREIGN PATENT DOCUMENTS

EP        0 481 489 A2    4/1992

(Continued)

OTHER PUBLICATIONS

Y. Tomoya, "Liquid Crystal Display Device," Patent Abstracts of Japan for Publication No. 11024066 published Jan. 29, 1999.

*Primary Examiner*—Nathan J. Flynn
*Assistant Examiner*—Ahmed N. Sefer
(74) *Attorney, Agent, or Firm*—Finnegan, Henderson, Farabow, Garrett & Dunner, L.L.P.

(57) ABSTRACT

An optical compensation film used for a liquid crystal display comprising a support and an optically anisotropic layer is disclosed. The optically anisotropic layer is a layer on which orientation of the liquid crystalline compound is fixed and the support is an optically biaxial cellulose ester film. A polarizing plate used for a liquid crystal display and a liquid crystal display employing the optical compensation film are also disclosed.

28 Claims, 8 Drawing Sheets

FOREIGN PATENT DOCUMENTS

| | | |
|---|---|---|
| EP | 0 646 829 A1 | 4/1995 |
| EP | 0 864 906 A1 | 9/1998 |
| EP | 0 926 533 A2 | 6/1999 |
| EP | 0 928 984 A2 | 7/1999 |
| EP | 0 945 486 A1 | 9/1999 |
| EP | 1 143 271 A2 | 10/2001 |
| EP | 1143271 * | 10/2001 |
| JP | 11-287994 * | 10/1999 |
| JP | 2000-111914 * | 4/2000 |
| WO | WO 97/44702 | 11/1997 |

* cited by examiner

OPTICAL COMPENSATION SHEET AND LIQUID CRYSTAL DISPLAY

FIELD OF THE INVENTION

The present invention relates to an optically compensation sheet and a liquid crystal display.

BACKGROUND OF THE INVENTION

At present, personal computers have progressed to be compatible with multimedia, and even in laptop personal computers, color display have been commonly available. In said laptop personal computers, STN liquid crystal display and TFT liquid crystal displays are mainly employed. Further, in recent years, large-sized liquid crystal display has been developed and highly advanced improvements of viewing angle characteristics have been demanded. Therefore, an optical compensation film (also called an anisotropic body) having more advanced compensation properties than before is needed.

Since said STN liquid crystal display is comprised of a display element utilizing a birefringent mode, coloration occurs due to a phase difference formed in said liquid crystal. As a result, said display has a major problem in which it is impossible to carry out black-and-white display as well as color display. In order to overcome said problem, a D-STN system (a system utilizing a compensation liquid crystal cell) has been attempted. However, said system runs counter to the time's demand in terms of "thin and light", featuring the liquid display. In addition, problems have occurred in which high accuracy is demanded for the production of the compensation liquid crystal cell, and the production yield is low.

In order to solve these problems, various types of proposals have been offered. For example, Japanese Patent Publication Open to Public Inspection No. 63-149624 proposes an F-STN system employing a stretched resinous film, and Japanese Patent Publication Open to Public Inspection Nos. 3-87720 and 4-333019 propose a method to carry out color compensation employing a film in which a liquid crystalline polymer is subjected to twisted orientation for the purpose of a decrease in the weight as well as wall thickness of the D-STN system while maintaining its compensation performance. The phase difference compensating plate of this liquid crystal display is comprised of a transparent substrate having thereon an orientation layer and thereon a liquid crystal polymer layer on which a twisted crystal polymer is fixed.

Furthermore, recently, Japanese Patent Publication Open to Public Inspection No. 7-191217 discloses an attempt in which as the compensation of the viewing angle of a TFT-TN display, a discotic liquid crystal film is arranged on the upper and the lower surfaces of a liquid crystal cell, and the characteristics of the viewing angle of said liquid crystal cell is thereby improved. Said compensation film for a TN type liquid crystal display is comprised of an optically isotropic layer in which liquid crystalline compounds are oriented on a resinous film which is nearly optically isotropic, in the same manner as the phase difference compensating plate of the liquid crystal display described in aforementioned Japanese Patent Publication Open to Public Inspection Nos. 3-87720 and 4-333019.

The following three methods as described below have been proposed as an optically compensation sheet for obtaining a wide viewing angle of a liquid crystal display.

(1) a method providing a discotic liquid crystalline compound, which is a negative uniaxial compound, on a support.

(2) a method providing on a support a nematic polymeric liquid crystalline compound with a positive optical anisotropy, which is subjected to hybrid orientation in which the pretilt angle of the liquid crystal molecules varies in the thickness direction.

(3) a method providing on a support two layers containing a nematic liquid crystalline compound with a positive optical anisotropy, in which the orientation direction of the layers crosses each other at approximately 90 degrees, so that an optical property approximate to a negative uniaxial optical property is obtained.

However, the above methods have the following problems.

Method (1) shows a defect specific to a discotic liquid crystalline compound in that, in a TN mode liquid crystal display panel employing the discotic liquid crystalline compound, the displayed image appears yellowish, when viewing the panel obliquely.

In the method (2) a temperature developing a liquid crystal is high and orientation cannot be fixed on an isotropic transparent support such as TAC (cellulose triacetate), and requires additional processing, in which a liquid crystalline compound is oriented and fixed on a first support, and transferred onto a second support such as TAC. This processing is more complex, resulting in lowering of productivity.

There is disclosed in, for example, Japanese Patent O.P.I. Publication No. 8-15681, one example of an optically anisotropic layer employing a positive uniaxial low molecular weight liquid crystalline compound according to method (3). The example is an optically anisotropic layer comprised of four layers which consist of a first oriented layer having an orientation ability, a rod-shaped, positive uniaxial low molecular weight liquid crystalline compound layer, in which the liquid crystalline compound is oriented and fixed, provided on the first oriented layer, a second oriented layer having an orientation ability provided on the rod-shaped, positive uniaxial low molecular weight liquid crystalline compound layer, and a rod-shaped, positive uniaxial low molecular weight liquid crystalline compound layer, in which the liquid crystalline compound is oriented and fixed, provided on the second oriented layer. In this example, a property approximate to a disc-shaped compound can be obtained, for example, by arranging the two rod-shaped, liquid crystalline compound layers so that the orientation directions in the plane of the two layers cross each other at 90 degrees.

Accordingly, method (3) above is extremely advantageous in usage in a liquid crystal television giving priority to color reproduction, since there is no problem of yellowing occurring in the use of a discotic liquid crystalline compound.

Although the use of the discotic liquid crystalline compound requires only one layer, however, the method requires two liquid crystalline compound layers, resulting in lowering of efficiency.

However, the above three methods have, in common, a fundamental problem. That is, in order to obtain optical compensation ability, these methods require an optical compensation sheet to be provided on both sides of, for example, a liquid crystal cell. This means that even the method for employing an optical compensation sheet, which is convenient for improving viewing angle, results in a cost increase. In these methods, the use of one optical compensation sheet destroys symmetry, and results in asymmetry of the viewing angle. For example, when the optical compensation sheet, the rubbing axis of which is rotated 45 degrees, is arranged, symmetry may be improved but the viewing angle property is not improved. There have been no proposals in which the use of only one optical compensation sheet improves the viewing angle property to the same degree as or more than two optical compensation sheets. Further, examples of optical compensation film, which result in improvement of the viewing angle characteristics equal to IPS (lateral electric field mode) as well as VA (perpendicular orientation mode), have not been obtained.

PROBLEMS TO BE SOLVED BY THE INVENTION

An objective of the present invention is to provide an optical compensation film which readily improves viewing angle characteristics of TN type LCD such as TN-TFT, that is, image contrast, coloring, and reversal phenomena of light-and-shadow, which are obliquely viewed, and further to provide a polarized plate and a liquid crystal display apparatus with marked improvement of the viewing angle under a simple constitution, while employing said optical compensation film.

MEANS TO SOLVE THE PROBLEMS

The aforementioned objective was accomplished utilizing items 1 through 66 described below.

1. An optical compensation film comprising an optically biaxial cellulose ester film having thereon a layer, comprising a liquid crystalline compound, which is modified to an optically anisotropic layer upon fixing the orientation of said liquid crystalline compound.
2. The optical compensation film, described in 1 above, wherein a liquid crystalline compound is rod-shaped, and the average of the angle between the direction resulting in the maximum refractive index of said liquid crystalline compound and the surface of said cellulose ester film exceeds 0 degree but is less than 80 degrees.
3. The optical compensation film, described in 2 above, wherein the refractive index of said rod-shaped liquid crystalline compound varies continuously or stepwise while the angle between the direction resulting in the maximum refractive index of said rod-shaped liquid crystalline compound and the surface of said cellulose ester film varies from 0 to 90 degrees.
4. The optical compensation film, described in 2 above, wherein the angle between the direction resulting in the maximum refractive index of said rod-shaped liquid crystalline compound and the surface of said cellulose ester film is basically 0 degree.
5. The optical compensation film, described in 2 above, wherein the angle between the direction resulting in the maximum refractive index of said rod-shaped liquid crystalline compound and the surface of said cellulose ester film is basically 90 degrees.
6. The optical compensation film, described in any one of 1 through 5, wherein a projection direction within the surface of a cellulose ester film in the direction resulting in the maximum refractive index of a rod-shaped liquid crystalline compound is orthogonal to the direction resulting in the maximum refractive index of said cellulose ester film.
7. The optical compensation film, described in any one of 1 through 5, wherein the projection direction within the surface of the film in the direction resulting in the maximum refractive index of a rod-shaped liquid crystalline compound is equal to the direction resulting in the maximum refractive index of said cellulose ester film.
8. The optical compensation film, described in any one of 1 through 5, wherein projection direction A within the surface of the cellulose ester film which comprises at least two optically anisotropic layers A and B, in which said optically anisotropic layer A comprises rod-shaped liquid crystalline compound A, and optically anisotropic layer B comprises rod-shaped liquid crystalline compound B, and which is in the direction resulting in the maximum refractive index of said liquid crystalline compound B is orthogonal to projection direction B within the surface of the direction resulting in the maximum refractive index of said liquid crystalline compound B, and any one angle on said projection directions A or B is equal to the direction resulting in the maximum refractive index of said cellulose ester film.
9. The optical compensation film, described in 1 through 8 above, wherein said rod-shaped liquid crystalline compound optically exhibits positive uniaxial properties and the plane retardation value of the optically anisotropic layer is in the range of from 10 to 300 nm and the retardation value in the thickness direction is in the range of 15 to 300 nm.
10. The optical compensation film, described in 1 through 9 above, wherein the retardation value within the surface of an optically biaxial cellulose ester film is in the range of from 10 to 300 nm, and the retardation value in the thickness direction is in the range of from 15 to 300 nm.
11. The optical compensation film, described in 1 through 10 above, comprising at least one orientation layer and at least one dissolving-out blocking layer between the optically biaxial cellulose film and the optically anisotropic layer.
12. The optical compensation film, described in 11 above, wherein said dissolving-out blocking layer comprises a water-soluble polymer.
13. The optical compensation film, described in 10 or 11 above, wherein said orientation layer is an optical orientation layer.
14. The optical compensation film, described in any one of 1 through 13, wherein said optically biaxial cellulose ester film is prepared employing an extrusion casting method and is prepared so that the refractive index in the width direction is maximized during extrusion casting.
15. In an optical compensation film comprising a transparent support having thereon an optically anisotropic layer in which the orientation of a liquid crystalline compound is fixed, an optical compensation film wherein the retardation value $R_o$ in the plane direction of said transparent support is from 41 to 95 nm, the radiation ratio $R_t/R_o$ of the retardation value $R_t$ in the thickness direction to said retardation value $R_o$ is in the range of from 0.8 to 1.4, and nx>ny>nz is held.

Herein, $R_o$ and $R_t$ each represent the retardation values of said transparent support, which are defined by the aforementioned formulas (a) and (b).

16. In an optical compensation film comprising a transparent support having thereon a rubbed orientation layer as well as an optically anisotropic layer which is adjacent to said orientation layer, and in which a liquid crystalline compound is fixed, an optical compensation film wherein said retardation value $R_o$ is from 41 to 95 nm, said retardation ratio $R_t/R_o$ is in the rang of from 0.8 to 1.4, and nx>ny>nz is held.

17. The optical compensation film, described in 15 or 16 above, wherein a transparent support comprised of said optical compensation film is prepared in such a manner that a web is formed on a support by casting a resinous solution comprised of a solvent, said web is peeled from said support in the state in which said solvent remains in said web, and is stretched while being dried, and the refractive index of said transparent support in the casting direction is basically equal to ny, and the refractive index of said transparent support in the plane direction (width direction) perpendicular to said casting direction is basically equal to nx.

18. The optical compensation film, described in 15 or 16 above, wherein a transparent support comprised of said optical compensation film is prepared in such a manner that a web is formed on a support by casting a resinous solution comprised of a solvent, said web is peeled from said support in the state in which said solvent remains in said web, and is stretched during drying, and the refractive index of said transparent support in the casting direction is basically equal to nx, and the refractive index of said transparent support in the plane direction (width direction) perpendicular to said casting direction is basically equal to ny.

19. The optical compensation film, described in 15 or 16 above, wherein a transparent support comprised of said optical compensation film is prepared in such a manner that a web is formed by casting a resinous solution onto a support, said web is peeled from said support, dried, and subsequently stretched under the temperature condition of at least 110° C., and further the refractive index of said transparent support in the casting direction is basically equal to ny, and the refractive index of said transparent support in the plane direction (width direction) perpendicular to said casting direction is basically equal to nx.

20. The optical compensation film, described in 15 or 16 above, wherein a transparent support comprised of said optical compensation film is prepared in such a manner that a web is formed by casting a resinous solution onto a support, said web is separated from said support, dried, and subsequently stretched under the temperature condition of at least 110° C., and the refractive index of said transparent support in the casting direction is basically equal to nx, and the refractive index of said transparent support in the plane direction (width direction) perpendicular to said casting direction is basically equal to ny.

21. The optical compensation film, described in 15 or 16 above, wherein a transparent support comprised of said optical compensation film is prepared in such a manner that a web is formed by casting a resinous solution onto a support, said web is separated from said support, dried, and subsequently, stretched while being again brought into contact with a solvent, and the refractive index of said transparent support in the casting direction is basically equal to ny, and the refractive index of said transparent support in the plane direction (width direction) perpendicular to said casting direction is basically equal to nx.

22. The optical compensation film, described in 15 or 16 above, wherein a transparent support comprised of said optical compensation film is prepared in such a manner that a web is formed by casting a resinous solution onto a support, said web is peeled from said support, dried, and subsequently stretched while being again brought into contact with a solvent, and the refractive index of said transparent support in the casting direction is basically equal to nx, and the refractive index of said transparent support in the plane direction (width direction) perpendicular to said casting direction is basically equal to ny.

23. The optical compensation film described, in any one of 15 through 22 above, wherein a transparent support comprised of said optical compensation film is a cellulose ester film support prepared employing a cellulose ester resin.

24. The optical compensation film, described in 23 above, wherein the degree of acetyl group substitution of said cellulose ester resin ranges from 2.50 to 2.86.

25. The optical compensation film, described in 23 above, wherein at least two cellulose ester resins having a degree of acetyl group substitution of from 2.40 to 3.00 so that the average degree of acetyl group substitution after blending is from 2.50 to 2.86.

26. The optical compensation film described in 23 above wherein cellulose ester resin "A" having a degree of acetyl group substitution of from 2.60 to 3.00 and cellulose ester resin "B" having a degree of acetyl group substitution of from 2.40 to 2.60 so that the average degree of acetyl group substitution after blending ranges from 2.50 to 2.86.

27. The optical compensation film, described in 23 above, wherein, when the degree of acetyl group substitution of said cellulose ester resin is represented by "A" and the degree of propionyl substitution is represent by "B", said formulas (1) and (2) are satisfied.

28. The optical compensation film, described in 23 above, wherein, when the degree of acetyl group substitution of said cellulose ester resin is represented by "A" and the degree of propionyl group substitution is represent by "B", said formulas (3) and (4) are satisfied.

29. The optical compensation film, described in any one of 15 to 28 above, wherein said resin comprised of said transparent support comprises a plasticizer in an amount of from 2 to 15 percent by weight and a UV absorber in an amount of from 0.01 to 3 percent by weight.

30. The optical compensation film, described in 29 above, wherein said UV absorber is either a benzotriazole derivative or a benzophenone derivative.

31. The optical compensation film, described in any one of 15 through 30 above, wherein said liquid crystalline compound is a polymer liquid crystal exhibiting positive birefringent properties, and after being subjected to orientation employing a heat treatment at a temperature higher than the glass transition temperature of said liquid crystalline compound, the temperature of said liquid crystalline compound is regulated to lower than said glass transition temperature so that the orientation of said liquid crystalline compound is fixed.

32. The optical compensation film, described in any one of 15 through 30 above, wherein said liquid crystalline compound is a polymerizable low molecular weight liquid crystal exhibiting positive birefringent properties, and after carrying out an orientation treatment at a temperature higher than the liquid crystal transition temperature of said liquid crystalline compound, the orientation of said liquid crystalline compound is fixed under the exposure of an actinic radiation beam.

33. The optical compensation film, described in 32 above, wherein said actinic radiation beam is ultraviolet rays, and said liquid crystalline compound is fixed while being employed together with an ultraviolet initiation agent.

34. The optical compensation film, described in any one of 15 through 33 above, wherein an optically anisotropic layer is prepared in such a manner that a solution comprising said liquid crystalline compound and said organic solvent is prepared, and said solution is coated and subsequently dried.

35. The optical compensation film, described in any one of 15 through 34 above, wherein the average inclination angle of said optically anisotropic layer to the surface of said cellulose ester film is from 15 to 50 degrees.

36. The optical compensation film, described in 35 above, wherein the inclination angle of the liquid crystalline compound in said optically anisotropic layer to the thickness direction increases or decreases from the side of said orientation layer.

37. The optical compensation film, described in any one of 13 through 34 above, wherein the direction of projecting the direction of the maximum refractive index of said optically anisotropic layer onto the surface of said cellulose ester film is basically equal to ny direction.

38. The optical compensation film, described in any one of 14 through 35 above, wherein at least one dissolving-out blocking layer is disposed between said cellulose ester film support and said orientation layer.

39. The optical compensation film, described in 36 above, wherein a plasma treatment or an organic acid containing polymer is applied onto said transparent support, and subsequently said dissolving-out blocking layer is applied onto the resulting support, employing a coating composition comprising a nonionic polymer which is dissolved in a mixed solvent containing water, in an amount of 30 percent by weight, and at least one organic solvent.

40. The optical compensation film, described in 36 above, wherein said dissolving-out blocking layer is comprised of an actinic radiation hardening resin, and said hardening resin is hardened by the exposure of said radiation.

41. A polarizing plate which is prepared by adhering the optical compensating film described in any one of 1 through 40 above.

42. The optical compensation film, describes in any one of 17, 19, and 21 above, wherein said film is prepared in the form of a long-length roll.

43. The optical compensation film, describes in 42 above, wherein the transparent support is a cellulose ester film support prepared by employing a cellulose ester resin.

44. The optical compensation film, described in 43 above, wherein the degree of acetyl group substitution of said cellulose ester resin ranges from 2.50 to 2.86.

45. The optical compensation film, described in 43 above, wherein at least two cellulose ester resins, having a degree of acetyl group substitution of from 2.40 to 3.00, are blended so that the average degree of acetyl group substitution after blending ranges from 2.50 to 2.86.

46. The optical compensation film, described in 43 above, wherein cellulose ester resin "A" having a degree of acetyl group substitution of from 2.60 to 3.00 and cellulose ester resin "B" having a degree of acetyl group substitution of from 2.40 to 2.60 are blended so that the average degree of acetyl group substitution after blending ranges from 2.50 to 2.86.

47. The optical compensation film, described in 43 above, wherein when the degree of acetyl group substitution of said cellulose ester resin is represented by "A" and the degree of propionyl group substitution is represent by "B", said formulas (1) and (2) are satisfied.

48. The optical compensation film, described in 43 above, wherein when the degree of acetyl group substitution of said cellulose ester resin is represented by "A" and the degree of propionyl group substitution is represent by "B", said formulas (3) and (4) are satisfied.

49. The optical compensation film, described in any one of 42 through 48 above, wherein said resin comprised of said transparent support comprises a plasticizer in an amount of from 2 to 15 percent by weight and a UV absorber in an amount of from 0.01 to 3 percent by weight.

50. The optical compensation film, described in 49 above, wherein said UV absorber is either a benzotriazole derivative or a benzophenone derivative.

51. The optical compensation film, described in any one of 42 through 50 above, wherein said liquid crystalline compound is a polymer liquid crystal exhibiting positive birefringent properties, and after being subjected to orientation employing a heat treatment at a temperature higher than the glass transition temperature of said liquid crystalline compound, the temperature of said liquid crystalline compound is regulated to no higher than said glass transition temperature so that the orientation of said liquid crystalline compound is fixed.

52. The optical compensation film, described in any one of 42 through 51 above, wherein said liquid crystalline compound is a polymerizable low molecular weight liquid crystal exhibiting positive birefringent properties, and after carrying out an orientation treatment at a temperature higher than the liquid crystal transition temperature of said liquid crystalline compound, the orientation of said liquid crystalline compound is fixed under the exposure of actinic radiation.

53. The optical compensation film, described in 52 above, wherein said actinic radiation is ultraviolet rays, and said liquid crystalline compound is fixed while being employed together with an ultraviolet initiation agent.

54. The optical compensation film, described in any one of 40 and 42 through 53 above, wherein an optically anisotropic layer is prepared in such a manner that a solution comprising said liquid crystalline compound and said organic solvent is prepared, and said solution is coated and subsequently dried.

55. The optical compensation film, described in any one of 40 and 42 through 54 above, wherein the average inclination angle of said optically anisotropic layer to the surface of said cellulose ester film is from 15 to 50 degrees.

56. The optical compensation film, described in 55 above, wherein the inclination of the liquid crystalline compound in said optically anisotropic layer to the thickness direction increases or decreases from the side of said orientation layer.

57. The optical compensation film, described in any one of 40 and 42 through 56 above, wherein the direction of projecting the direction of the maximum refractive index of said optically anisotropic layer onto the surface of said cellulose ester film is basically equal to ny direction.

58. The optical compensation film, described in any one of 40 and 42 through 57 above, wherein at least one dissolving-out blocking layer is disposed between said cellulose ester film support and said orientation layer.

59. The optical compensation film, described in 58 above, wherein a plasma treatment or an organic acid containing polymer is applied onto said transparent support, and subsequently, said dissolving-out blocking layer is applied onto the resulting support, employing a coating composition comprising a nonionic polymer which is dissolved in a mixed solvent containing water, in an amount of 30 percent by weight, and at least one organic solvent.

60. The optical compensation film, described in 58 above, wherein said dissolving-out blocking layer is comprised of an actinic radiation beam hardening resin, and said hardening resin is hardened by its exposure.

61. A polarizing plate which is prepared by adhering the optical compensating film described in any one of 42 through 60 above.

62. The polarizing plate, described in 61 above, wherein a liquid crystalline compound orientation fixed layer (also called an optically anisotropic layer) is disposed between a transparent support and a polarizing plate, and said transparent support and said polarizing plate are adhered to each other.

63. A liquid crystal display apparatus comprising the polarizing plate described in any one of 41, 61, and 62 above.

64. A twisted magnetic type liquid crystal display apparatus wherein a liquid crystal display apparatus is comprised of a driving liquid crystal cell comprised of a transparent substrate equipped with a pair of electrodes and a magnetic liquid crystal; said liquid crystal display apparatus is a twisted magnetic type liquid crystal apparatus in which said transparent substrate is provided with an upper polarizing plate and a lower polarizing plate, and at least one optical compensation film described in any one of 15 through 40 above is between said substrate and either the upper or lower polarizing plate, or between said transparent substrate and either the upper or lower polarizing plate.

65. The twisted magnetic type liquid crystal display apparatus, described in 64 above, wherein said one optical compensation film is pasted to the upper side and also to the lower side of a liquid cell in such direction that the surface of said cellulose ester film support comes to contact with the substrate nearest said liquid cell, and also in such direction that the direction of the maximum diffraction index of the cellulose ester film support of said optical compensation film is basically orthogonal to the rubbing direction of the substrate nearest said liquid crystal cell.

66. The twisted magnetic type liquid crystal display apparatus, described in 64 above, wherein the orientation of the liquid crystalline compound in an optically anisotropic layer is fixed, and the average tilt angle of the formed optically anisotropic molecule and the tilt angle of the liquid crystal molecule in the liquid crystal cell nearest the transparent substrate of said liquid cell satisfy Condition (1) described below.

Condition (1): when a cross-section is provided which comprises the orientation direction of said optically anisotropic molecule and the rubbing direction of said transparent substrate, and subsequently, each of said optically anisotropic molecules on said cross-section and said liquid crystal molecule is observed, the average tilt angle of said optically anisotropic molecule exceeds 0 degree but is less than 80 degrees; the tilt angle of said liquid crystal molecule is in the range of from 0 to 90 degrees; and further, the angle between line "A", passing through said optically anisotropic molecule, and line "B", passing through said liquid crystal molecule, exceeds 0 degree, but is less than 170 degrees.

BRIEF DESCRIPTION OF THE DRAWINGS

FIGS. 5(a) and 4(b) are cross-sectional views of the optical compensation film installed in a liquid crystal panel.

Figure 1:
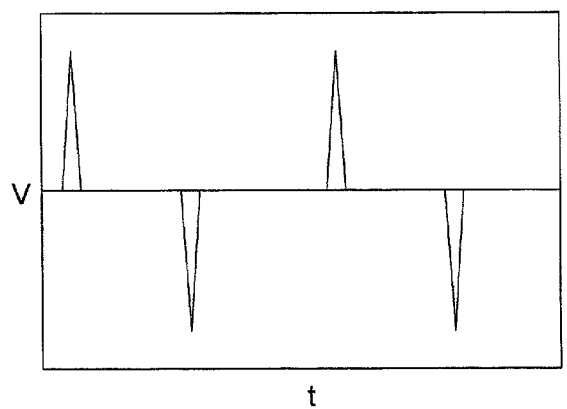
FIG. 1 shows a pulse shape of voltage applied to an electrode which can be applied to an atmospheric pressure plasma discharge treatment in the present invention.

The present invention will now be detailed.

Optical compensation films will be described.

When conventional optical compensating film is employed, the present situation is that a commercially viable optical compensation function is obtained only by arranging said optical compensation film on both sides of said liquid crystal cell. By contrast, the inventors discovered that to their surprise, by utilizing an optical compensation film having the constitution, a markedly excellent optical compensation function was obtained by arranging only one optical compensation film between the liquid crystal cell and the polarizing plate.

It was verified that the optical compensation film of the present invention exhibited excellent optical compensation functions such as high contrast when viewed from an oblique direction, and also exhibited an excellent so-called wide viewing angle, as well as no coloration in the image area, narrowing the reversal area, and the like.

As noted before, one optical compensation film of the present invention per liquid cell exhibits sufficient optical compensation function. Accordingly, when liquid crystal display apparatuses are prepared, it is possible to reduce the cost for said optical compensation film by a half compared to cases in which conventional optical compensation film is used.

Further, commonly in the preparation of a polarizing plate, the surface treated state is different between the observer' surface side and the back surface of the liquid cell. For example, a special polarizing plate is used the surface of which is subjected to AG (antiglare) treatment and the like. In this case, a polarizing plate surface of which becomes different from the back surface. As a result, it has been essential that the optical compensation film be adhered onto each of the surfaces of said polarizing plate. Further, when problems occur in the process of adhering the optical compensation film onto the surface-treated polarizing plate, it is essential to discard said surface treated polarizing plates, at an inevitable increase in cost.

Further, it is possible to prepare an optical compensation film employing one sheet of cellulose ester film. This results in great practical advantages that it is possible to prevent a decrease in light transmittance due to said optical compensation film by approximately half.

The present invention makes it possible to provide an optical compensation film having a practically sufficient optical compensation function by the use of only one sheet of said film and a polarizing plate, as well as a liquid crystal display apparatus employing said optical compensation film, and more specifically, minimizes contrast variation due to the viewing angle which is specific to the twisted nematic (TN) type liquid crystal, and specifically minimizes the viewing angle dependency of the display of an active matrix type TN type liquid crystal display apparatus, specifically employed as a full color display.

An optically biaxial cellulose ester film support associated with the present invention will now be described.

The optical compensation film of the present invention employs an optically biaxial cellulose ester as the support. It is possible to obtain such optical characteristics by providing tension in a definite direction during the process in which cellulose ester is commonly cast. For example, it is particularly effective to carry out operations such as stretching and the like under conditions in which residual solvents still exist after casting a cellulose ester film.

Preferably employed as cellulose ester is cellulose triacetate. Furthermore, in order to obtain optical compensation performance exceeding the specified level, it is extremely effective to employ lower fatty acid cellulose ester having specified substituents, namely an acetyl group as well as a propionyl group.

Proffered is cellulose ester which is employed to prepare cellulose ester film associated with the present invention has an acyl group having from 2 to 4 carbon atoms as the substituent, and cellulose ester, which simultaneously satisfies the aforementioned formulas (1) and (2).

Further, preferably employed is the cellulose ester film, which simultaneously satisfied the aforementioned formulas (3) and (4).

These acyl groups may evenly be substituted to the 2-position, the 3-position and the 6-position of glucose units, or substitution may be carried out so as to form a distribution in which, for example, the 6-position has a higher frequency, or the like.

The degree of substitution, as described herein, refers to the percentage of the amount of so-called combined fatty acids, and the value which is calculated based on the measurement of the degree of acetylation and calculation thereof in ASTM-D817 (the Test Method of Cellulose Acetate, and the like). It is possible to determine the degree of acyl substitution, employing the ASTM-D817-96 method.

By regulating the degree of substitution of an acetyl group and an acyl group having 3 or 4 carbon atoms in said range, it is possible to obtain a cellulose ester film support which exhibits characteristics in which the phase difference increases as the wavelength increases, and which is disposed with the desired moisture content as well as water barrier properties.

The average degree of acetyl group substitution is particularly preferred to be less than 2.0 due to minimization of the fluctuation in phase difference during stretching.

Further, from the viewpoint of obtaining an optical compensation film which exhibits excellent mechanical strength, the viscosity average degree of polymerization (the degree of polymerization) of the cellulose ester film, employed in the present invention, is preferably from 200 to 700, and is more preferably from 250 to 500.

It is possible to obtain said viscosity average degree of polymerization (DP) employing the method described below.

<<Measurement of Viscosity Average Degree of Polymerization (DP)>>

Dissolved in 100 ml of a solvent mixture consisting of methylene chloride and ethanol (in a ratio of 9:1 by weight) was 0.2 g of absolutely dried cellulose ester. The falling time in second of the resultant solution was determined at 25° C., employing an Ostwald Viscosimeter, and the degree of polymerization was obtained employing the formula described below.

$$\eta rel\ T/Ts[\eta]=(ln\eta rel)/C\ DP=[\eta]/Km$$

wherein T is the falling time in seconds of a measured sample, Ts is the falling time in seconds of the solvent, C is the concentration of cellulose ester (in g/liter), and $Km=b\ 6\times10^{-4}$.

From the viewpoint to more preferably obtain the desired effects to widen the viewing angle in the cellulose ester film according to the present invention, it is preferable that the relationship defined in Formula (1) be held.

$$(nx+ny)/2-nz>0 \qquad \text{Formula (1)}$$

Further, when the biaxial cellulose ester support, employed in the present invention, is optically biaxial, effects to improve the viewing angle are noted. It is possible to specify appropriate conditions utilizing retardation value $R_t$ in the thickness direction and retardation value $R_o$ in the plane. By controlling these values, it is possible to markedly improve the desired viewing angle widening effects. Employed as specific control methods may be a stretching method described below and the like.

Retardation value Rt in the thickness direction, which is defined by Formula (II) described below, is preferably from 15 to 300 nm, and is more preferably from 60 to 250 nm.

$$[(nx+ny)/2-nz]\times d \qquad \text{Formula (II)}$$

wherein nx and ny each represent the refractive index in the x direction and the y direction in the plane of said cellulose ester film, nz represents the refractive index in the y direction, and d represents the thickness (in nm) of said film.

Further, retardation value $R_o$ in the plane direction is expressed by the formula described below.

$$R_o=(nx-ny)\times d$$

wherein d represents the thickness (in nm) of said film.

In the present invention, $R_o$ is preferably in the range of from 10 to 300 nm, and is more preferably in the range of from 25 to 150 nm. $R_o$ is preferably in the range of from 25 to 95 nm in particular. The ratio of Ro/Rt is preferably from 0.8 to 4.0. There are two occasions in the preferable ratio of Ro/Rt. One is from 0.8 to 1.4, and the other is 1.4 to 4.0. It is more preferable from 2.0 to 3.5 in the latter case.

Said retardation values $R_t$ and $R_o$ are obtained as follows. Three-dimensional refractive indices, nx, ny, and nz, are determined at a wavelength of 590 nm under an ambience of 23° C. and 55 percent relative humidity employing an automatic birefringence meter KOBRA-21ADH (manufactured by Oji Keisokukiki Co., Ltd.). Said retardation values are calculated utilizing resultant nx, ny, and nz.

The light transmittance of the optically biaxial cellulose ester film according to the present invention is preferably at least 80 percent. Further, the thickness of the cellulose ester film support according to the present invention is preferably from 30 to 150 nm.

Employing acid anhydrides and acid chlorides as the acylating agents, it is possible to synthesize the mixed fatty acid ester of cellulose used in the present invention. When said acylating agents are acid anhydrides, organic acids (for example, acetic acid) and methylene chloride are used as the reaction solvents. When the acylating agents are acid chlorides, basic compounds are used as the catalysts. In the most common industrial synthetic method, cellulose undergoes esterification employing mixed organic acid component, comprising organic acids (acetic acid and propionic acid) or acid anhydrides thereof (acetic anhydride and propionic anhydride) which correspond to an acetyl group and a propionyl group. The used amount of the acetylating agent and propionylating agent is regulated so that the degree of substitution of the synthesized ester falls in the range described above. The used amount of reaction solvents is preferably from 100 to 1,000 weight parts with respect to 100 weight parts of cellulose, and is more preferably from 200 to 600 weight parts. The used amount of catalysts is preferably from 0.1 to 20 weight parts with respect to 100 weight parts of cellulose, and is more preferably from 0.4 to 10 weight parts.

The reaction temperature is preferably from 10 to 120° C., and is more preferably from 20 to 80° C. Further, other acylating agents (for example, a butylating agent) and etherifying agents may be employed in combination. Still further, after the completion of the acylating reaction, if desired, the degree of substitution may be regulated employing hydrolysis (saponification). After the completion of the reaction, a mixed fatty acid ester of cellulose (cellulose acetate propionate) is obtained by collecting a reaction mixture employing common methods such as precipitation, washing the resultant precipitate and subsequently drying it.

Employed individually or in combination as the fatty acid cellulose ester of the present invention are fatty acid ester synthesized employing cotton linters and fatty acid ester synthesized from wood pulp. Cellulose ester synthesized employing cotton linters is preferably employed at a larger ratio, because it is more readily peeled from a belt or drum, and thus enhances productivity. When the content of cellulose ester synthesized employing cotton linters is at least 60 percent, the peeling properties are markedly improved. Therefore, the content is preferably at least 60 percent, is more preferably at least 85 percent, and is most preferably 100 percent.

The cellulose ester employed in the invention, which is acylated by acetyl group and acyl group having 3 or 5 carbon atoms, is called as mixed fatty acid ester of cellulose.

Example of acyl group having 3 or 5 carbon atoms includes propionyl group and butyryl group. Propionyl group or n-butyryl group is preferable, and particularly propionyl group is preferable in view of mechanical strength when it is prepared in a film form and easy handling in dissolving process.

Listed as solvents which dissolve the fatty acid cellulose ester of the present invention and form a dope may be methylene chloride, methyl acetate, ethyl acetate, amyl acetate, acetone, tetrahydrofuran, 1,3-dioxolan, 1,4-dioxolan, cyclohexanone, 2,2,2-trifluoroethanol, 2,2,3,3-tetrafluoro-1-propanol, 1,3-difluoro-2-propanol, and the like.

Incidentally, chlorine based solvents such as methylene chloride may be employed without causing any problem from the technical aspect. Methyl acetate, ethyl acetate, acetone, and the like, are preferable since they cause the least environmental problem. Specifically, the content of methyl acetate is preferably at least 50 percent by weight with respect to the total organic solvents. Acetone is preferably employed in an amount of 5 to 30 percent by weight with respect to the total organic solvents, together with methyl acetate, because it makes it possible to decrease the dope viscosity.

In the present invention, containing of as little as possible chlorine based solvents means that the content of the chlorine based solvents is no more than 10 percent with respect to the total organic solvents, is more preferably no more then 5 percent, and is most preferably 0 percent.

In addition to the organic solvents described above, alcohols having from 1 to 30 carbon atoms are preferably incorporated into the fatty acid cellulose ester dope of the present invention in an amount of 1 to 30 percent. When alcohols are incorporated, after casting the dope onto a support, solvents start to evaporate and the web (a dope layer formed by casting a dope on a casting support is designated as the web) is gelled and the web is strengthened. Thus it is possible to more readily peel the web from the support. Further, it is possible to obtain effects which accelerate the dissolution of fatty acid cellulose ester. Listed as alcohols having from 1 to 4 carbon atoms are methanol, ethanol, n-propanol, iso-propanol, n-butanol, sec-butanol, and tert-butanol. Of these, ethanol is preferred, based on the stability of the resulting dope, its boiling point, drying properties, non-toxicity, and the like.

The solid portion concentration in a dope is commonly, and preferably, between 10 and 40 percent. From the viewpoint of obtaining excellent flatness of a film, the viscosity of a dope is preferably controlled to be in the range of 10 to 50 Pa-sec.

The dope, which has been prepared as described above, is filtered employing a filter media, defoamed, and subsequently conveyed to the next process, employing a pump.

Plasticizers, matting agents, UV absorbers, antioxidants, dyes, and the like may also be incorporated into said dope.

Fatty acid ester cellulose, having an acetyl group as well as a propionyl group employed in the present invention, exhibits effects of a plasticizer. As a result, sufficient film properties are obtained without the addition of plasticizer, or at most addition in small amounts. However, plasticizers may be added for other purposes. For example, for the purpose to enhance the moisture resistance of film, added may be alkyl phthalyl alkyl glycolates, phosphoric acid esters, carboxylic acid esters, phthalic acid ester, fatty acid ester, citric acid ester and the like.

Listed as alkyl phthalyl alkyl glycolates are, for example, methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, methyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, octyl phthalyl ethyl glycolate, and the like.

Listed as phosphoric acid esters may be, for example, triphenyl phosphate, tricresyl phosphate, cresyl diphenyl phosphate, phenyl diphenyl phosphate, octyl diphenyl phosphate, trioctyl phosphate, tributyl phosphate, and the like.

Carboxylic acid esters include, for example, phthalic acid esters and citric acid esters. Listed as said phthalic acid esters may be dimethyl phthalate, diethyl phthalate, dimethoxyethyl phthalate, dimethyl phthalate, dioctyl phthalate, dibutyl phthalate, di-2-ethyl hexyl phthalate, and the like, while listed as said citric acid esters may be, for example, acetyl trimethyl citrate, acetyl triethyl citrate, and acetyl tributyl citrate.

In addition, butyl oleate, methyl acetyl ricinoleate, dibutyl sebacate, triacetin, and the like are preferably employed individually or in combination. If desired, two or more types of plasticizers may be employed in combination. Phosphoric acid ester based plasticizers are preferred because when employed at a ratio of no more than 50 percent, the cellulose ester film is barely subjected to hydrolysis and exhibits excellent durability. Further, a low content of phosphoric acid based plasticizers is preferred. Particularly preferred is the sole use of phthalic acid ester based or glycolic acid ester based plasticizers.

Of these, methyl phthalyl methyl glycolate, ethyl phthalyl ethyl glycolate, propyl phthalyl propyl glycolate, butyl phthalyl butyl glycolate, and octyl phthalyl octyl glycolate are preferred, and particularly employed is ethyl phthalyl ethyl glycolate. Alternatively, two or more types of these alkyl phthalyl alkyl glycolates are employed in combination.

The amount of plasticizers employed for said purpose is preferably between 1 and 30 percent with respect to the cellulose ester, and is most preferably between 4 and 13 percent.

These compounds may be added along with cellulose ester and solvents during preparation of a cellulose ester solution or may be added during the preparation of the solution or after said preparation.

With the purpose to improve yellow hue of film, dyes are incorporated. Dyes are preferred which are capable of tinting to gray as seen in common photographic supports. However, being different from the photographic supports, since it is unnecessary to minimize light piping, only a small amount of dye addition may be sufficient. Specifically the content of dyes is preferably between 1 and 100 ppm with respect to the cellulose ester, and is more preferably between 2 and 50 ppm. Gray may be obtained by appropriately combining a plurality of dyes.

Since cellulose ester film is tinted slightly yellow, blue or violet dyes are preferably employed. A plurality of dyes may be combined to obtain gray color.

When films are not sufficiently slippery, they are subjected to blocking with each other, and occasionally, ease of handling is degraded. Matting agents such as fine inorganic particles including silicon dioxide, titanium dioxide, sintered calcium silicate, hydrated calcium silicate, aluminum silicate, magnesium silicate, crosslinked polymers, and the like are preferably incorporated into the film, based on the present invention.

Further, in order to decrease the haze of a film, fine particles such as silicon dioxide are preferably subjected to surface treatment employing organic substances. Cited as preferred organic substances for said surface treatment are halosilanes, alkoxysilanes, silazanes, siloxanes, and the like. The matting effect increases as the average particle diameter of fine particles increases, while transparency increases as said diameter decreases. Accordingly, the average primary particles diameter of fine particles is no more than 0.1 µm, preferably between 5 and 50 nm, and more preferably between 7 and 14 nm. These fine particles usually exist in an aggregated form in the film and it is preferable to make the surface of the film roughness of 0.01 to 1.0 µm. Listed as fine particles of silicon dioxide are Aerosil 200, 200V, 300, R972, R972V, R974, R202, R812, OX50, TT600 and the like, all of which are manufactured by Nihon Aerosil Co., ltd. Of these, preferably listed are Aerosil R972, R972V, R974, R202, R812, and the like.

Said matting agents are preferably blended to obtain a film haze of no more than 0.6 percent, and a friction coefficient of no more than 0.5.

The amount of matting agents, which are employed for said purpose, is preferably between 0.005 and 0.3 percent with respect to fatty acid cellulose ester.

The optical characteristics of the optical compensation film of the present invention will now be described.

The optical compensating film of the present invention is characterized in that said film comprises an optically biaxial cellulose ester film support having thereon at least one optically anisotropic layer in which the orientation of liquid crystalline compounds are fixed. Said optically anisotropic layer may be comprised of one or more layers.

Preferably employed as liquid crystalline compounds according to the present invention are rod-shaped liquid crystalline compounds as described below.

In the present invention, optical compensation films are preferably employed in which the angle between the refractive index maximizing direction of rod-shaped liquid crystalline compounds incorporated into said optically anisotropic layer and the plane of said optically biaxial cellulose ester film support varies continuously or stepwise between from 0 to 90 degrees.

The refractive index maximizing direction of the rod-shaped liquid crystalline compound, as described herein, commonly is the same as the long axis direction of the molecules which are the constitution units of said rod-shaped liquid crystalline compound. However, due to substituents of said liquid crystalline compound, the refractive index maximizing direction may not always be the same as the long axis direction of said molecule.

Further, in the present invention, optical compensation films are preferably employed in which the projection direction to the cellulose ester support plane of the refractive index maximizing direction of said rod-shaped liquid crystalline compound is approximately orthogonal or parallel to each other.

Further, in the present invention, the preferably employed arrangement forms are as follows. On the cellulose ester film support, at least two layers are disposed each of which comprises rod-shaped liquid crystalline compounds. Further Optically Anisotropic Layers "A" and "B" are disposed which comprise rod-shaped liquid crystalline compounds of which orientation is fixed. In such an arrangement, refractive index maximizing direction "A" of said rod-shaped Liquid Crystalline Compound "A" incorporated into said Optically Anisotropic Layer "A" is approximately orthogonal to the projection direction on the plane of the cellulose ester film support, and refractive index maximizing direction "B" of said rod-shaped Liquid Crystalline Compound "B" incorporated into said Optically Anisotropic Layer "B" is approximately parallel to the projection direction in the plane of the cellulose ester film support.

In the foregoing, said rod-shaped Liquid Crystalline Compound "A" and said rod-shaped Liquid Crystalline "B" may be the same or different.

When said optically anisotropic layer, comprising said liquid crystalline compounds, is comprised one layer, an arrangement is more preferably employed in which the refractive index maximizing direction of said optically biaxial cellulose ester film support is approximately orthogonal to the projection direction on the plane of the optical compensation film in the refractive index maximizing direction of the optically biaxial cellulose ester film support.

When said optically anisotropic layer, comprising said liquid crystalline compounds, is comprised two layers, the orientation direction of said rod-shaped liquid crystalline compounds of said two layers is preferred in which the refractive index maximizing axial directing of each rod-shaped liquid crystalline compound is approximately orthogonal. Being approximately orthogonal, as described herein, may have a certain range from 90 degrees which will result in almost no problems such as coloration due to diffraction. However, said angle is preferably from 80 to 100 degrees, is more preferably from 85 to 95 degrees, and is most preferably 90 degrees.

Incidentally, being orthogonal as described in the present invention, means that as described above, axes are approximately orthogonal to each other, while being the same direction means that axes directions are approximately parallel to each other. Being approximately parallel, as described herein, means that the angle between each of the axes is within ±10 degrees, is preferably within ±3 degrees, and is more preferably within ±1 degree.

Further, the refractive index maximizing axis (being not an optical axis) of said optically biaxial cellulose ester film support is located on the plane of said optical compensation film. However, the refractive index maximizing axis of said optically anisotropic layer is not always on the plane of said optical compensation film.

Namely, when liquid crystalline compounds constituting one layer are, for example, optically positive uniaxial liquid crystalline compounds, said refractive index maximizing axis becomes an optical axis. Said optical axis can have a constant value at an angle to the plane of said optical compensation film from 0 to 90 degrees. Said angle is preferably from 5 to 80 degrees, and is more preferably from 20 to 50 degrees.

Further, an orientation state with respect to this thickness direction is allowed to take a so-called hybrid orientation in a continuous or stepwise varying distribution state. In the case of said hybrid orientation, are two major forms of the oblique variation of the axis.

Namely, one case is that the angle of said axis (the direction resulting in the maximum refractive index in the refractive index ellipsoid of the rod-shaped liquid crystalline compound) is arranged so that said angle to the plane of said optical compensation film increases in the thickness direction of said optical compensation film from one surface (Surface "A") to other surface (Surface "B") of said optical compensation film, while another case is that the angle of said axis is arranged so that said angle decreases in the thickness direction of the same.

It is possible to comprehend the constitution units of the rod-shaped liquid crystalline compounds, as described herein, as units having an optical axis. For example, they refer to their molecules. However, they are not limited to molecular units. When aggregates of a plurality of molecules have a definite optical axis, said constitution units may refer to said aggregates. Further, an increase or decrease in the angle to the optical compensation film plane means that the entire layer comprised of each layer has no optical axis. Said angle may continuously or intermittently increase or decrease in the thickness direction of said optical compensation film. Such an orientation state in the thickness direction of such an optical compensation film is occasionally called a hybrid orientation, hereunder. In this case, as described above, the entire liquid crystal layer has no optical axis. However, it is possible to determine an apparent average tilt angle of the entire layer as the aggregate of liquid crystal units having each optical axis.

This can be defined as the angle of the plane of said optical compensation film to the direction in which the difference in refractive indexes between normal light and abnormal light, when the optically anisotropic layer comprising said rod-shaped liquid crystalline compounds is viewed from the plane, including the lagging phase axis as the entire layer, as well as the normal line of said optical compensation film.

The apparent average tilt angle of said liquid crystal layer comprised of said positive uniaxial liquid crystalline compounds is from 0 to 80 degrees, is more preferably from 5 to 80 degrees, and is still more preferably from 20 to 50 degrees. Particularly preferable range is not more than 10 degrees and not less than 60 degrees, and further the range of not more than 25 degrees and not less than 45 degrees is preferable.

Further, it is possible to obtain the desired effects of the present invention when the optical characteristics of the support and the liquid crystal layer are reversed, namely when a biaxial liquid crystalline compound containing layer is disposed onto a positive uniaxial support. In this case, it is realized, for example, by applying optically biaxial liquid crystalline compounds onto a uniaxially stretched film. In this case, in the same manner as above, it is possible to maintain the angle of the axis in the refractive index maximizing direction to the plane of said optical compensation film at a constant value from 0 to 90 degrees. In addition, it is possible to result in a so-called hybrid orientation in a continuously or stepwise varied distribution state in said angle range.

The liquid crystalline compound according to the invention will be explained below.

A liquid crystalline compound can be suitably used in order to form the optically anisotropic layer as described above by controlling the orientation. The liquid crystalline compound used in the invention will be explained below in detail.

The liquid crystalline compound used in the invention may be a low molecular liquid crystalline compound or a polymer liquid crystalline compound. With respect to optical characteristics, a positive uniaxial rod-shaped liquid crystalline compound or a biaxial liquid crystalline compound is preferably used.

In the invention the positive uniaxial anisotropic compounds (referred to also as the positive uniaxial compounds) or biaxial compounds having an optical property close to rod-shaped liquid crystalline compounds can be treated as having optical properties of the rod-shaped liquid crystalline compounds and they may be included in the category of the rod-shaped liquid crystalline compounds.

Herein, the term, "positive uniaxial" (optically uniaxial) means that in an anisotropic element having optical anisotropy, only two of refractive indices in three axis directions, nx, ny, and nz are equal and the two refractive indices are smaller than the remaining one, and the term, "biaxial" means that in an anisotropic element having optical anisotropy, any one of refractive indices in three axis directions, nx, ny, and nz are different from another.

The positive uniaxial rod-shaped liquid crystalline compound in the invention may be a compound having a positive dielectric constant anisotropy or a compound having a negative dielectric constant anisotropy, but is preferably a compound having a positive dielectric constant anisotropy in view of easy controlling inclination of optical axis of each of crystal liquid molecules in the sheet thickness direction. The inclination of optical axis of the liquid crystalline compound having a positive dielectric constant anisotropy may be controlled through making the liquid crystal itself inclined orientation by selecting orientation layer.

Dielectric constant anisotropy ($\Delta\in$) of the rod-shaped liquid crystalline compound is represented by the difference $\Delta\in(\Delta\in=\in//-\in\bot\neq 0)$ between dielectric constant ($\in//$) in a state in which the major axis of the molecule is oriented in parallel with the electric field direction and dielectric constant ($\in\bot$) in a state in which the minor axis of the molecule is oriented in parallel with the electric field direction. Dielectric constant anisotropy ($\Delta\in$) has an influence on anisotropic property of refractive index of light transmitting liquid crystal molecules. The relationship between the both is represented by the following formula:

$$\Delta \epsilon = (n//) - (n\perp)^2$$

wherein $\Delta n = n// - n\perp = ne - no$, wherein ne represents an extraordinary light refractive index, and no represents an ordinary light refractive index, n// represents an refractive index to light in the orientation vector direction of liquid crystal molecules, and $n\perp$ represents an refractive index to light in the direction perpendicular to the orientation vector of liquid crystal molecules.

Herein, $\Delta\epsilon$ or $\Delta n$ is a positive value in the liquid crystalline compound used for driving an ordinary TN liquid crystal cell.

In the low molecular weight liquid crystalline compound the whole molecule determines the optically anisotropic property (typically, refractive index anisotropy) of the liquid crystalline compound. A polymer liquid crystalline compound is divided into two kinds, and the one is a main chain type polymer liquid crystalline compound and the other a side chain type polymer liquid crystalline compound. In the both type polymer liquid crystalline compounds, a structure containing a mesogenic group determines the optically anisotropic property in a similar manner as in the low molecular weight compound.

The mesogenic group (or a mesogenic unit) as described above refers to a part necessary for developing a liquid crystal property in a liquid crystalline compound, and the mesogenic group ordinarily comprises a core group being a rigid part, a spacer group being a flexible part, and an end group positioned at the molecular end. However, the mesogenic group does not require all of the above three groups as long as a liquid crystalline compound has a group developing a liquid crystal property.

Examples of the positive uniaxial liquid crystalline compounds will be shown below, but they are not limited thereto.

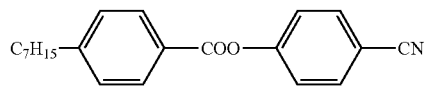

1

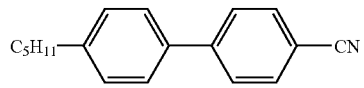

2

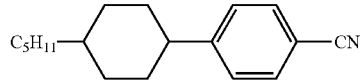

3

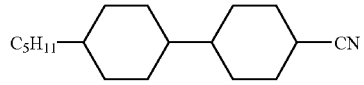

4

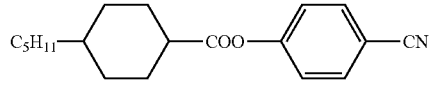

5

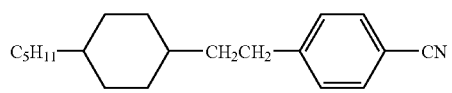

6

-continued

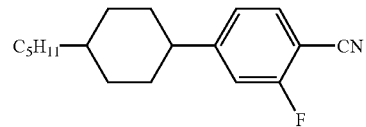

7

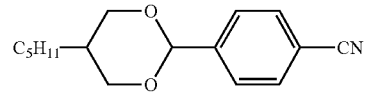

8

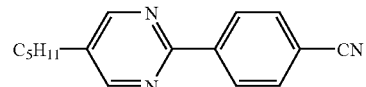

9

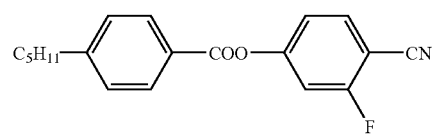

10

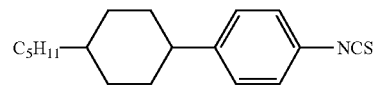

11

12

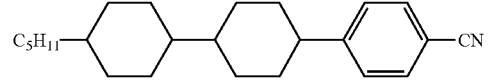

13

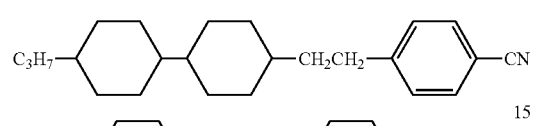

14

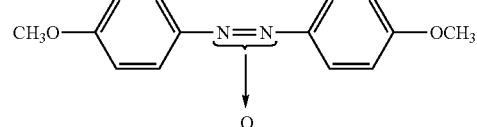

15

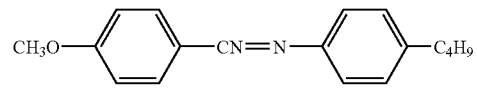

16

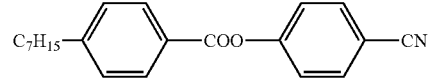

17

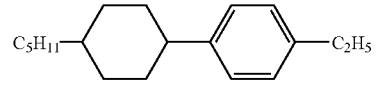

18

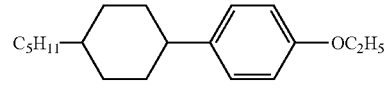

19

20

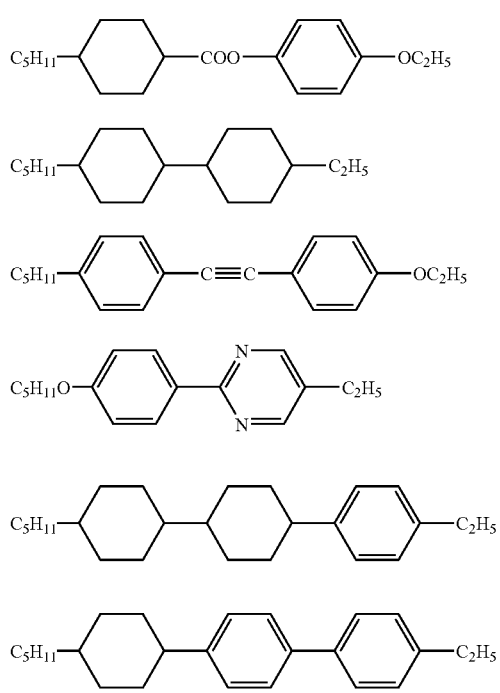

In addition to the above exemplified compounds, compounds described in "Ekisho no Kagaku: quarterly publication, Kagaku Sosetsu No. 22 (1994), p. 42, 44 edited by Nihon Kagakukai" (Gakkai Shuppan center) can be used. The above described rod-shaped liquid crystalline compounds having a positive uniaxiality can be suitably used as ordinary rod-shaped nematic liquid crystalline compounds used in TN cells.

Compounds developing a nematic liquid crystal phase are preferably used as the rod-shaped liquid crystalline compounds in the invention.

The biaxial liquid crystalline compounds include compounds described in Yukigoseikagaku, Vol. 49, No. 5 (1991), p. 124–143, compounds described in D. W. Bruce et al., AN EU-SPONSORED' OXFORD WORKSHOP ON BIAXIAL NEMATICS' (St Benet's Hall, University of Oxford Dec. 20–22, 1996), p. 157–293, compounds described in S. Chandrasekhar et al., A Thermotropic Biaxial Nematic Liquid Crystal, Mol. Cryst. Liq. Cryst., 1988, Vol. 165, pp. 123–130, and compounds described in D. Demus, J. Goodby et al., Handbook of Liquid Crystals, Vol. 2B, Low Molecular Weight Liquid Crystals II, pp. 933–943, published by WILEY VCH Co.

The liquid crystal polymers in the invention are not specifically limited, but are preferably ones having a positive or negative specific double refractive index, which are detailed in "LIQUID CRYSTALLS, 1989, Vol. 5, No. 1, pp. 159–170".

The polymer liquid crystalline compounds in the invention are divided into two kinds of polymer liquid crystalline compounds having a mesogenic group, one is a polymer having a mesogenic group in the main chain and the other a polymer having a mesogenic group in the side chain. The polymer liquid crystalline compounds in the invention are also divided into two kinds of thermotropic and liotropic polymer liquid crystalline compounds.

The liquid crystal polymers in the invention are not specifically limited, but are preferably ones forming a nematic liquid crystal. The polymer having a mesogenic group in the side chain is preferable in orientation property, and a thermotropic liquid crystal polymer is preferable in orientation fixation. The main chain used in the above side chain type liquid crystal polymers is preferably that of a vinyl type polymer, polysiloxane, polypeptide, polyphosphazene, polyethylene imine, and cellulose.

Compounds having double refraction property but not having liquid crystalline property can be employed in place of liquid crystalline compounds in the invention. The transmittance of anisotropic layer in the range of visible light is preferably 80% or more. It is possible to give the same optical property to compounds having no liquid crystallinity and having polarity group such as cyano, nitro group or halogen by subjecting pouring process.

The cellulose ester film support according to the invention preferably has a function to cut off ultraviolet rays since the support is installed in a liquid crystal display which may be sometimes employed outdoor. UV absorbers are preferably incorporated into the cellulose ester film of the present invention.

Preferably employed are UV absorbers which are excellent in absorbing ultraviolet radiation having a wavelength of less than 370 nm to minimize degradation of the liquid crystal and absorb as little as possible visible light of wavelengths of more than 400 nm. In the present invention, the transmittance at a wavelength of 370 nm is particularly to be not more than 10 percent. The amount of the UV absorber is preferably 0.5 to 5 percent, and is more preferably 0.6 to 2.0 percent by weight with reference to the fatty acid cellulose ester.

The UV absorber employed herewith preferably has no absorption within the visible light range, and, the example includes benzotriazole based compounds, benzophenone based compounds, salicylic acid ester based compounds, and the like.

Examples include, 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2,4-dihydroxybenzophenone,2-hydroxy-4-methoxybenzophenoene, 2-hydroxy-4-n-octoxybenzophenone, 4-dodecyloxy-2-hydroxybenzophenone, 2,2',4,4'-tetrahydroxybenzophenone, 2,2'-dihydroxy-4,4'-dimethoxybenzophenone, phenyl salicylate and methyl salicylate.

In the present invention, at least one of these UV absorbers is preferably employed, and more than two different UV absorbers may be incorporated in combination.

Methods for adding UV absorbers are those in which UV absorbers are dissolved in organic solvents such as alcohol, methylene chloride, dioxolan, and the like, and then added to an organic solvent solution (hereinafter simply referred to as dope) of cellulose ester, or UV absorbers may be directly added to said dope. Inorganic powders, which are insoluble in organic said solvents are dispersed into organic solvents and cellulose ester employing a dissolver or a sand mill, and are then added to said dope.

The employed amount of UV absorbers in the present invention is commonly between 0.1 and 2.5 percent by weight with respect to the weight of cellulose ester, is preferably between 0.5 and 2.0 weight percent by weight, and is more preferably between 0.8 and 2.0 percent by weight. An amount of UV absorbers, exceeding 2.5 percent by weight, is not preferred due to the tendency of a decrease in transparency.

In order to enhance the heat resistance of a film, hindered phenol based compounds are preferably employed. The added amount of these compounds is preferably between 1 ppm and 1.0 percent by weight with respect to the cellulose ester, and is more preferably between 10 and 1,000 ppm.

Further, in addition to these compounds, heat stabilizers such as alkali earth metal salts comprised of calcium, magnesium, and the like, may also be added.

In addition to the aforementioned compounds, further, added may be antistatic agents, flame retarders, lubricants, oils, and the like.

Foreign matter particles which generate disordered reflection light will deteriorate characteristics since the cellulose film support of the invention is employed between polarization plates. In view of this, abnormal luminescent spots become problematic.

The luminescent spots, which are observed at a polarized light cross Nicol state, mean those which are observed in such a manner that two polarizing plates are arranged at a right angle (cross Nicol) state and said cellulose film is placed between them. Such luminescent spots at said polarized light cross Nicol state are observed only as luminescent spots caused by penetrating light from opposite side under light shielded conditions. Thus it is possible to readily identify the size as well as the number thereof.

The number of luminescent spots having a size of 5 to 50 μm per 250 mm$^2$, which are observed under a polarized light cross Nicol state, is preferably not more than 200, and the number of luminescent spots having a size of at least 50 μm is preferably 0. The number of luminescent spots having a size of 5 to 50 μm is more preferably not more than 100, and is further more preferably not more than 50. Too many numbers of the luminescent spots affect material disadvantage on the image of a liquid crystal display.

Preparation method of a cellulose ester film support is described.

Preferable method for the preparation of the cellulose ester film support is Solvent casting film forming method, in which dope liquid is cast on a substrate to form a film, and the film is peeled off the substrate, and after that the film is subjected to drying during conveying in the drying zone with tension.

(1) Dissolution Process: The dissolution process is one in which cellulose ester flakes are dissolved, while stirring, in organic solvents mainly comprised of good solvents for said flakes, employing a dissolution vessel, and thereby a cellulose ester solution (hereinafter referred to as a dope) is prepared. In order to carry out said dissolution, there are various methods such as a method in which dissolution is carried out at a normal atmospheric pressure, a method in which dissolution is carried out at a temperature lower than the boiling point of the primary solvent, a method in which dissolution is carried out at a temperature higher than the boiling point of the main solvent under an increase of pressure, a cooling dissolution method in which dissolution is carried out at a lowering temperature, as described in J. M. G. Cowie et al., Makromol hem., volume 143, page 105 (1971), and Japanese Patent Publication Open to Public Inspection Nos. 9-95544 and 9-95557, and others, a method in which dissolution is carried out at a high pressure, and the like. The resultant dope is filtered employing filter materials, is then defoamed, and is subsequently pumped to the next process.

(2) Casting process: a process in which a dope is conveyed to a pressure die through a pressure type metering gear pump, and at the casting site, said dope is cast from said pressure die onto a support for casting (hereinafter occasionally referred to as a support) which is an infinitely moving endless metal belt or a rotating metal drum. The surface of the support for casting is specular. Listed as other casting methods are a doctor blade method in which the thickness of the dope layer is regulated employing a blade, and also a reverse roll coater method in which regulation is carried out employing a roll which rotates in the reverse direction. Said pressure die is preferred in which the slit shape at the mouth piece portion can be regulated and the film thickness is readily regulated to be uniform. The pressure die includes a coat hanger die, a "T" die, and the like, and any of these may preferably be employed. In order to increase the casting speed, at least two pressure dies may be provided and at least two layers may be simultaneously cast while dividing the dope.

(3) Solvent evaporation process: a process in which a web is heated on the support for casting and solvents are thereby evaporated. In order to evaporate solvents, methods include one in which air is blown from the web side, and/or a method in which heating is carried out from the reverse surface of the support employing liquid, and another in which heating is carried out from the surface as well as the revere surface employing heat radiation. Of these, the reverse surface liquid heating method is preferred due to high drying efficiency. Further, these methods are preferably combined.

(4) Peeling process: a process in which a web, which has been subjected to evaporation of solvents on the support, is peeled at the peeling site. The peeled web is conveyed to the subsequent process. When the residual solvent amount (refer to the formula described below) is too excessive, it may be difficult to peel the web. On the contrary, when peeling is carried out after fully drying the web on the support, a part of the web may peel prior to the peeling site.

Listed as a method to increase the casting speed is a gel casting method (in which peeling can be carried out even though the amount of residual solvents is relatively great).

Said gel casting methods include a method in which poor solvents with respect to the cellulose ester are added to a dope and gelling is carried out after casting said dope, and also a method in which gelling is carried out by decreasing the temperature of the support, and the like. Further, also included is a method in which metal salts are added to the dope. By strengthening the web through gelling the dope on the support, it is possible to carry out earlier peeling and to increase the casting speed. When peeling is carried out at the time when the residual solvent amount is still relatively great, the web may be too soft. Thus during peeling, the flatness of the web tends to be degraded, and wrinkles and longitudinal streaks tend to be formed. Accordingly, the residual solvent amount is determined so that productivity and quality are balanced.

(5) Drying process: a process which dries a web employing a drying apparatus in which said web is alternatively passed through staggered rolls and/or a tenter apparatus in which said web is conveyed while the web width is maintained by holding both web edges employing pins or clips. A common drying method is one in which both surfaces of the web are subjected to hot air flow. Instead of air, employed is a method in which heating is carried out employing microwaves. Too rapid drying tends to degrade the flatness of the finished film. High temperature drying is preferably carried out when the residual solvent amount is no more than 8 percent. During the entire drying process, drying temperatures are commonly between 40 and 250° C., and are preferably between 70 and 180° C. Drying temperature, drying air volume, and drying time vary depending on employed solvents. Thus drying conditions may be suitably selected depending on types of employed solvents and their combination.

In the drying process, the web tends to shrink in the width direction due to the evaporation of solvents. When rapid drying is carried out at a relatively high temperature, shrinkage increases further. Drying is preferably carried out while minimizing the resulting shrinkage so that the finished film exhibits excellent flatness. From this viewpoint, a drying method (a tenter method), as shown, for example, in Japanese Patent Publication Open to Public Inspection No. 62-46625, is preferred in which the entire or a part of the drying process is carried out while holding both edges of the web in the width direction employing clips.

Winding process: a process in which after decreasing the residual solvent amount to no more than 2 percent, the resulting web is wound. By decreasing the residual solvent amount to no more than 0.4 percent, it is possible to obtain a film having excellent dimensional stability. Employed as winding methods may be those which are commonly employed. Said methods include a constant torque method, a constant tension method, a taper tension method, an inner stress constant program tension control method, and the like. Any of these may be selected and employed.

The layer thickness of a fatty acid cellulose ester film is preferably controlled so as to obtain the desired thickness while controlling the dope concentration, the pumping liquid volume, the slit distance of the die mouth ring, the extrusion pressure of the die, and the speed of a casting support. Further, as a means to make the layer thickness uniform, it is preferable that by employing a layer thickness detecting means, programmed feedback information is subjected to feedback to each of said devices so that the layer thickness is controlled.

In the processes immediately after casting to drying employing a solution casting method, air may be employed as an atmosphere in the drying apparatus. However, inert gasses as nitrogen gas, carbon dioxide gas, and the like may be employed in said drying apparatus. Naturally, attention should always be paid so that the concentration of evaporated solvents in the drying atmosphere does not exceed the explosion limit.

In order to obtain the orientation exhibiting optically biaxial characteristics (showing the relationship of nx>ny>nx), it is possible to employ any feasible method to prepare the cellulose ester support having optical biaxially characteristics, according to the present invention. As one of the most effective methods, it is possible to accept a stretching method.

As described below, during production, it is possible to stretch the optical compensation film of the present without utilizing a relatively high temperature. When said method is not utilized, it is possible to carry out stretching at a relatively high temperature. In the case of high temperature stretching, stretching is carried out at a temperature higher than the glass transition temperature of said cellulose ester. However, plasticizers as described above result in a decrease in their effects and occasionally, sufficient stretching properties are not obtained. As a result, plasticizers, which can provide sufficient stretching properties even at a high temperature, have been needed. As such plasticizers, it was discovered that it was possible to efficiently employ non-volatile plasticizers. Non-volatile plasticizers, as described herein, refer to compounds which have a markedly low vapor pressure of no more than 1,330 Pa at 200° C. as well as low volatility. Said vapor pressure is more preferably no more than 665 Pa, and is still more preferably to be no more than 133 Pa. For instance, arylenebis(diarylphosphate) ester is preferred. Other than this, tricresyl phosphate (38.6 Pa at 200° C.) and trimellitic acid tris(2-ethylhexyl) (66.5 Pa at 200° C.), and the like are also preferably employed. Further, non-volatile phosphate esters described in Japanese Patent Application Open to Public Inspection under PCT Application No. 6-501040 are preferably employed. In addition, preferably employed as plasticizers may be those having a high molecular weight such as polymers and oligomers such as polyester, acrylic resins, polyvinyl acetate containing polymers, and the like. In this case, the content of plasticizers is preferably from 0.1 to 30 percent by weight with respect to the cellulose ester, and is most preferably from 0.5 to 15 percent by weight. By employing such plasticizers, it is possible to enhance the stretching properties of cellulose ester at a relatively high temperature, and specifically to produce at high productivity cellulose ester film supports exhibiting excellent film surface quality as well as flatness.

Preferably employed as one example of said methods, which provide optically biaxial properties with the cellulose ester film support according to the present invention, is a method, in which, as previously described, a stretching operation is carried out under the state in which solvents are still incorporated. Said stretching method will now be described.

In the production of the cellulose ester film support associated with the optical compensation film of the present invention, a cellulose ester-dissolved dope is cast onto a casting support. Subsequently, it is preferable that a web (a film), peeled from said casting support, is stretched in at least one direction by a factor of 1.0 to 4.0 while a residual solvent amount in said web is in the range of from 10 to 100 percent by weight.

Incidentally, said residual solvent amount is expressed by the formula described below.

Residual solvent amount (in percent by weight)={$(M-N)/N$}×100 wherein M is the weight of the web at an optional time, and N is the weight of the web which is dried at 110° C. for 3 hours since said optional time.

When the residual solvent amount in the web is excessively large, stretching effects are not obtained. On the other hand, when the residual solvent amount is excessively small, stretching becomes markedly difficult, and the web is occasionally broken. The residual solvent amount in the web is more preferably in the range of from 10 to 50 percent by weight, and is most preferably in the range of from 20 to 40 percent by weight. Further, when the stretching factor is excessively small, it is difficult to obtain the sufficient phase difference, while when the stretching factor is excessively large, stretching becomes difficult and the web is occasionally broken. The stretching factor is more preferably in the range of 1.0 to 3.5.

It is possible to stretch a film, which is solution-cast employing cellulose ester according to the present invention, without heating to a relatively high temperature, if the residual solvent amount is in the specified range. When stretching and drying are carried out at the same time, the process is preferably shortened. However, when the temperature of the web is excessively high, plasticizers volatile. Accordingly, the temperature is preferably from 15 (room temperature) to 160° C.

Further, biaxial stretching, in which the stretching directions are orthogonal to each other, is an effective method so that film refractive indexes nx, ny, and nz are within the range of the present invention. For example, in the case of stretching a film in the casting direction, when the contraction in the width direction is too large, nz becomes too large. In this case, it is possible to decrease nz by minimizing the contraction in the width direction or carrying out stretching in the width direction. In the case of stretching in the width direction, the refractive index occasionally results in non-uniform distribution across the width. Said non-uniform distribution of the refractive index occurs when a tenter method is utilized. This phenomenon occurs in such a manner that stretching in the width direction results in a contraction force in the central area of the stretched film while the film edges are fixed. This phenomenon is assumed to be the same as the so-called Boing phenomenon. Even in this case, it is possible to minimize the Boing phenomenon by carrying out stretching in the casting direction and to improve the non-uniform phase difference distribution across the width.

Further, by carrying out biaxial stretching in which the stretching directions are orthogonal to each other, it is possible to decrease variations of thickness of the stretched film. When the thickness variation of the cellulose ester film support is excessively large, non-uniform phase difference occurs, which results in problems such as coloration and the like, when used as an optical compensation film. The thickness variation of said cellulose ester film support is preferably in the range of ±3 percent, and is more preferably in the range of ±1 percent. In order to achieve objectives as above, the method in which biaxial stretching is effective in which stretching directions are orthogonal to each other. The biaxial stretching factors, in which stretching directions are orthogonal to each other, are preferably from 0.8 to 4.0, and from 0.4 to 1.2, respectively.

Methods to stretch the web are not particularly limited. Methods include, for example a method in which a plurality of rolls rotate at different circumferential speed, and stretching in the longitudinal direction is carried out utilizing said different circumferential speed during the rotation of rolls; a method in which both edges of the web are secured employing clips or pins, and stretching in the longitudinal direction is carried our by increasing the distance between clips or pins in the advancing direction; a method in which lateral stretching is carried out by increasing the distance between said clips or pins in the lateral direction, a method in which longitudinal stretching and lateral stretching are simultaneously carried out by increasing the distance between said clips or pins in the longitudinal direction as well as in the lateral direction; and the like. Naturally, these methods may be employed in combination. Further, in the case of the so-called tenter method, it is preferable to drive a clip portion employing a linear drive system so as to make it possible to carry out smooth stretching and to minimize danger such as film breakage, and the like.

The film obtained as above comprises residual solvents preferably in an amount of no more than 2 percent by weight in the finished film, and more preferably in an amount of no more than 0.4 percent by weight so as to obtain a film with excellent dimensional stability.

The oriented layer (orientation layer) in the invention will be explained below.

The oriented layer is generally provided on a transparent support or a subbing layer. The oriented layer controls an orientation direction of a liquid crystalline compound layer provided on it. This gives an orientation inclined to an optical compensation sheet. The oriented layer may any layer as long as it gives an orientation property to an optically anisotropic layer.

The oriented layer may be provided on a support by coating etc., or may be formed by modification of surface of the support itself. When it is obtained by surface modification the modified part (or surface area) is also called as the oriented layer.

The preferred example of the oriented layer is a rubbing layer containing an organic compound (preferably a polymer), an inorganic compound oblique evaporation layer, a layer having a microgroove, a multi-layered film (LB film) of ω-tricosanoic acid, dioctadecylmethylammonium chloride or methyl stearate, which is formed according to a Langmuir-Blodgett's technique, and a layer having a dielectrics oriented by application of an electric or magnetic field.

The organic compounds used for forming an oriented layer include polymers such as polymethyl methacrylate, acrylic acid-methacrylic acid copolymer, styrene-maleimide copolymer, polyvinyl alcohol, poly(N-methylolacrylamide), styrene-vinyl toluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, carboxymethylcellulose, polyethylene, polypropylene, and polycarbonate, and compounds such as silane coupling agents. The preferred polymers are polyimide, polystyrene, a polymer of styrene derivatives, gelatin, polyvinyl alcohol, or an alkyl modified polyvinyl alcohol (modified with preferably an alkyl having a carbon atom number of 6 or more). The oriented layer obtained by subjecting the above described polymer layer to orientation treatment can orient a liquid crystalline compound obliquely.

Of the above described compounds, an alkyl modified polyvinyl alcohol is especially preferable. The alkyl modified polyvinyl alcohol is superior in uniformly orienting a liquid crystalline compound. This is considered to be due to a strong interaction between the alkyl chain of the liquid crystalline compound and the alkyl chain of the alkyl modified polyvinyl alcohol on the surface of the oriented layer. The alkyl in the alkyl modified polyvinyl alcohol has a carbon atom number of more preferably 6 to 14. It is preferable that the alkyl is bonded to polyvinyl alcohol through a linkage, —S—, —(CH$_3$)C(CN)—, or —(C$_2$H$_5$) N—CS—S—. The alkyl modified polyvinyl alcohol is a polyvinyl alcohol having alkyl in the molecular end, and preferably has a saponification degree of 80% or more and a polymerization degree of 200 or more. The polyvinyl alcohols described above having alkyl in the side chain include products such as MP 103, MP 203, and R 1130 manufactured by Kuraray Co., Ltd.

A polyimide layer (preferably polyimide having fluorine atoms), which is widely employed as an LCD oriented layer, is preferred as the organic oriented layer. It is possible to obtain said layer by coating, onto a transparent support, polyamic acid (for example, LQ/LX Series manufactured by Hitachi Kasei Co., Ltd., and SE Series manufactured by Nissan Kagaku Co., Ltd), heating the coated layer at 100 to 300° C. for 0.5 to 1 hour, and then rubbing the resultant heated layer. The oriented layer in the invention is preferably a hardened layer obtained by hardening a layer containing a polymer, in which a reactive group is incorporated to the above described polymer, or a mixture of the above described polymer and an isocyanate compound or an epoxy compound.

The above described rubbing treatment may be carried out utilizing a treatment method which is widely employed as an LCD liquid crystal orientation process. That is, it is possible to employ a method in which orientation is obtained by rubbing the surface of a layer to be oriented in a definite direction, employing paper, gauze, felt, rubber, nylon, polyester fiber, and the like. Generally, the surface of the layer to be oriented is rubbed several times, employing a cloth prepared by uniformly planted fiber having a uniform length and diameter, whereby the rubbing treatment is suitably carried out.

The evaporation substance for the inorganic oblique evaporation film include representatively $SiO_2$, and further metal oxides such as $TiO_2$ and $ZnO_2$, fluorides such as $MgF_2$, and metals such as Au and Al. Metal oxides having a high dielectric constant can be used as the oblique evaporation compounds, and are not limited to the above metal oxides. An inorganic oblique evaporation film can be formed employing a vacuum evaporation device. The inorganic oblique evaporation film can be formed by vacuum evaporating inorganic compounds on the fixed support or continuously vacuum evaporating inorganic compounds on the moving web support.

The oriented layer employed in the invention may be any combination of the above described, and is not specifically limited, but an appropriate combination of the oriented layers and liquid crystalline compounds can provide an angle (a tilt angle) inclined to a base plane with respect to the sheet thickness direction, as described later.

As another method for orienting liquid crystalline compounds, there is a method employing an electric field or a magnetic field. As the method for orienting liquid crystalline compounds obliquely in the invention, a magnetic field is preferably used. When a solution containing a liquid crystal molecule dispersed in a polymer matrix is coated on a support, and a magnetic field is applied to the coated at an angle to the direction perpendicular to the support plane, the liquid crystal molecule is oriented in the direction. In this case, the intensity of the magnetic field is preferably 500 G or more, but a liquid crystalline compound with a low intrinsic viscosity can be oriented at not more than 500 G or less.

As the rubbing methods, there are a mask rubbing method rubbing with a mask having a definite shape while moving (K. Takatori et al., "A Complementary T LCD with Wide-Viewing Angle Grayscale", Japa Display' 92, pp 591) and a coating method coating plural compounds for orientation (T. Kamada et al., Wide-Viewing Angle Full-Color TFT LCDs", Japa Display' 92, pp 886). The mask rubbing method and the method of coating plural compounds comprise complex processes.

Further, these methods, when an oriented layer is formed, change inclined angle (so-called, a pretilt angle) of the liquid crystalline compounds used, and only form two symmetric pretilt angles. Therefore, the orientation direction is only single, and improvement of viewing angle is limited to a specific direction.

Other methods controlling liquid crystal orientation than the rubbing method includes inclination evaporation method employing inorganic oblique evaporation film (Japanese Patent O.P.I. Publication No. 56-66826). Further there are proposed a photolithographic method for forming grating protrusions and concaves on the surface of the orientation film according to photolithography (Japanese Patent O.P.I. Publication No. 60-60624), a LB film method for orienting a polymer chain on upper direction in providing a multilayer on a support (Japanese Patent O.P.I. Publication No. 62-195622), an ion irradiation method for irradiating ion obliquely (Japanese Patent O.P.I. Publication No. 3-83017), a high speed liquid jetting method for jetting liquid with high speed obliquely (Japanese Patent O.P.I. Publication No. 63-96631), an ice blasting method jetting ice obliquely (Japanese Patent O.P.I. Publication No. 63-96630), an eximer laser method for forming periodical stripes by irradiating an eximer laser to a polymer surface (Japanese Patent O.P.I. Publication No. 2-196219), an electron beam scanning method for forming fine protrusions and concaves by scanning a thermoplastic compound with an electron beam (Japanese Patent O.P.I. Publication No. 4-97130), a centrifugal method for orienting a polymer chain of a coated layer by centrifugal force (Japanese Patent O.P.I. Publication No. 63-21381), a stamping method for transferring orientation by laminating a layer oriented in advance onto another base by means of pressure (Japanese Patent O.P.I. Publication No. 6-43457), a Y. Toko et al. random orientation method for twisting orientation by adding a chiral agent (J. Appl. Phys. A74 (3), p. 2071 (1993)), and a Hasegawa et al. photo decomposition method for photo-decomposing a polyimide film employing a polarized ultraviolet light (Ekisho Toronkai Yokoshu, p. 232, (Number 2G604)(1994)).

Orientation of the optical compensation sheet of the invention shows a hybrid orientation or changes its inclined degree due to a surface energy of the plane which a liquid crystal layer contacts (for example, a support plane or atmospheric air) or kind of liquid crystalline compounds mixed, which can control the orientation.

For example, an inclined angle of the above described rod-shaped compounds on the support side can be generally adjusted by selecting liquid crystalline compounds used in the invention or compounds used in an oriented layer, or selecting rubbing treatment methods. An inclined angle of the liquid crystalline compounds on the obverse side (contacting atmospheric air) can be generally adjusted by selecting liquid crystalline compounds used in the invention or another compound (such as a plasticizer, a surfactant, a polymerizable monomer or polymer) used together with them. The varying degree of the inclined angle can be generally adjusted by the methods described above.

Oriented layers suitable to give a nematic hybrid orientation to a liquid crystalline compound used in the invention include a rubbed oriented layer containing polyimide, a rubbed oriented layer containing polyethersulfone, a rubbed oriented layer containing polyphenylene sulfide, a rubbed oriented layer containing polyethylene terephthalate, a rubbed oriented layer containing polyethylene naphthalate, a rubbed oriented layer containing polyacrylate, and a rubbed oriented layer containing cellulose based plastics.

As the methods for fixing orientation of the liquid crystalline compounds in the invention, the conventional methods for fixation can be used optionally. Generally, it is preferred that orientation and fixation of the orientation are simultaneously carried out. For example, fixation of the orientation is carried out by forming a liquid crystalline compound layer containing a low molecular weight liquid crystalline compound or a high molecular weight liquid crystalline compound on a support while maintaining at a temperature range (which varies due to kind of liquid crystalline compounds, for example, from room temperature to 100° C.) developing its liquid crystal phase, orienting the liquid crystalline compound, and fixing it by cooling to room temperature. The fixation is also carried out by coating a solution, in which a liquid crystalline compound and another compound are dissolved in a solvent, on an oriented layer, drying the coated layer, heating the dried layer to a temperature developing a nematic phase, fixing the heated layer while maintaining the orientation (nematic phase), and cooling it. The fixation is also carried out by coating a solution, in which a liquid crystalline compound and another compound (for example, a photopolymerizable monomer and a photopolymerization initiator) are dissolved in a solvent, on an oriented layer, drying the coated layer, heating the dried layer to a temperature developing a nematic phase, polymerizing the monomer (for example, by ultraviolet light irradiation).

As another method for fixing orientation, there are the following methods: a method of fixing orientation of liquid crystalline compounds wherein a liquid crystalline compound having an unsaturated bond is polymerized optionally in the presence of a photopolymerization initiator or a thermal polymerization initiator by heat or light; a method of fixing orientation of liquid crystalline compounds wherein a mixture of liquid crystalline compounds having in their molecular ends a reactive group such as a substituent having an unsaturated group or a substituent having an active hydrogen and a polymer matrix is heated, light-irradiated or pH-changed to react; and a method of fixing orientation of liquid crystalline compounds wherein liquid crystalline compounds having a reactive group are cross-linked to another in an individual liquid crystal domain. However, various technique can be applied to the fixation in the invention and is not limited to the above described.

The examples of the thermal polymerization initiator include an azo compound, an organic peroxide, an inorganic peroxide, and sulfinic acid. The examples of the photopolymerization initiator include benzophenones, acetophenones, benzoins, and thioxanthones.

The plasticizer, surfactant, or polymerizable monomer as described above may be any, as long as it has compatibility with liquid crystalline compounds used in the invention, changes the inclined angle of liquid crystalline compounds used in the invention, or does not jeopardize orientation. Of these, a polymerizable monomer (for example, a compound having a vinyl group, a vinyloxy group, an acryloyl group or a methacryloyl group) is preferred. The above compounds can be used in an amount of 1 to 50 weight % (preferably 5 to 30 weight %) based on the amount of liquid crystalline compounds used.

The polymer as described above may be any, as long as it has compatibility with liquid crystalline compounds used in the invention, or changes the inclined angle of liquid crystalline compounds used in the invention. One example of the polymer is cellulose ester. The preferred examples of the cellulose esters include cellulose acetate, cellulose acetate propionate, hydroxypropyl cellulose and cellulose acetate butyrate. The above polymer can be used in an amount of 0.1 to 10 weight % (preferably 0.1 to 8 weight %, and more preferably 0.1 to 5 weight %) based on the amount of liquid crystalline compounds used, so that it does not jeopardize orientation of the liquid crystalline compounds used. In the cellulose acetate butyrate, the butyrylation degree is 30% or more, and preferably 30 to 80%, and the acetylation degree is 30% or more, and preferably 30 to 80%. The viscosity (according to ASTM D-817-72) of the cellulose acetate butyrate is preferably in the range of from 0.01 to 20 seconds.

The layer configuration of the optical compensation film of the present invention will now be described.

The layer configuration of the optical compensation film of the present invention is not particularly limited as long as a layer, comprising uniaxial liquid crystalline compounds, especially positive uniaxial liquid crystalline compounds, is disposed on a biaxial support. In addition to said liquid crystal layer, one or more liquid crystal layers may be disposed. Said liquid crystal layer may be disposed directly on said support. It is possible to commonly provide an orientation layer. Second and following liquid crystal layers may be directly provide on the previously disposed liquid crystal layer (for instance, the first liquid crystal layer). Commonly, it is possible to provide an orientation layer in the same manner as above. It is possible to provide a dissolving-out blocking layer, as described below, between said support and said orientation layer which, is utilized to orient liquid crystals. When a plurality of liquid crystal layers are disposed, it is possible to provide a dissolving-out blocking layer between the first and second liquid crystal layers (when each liquid crystal layer is formed on said orientation layer, between the first liquid crystal layer and the second orientation layer).

When these liquid crystal layers are disposed, it is preferable that an antistatic layer be disposed on layer on either side of the support so as to enhance the orientation controlling properties of liquid crystals. Namely, when said optical compensation film is continuously produced in the form of a long optical compensation film, the orientation of liquid crystals is occasionally disturbed due to the static chare formed on the support during the process of contacting conveying rolls or belts and peeling from the same and the like. In order to minimize this drawback, it is very effective to provide said antistatic layer on the support side. An antistatic function may not be disposed to the support side but may be disposed to liquid crystalline compounds thorough addition of materials. In that case, however, it is necessary to choose materials and their concentration so that orientation properties of liquid crystals are not adversely affected.

Further, for the purpose of the enhancement of sliding properties, the minimization of blocking, and the like, it is possible to provide a back coat layer on the reverse side of the support, namely on the surface on which no liquid crystal layer is provide. Further, if desired, it is possible to provide a hard coat layer, a back coat layer, an antistatic layer, an antireflection layer, an antiglare layer, and the like in combination with said back coat layer.

The dissolving-out blocking layer according to the present invention will now be described.

In the present invention, liquid crystalline compounds are coated onto a cellulose ester film support according to the present invention. Further, when said orientation layer is disposed between optical compensation layers in which the orientation of said liquid crystalline compounds is fixed, the dissolving-out blocking layer is preferably disposed in order to enhance the adhesion between said cellulose ester film support and said orientation layer.

The dissolving-out blocking layer, as described herein, refers to the layer which retards the diffusion of dissolved-out materials from the transparent resinous substrate to the orientation layer or to the optically anisotropic layer comprising liquid crystalline compounds. Said diffusion occurs due to the presence of organic solvents which are employed to coat the liquid crystalline compounds and to prepare the coating composition of the orientation layer. When said orientation layer as well as said liquid crystalline compound layer is disposed in the form of a thin layer, a method is preferred in which organic solvent solution of these compounds are prepared and then coated. However, transparent resinous substrates such as cellulose ester film supports, and the like, are comprised of resins and often comprised of plasticizers. Organic solvents, which dissolve resins or plasticizers, also dissolve resins in the orientation layer as well as liquid crystalline compounds. As a result, it is readily assumed that during coating, diffusion between layers and contamination between layers occur.

During that period, by producing resins which are soluble in solvents which are insoluble or hardly soluble in said organic solvents, it is possible to retard said diffusion between layers as well as said contamination between layers during coating. Further, even though said compounds are soluble in organic solvents which dissolve resins or plasticizers, actinic light hardening resins in the monomer state are applied onto a transparent substrate, and the resulting coating is subjected to hardening reaction. By so doing, being different from simply coating said layer, it is possible to provide a layer having a dense crosslinked structure. As a result, when resins employed to prepare the orientation layer as well as liquid crystalline compounds are dissolved, it is possible to retard the diffusion and contamination between layers.

From the viewpoint of the enhancement of adhesion between the cellulose ester film support and the orientation layer, providing a dissolving-out blocking layer, comprising water-soluble polymers such as, for example, organic acid group containing polymers is effective to enhance production advantages.

Listed as organic acid group containing polymers are those having a structure in which the polymer side chain has said organic acid group. However, they are not particularly limited. Listed as organic acid groups is, for example, a —COOH group. Examples of such compounds are not particularly limited. However, listed are, for example, structures represented by General Formulas [1] or [2] described in Japanese Patent Publication Open to Public Inspection No. 7-333436. The hydrogen atom of a —COOH group may be substituted with ammonia, and alkali metal cations (for example, a sodium cation and a lithium cation). Listed as monomer units, which constitute polymers, having an organic acid group, are acrylic acid, methacrylic acid, itaconic acid, maleic acid, fumaric acid and the like. Further, after polymerizing maleic anhydride as the copolymerizable monomer, organic acid groups may be obtained while opening said acid anhydride ring.

Listed as one form of said dissolving-out blocking layer in the present invention is the installment of an actinic ray hardening resinous layer. Ultraviolet rays are preferred as said actinic rays due to ease of the procurement of radiation sources as well as related materials.

Actinic ray hardening resins include those which have at least two polymerizable groups such as a vinyl group, an allyl group, an acryloyl group, a methacryloyl group, an isopropenyl group, an epoxy group, and the like which form a bridge structure or a net structure. Among these active groups, preferred are the acryloyl group, the methacryloyl group or the epoxy group viewed from the aspect of the polymerization rate as well as reactivity, and polyfunctional monomers or oligomers. For example, preferably employed are ultraviolet ray hardening acryl urethane based resins, polyester acrylate based resins, and polyol acrylate based resins.

The UV ray hardenable resin includes a UV ray hardenable acrylurethane resin, a UV ray hardenable polyester-acrylate resin, a UV ray hardenable epoxyacrylate resin, a UV ray hardenable polyolacrylate resin and a UV ray hardenable epoxy resin.

The UV ray hardenable acrylurethane resin can be obtained by reacting a polyesterpolyol with an isocyanate monomer or its prepolymer and then reacting the resulting product with an acrylate having a hydroxy group such as 2-hydroxyethylacrylate, 2-hydroxyethylmethacrylate (hereinafter, the acrylate includes a methacrylate) or 2-hydroxypropylacrylate (Japanese Patent O.P.I. Publication No. 59-151110).

The UV ray hardenable polyesteracrylate resin can be obtained by reacting a polyesterpolyol with 2-hydroxyethylacrylate or 2-hydroxypropylacrylate (Japanese Patent O.P.I. Publication No. 59-151112).

The example of the UV ray hardenable epoxyacrylate resin includes those obtained by reacting an epoxyacrylate oligomer in the presence of a reactive diluting agent and a photoinitiator (Japanese Patent O.P.I. Publication No. 1-105732). The photoinitiator includes a benzoin derivative, an oxime ketone derivative, a benzophenone derivative or a thioxanthone derivative.

The example of the UV ray hardenable polyolacrylate resin includes trimethylolpropane triacrylate, ditrimethylolpropane tetraacrylate, pentaerythritol tetraacrylate, dipentaerythritol pentaacrylate, dipentaerythritol hexaacrylate or alkyl-modified dipentaerythritol pentaerythritol. These resins are usually used with a conventional photoinitiator. The above photoinitiator also works as a photo-sensitizer. The example includes acetophenones, benzophenones, hydroxy benzophenones, Michler's ketone, α-amyloxime esters, and thioxanthones or its derivatives. The photo-sensitizers such as n-butylamine, triethylamine and tri-n-butylphosphine can be used in reaction of epoxyacrylates. The content of the photo-initiator or photo-sensitizer used in the ultraviolet ray hardenable resin composition is preferably 0.5 to 5 parts by weight particularly.

The coating solution of the ultraviolet ray hardenable resin composition is coated through a gravure coater, a spinner coater, a wire bar coater, a roll coater, a reverse-roll coater, an extrusion coater or an air-doctor coater, and the dry coating thickness is preferably 0.05 to 30 μm, and more preferably 0.1 to 15 μm.

Coating solvents of said dissolving-out blocking layer will now be generally described. In order to achieve the objective of the present invention, it is preferable to choose as coating solvents of said dissolving-out blocking layer solvents which hardly dissolve or do not dissolve resins or plasticizers rather than those which dissolve the same.

Said coating solvents are preferably solvent mixtures of at least two organic solvents, which comprise water in an amount of at least 30 percent by weight. Further, the solvent mixture of at least two organic solvents more preferably comprises water in an amount of at least 45 percent by weight. In that case, it is possible to more effectively realize the objective of the present invention. Employed as solvents which are employed together with water, for coating the dissolving-out blocking layer of the present invention, are alcohols, ketones, esters, glycol ethers, and mixtures with other solvents.

It is preferable to select organic solvents which are soluble in water. However, a small amount of solvents, which are insoluble in water, may be employed as follows. Said water-insoluble solvent is employed together with at least one of the water-soluble organic solvent and a mixed solvent may be employed which has dissolved at least three components. Herein, alcohols include methanol, ethanol, n-propyl alcohol, iso-propyl alcohol, n-butanol, 2-butanol, tert-butanol, pentanol, 2-methyl-2-butanol, cyclohexanol, and the like. Ketones include acetone, methyl ethyl ketone, methyl isobutyl ketone, cyclopentanone, cyclohexanone, and the like. Esters include methyl formate, ethyl formate, methyl acetate, ethyl acetate, isopropyl acetate, amyl acetate, ethyl lactate, methyl lactate, and the like. Glycol ethers (having from 1 to 4 carbon atoms) include methyl cellosolve, ethyl cellosolve, propylene glycol monomethyl ether (PGME), propylene glycol monoethyl ether, propylene glycol mono-n-propyl ether, propylene glycol monoisopropyl ether, propylene glycol monobutyl ether, or propylene glycol monoalkyl (having from 1 to 4 carbon atoms). Alkyl ether esters include propylene glycol monomethyl ether acetate, and propylene glycol monoethyl ether acetate. Solvents other than those include methylene chloride, N-methyl pyrrolidone, and the like. However, said organic solvents are not particularly limited to said compounds.

As resins of said dissolving-out blocking layer, nonionic polymers are preferred with respect to the solubility of said solvent mixtures and achieving the objective of the present invention.

It is possible to select resins which are soluble in such mixed solvents as the resins of said dissolving-out blocking layer. The structure of resins of said dissolving-out blocking layer is not particularly limited. For example, it is possible to employ natural polymers as well as semi-synthesized water-soluble polymers.

Further, by employing synthesized polymers, it is possible to make them nonionic in terms of the molecular design, being different from natural products. As such compounds, it is possible to employ many types of synthesized polymers such as homopolymers or copolymers of polyvinyl alcohol, partially acetalized polyvinyl alcohol, poly-N-vinylpyrrolidone, polyvinyl imidazole, polyvinyl pyrazole, and the like.

Further, as synthesized polymers employed in said dissolving-out blocking layer, monomer units described below may be individually employed or employed in copolymers which are specifically soluble in said solvent mixtures. Specific examples of monomers, forming polymers, include acrylic acid esters, methacrylic acid esters, acrylamides, methacrylamides, crotonic acid esters, vinyl esters, maleic acid esters, fumaric acid esters, itaconic acid esters, olefins, styrens, and the like. Specific examples of these monomers include acrylic acid ester derivatives. Listed as substituents of these substituted esters are a methyl group, an ethyl group, a n-propyl group, an isopropyl group, an n-butyl group, a sec-butyl group, an amyl group, a hexyl group, a 2-ethylhexyl group, an octyl group, a tert-octyl group, a dodecyl group, a 2-chloroethyl group, a 2-bromoethyl group, a 4-chlorobutyl group, a cyanoethyl group, a 2-acetoxyethyl group, a dimethylaminoethyl group, a benzyl group, a methoxybenzyl group, a 2-chlorocyclohexyl group, a cyclohexyl group, a furfuryl group, a tetrahydrofurfuryl group, a phenyl group, a 5-hydroxypentyl group, a 2,2-dimethyl-3-hydroxypropyl group, a 2-methoxyethyl group, a glycidyl group, an acetoxyethyl group, a 3-methoxybutyl group, a 2-ethoxyethyl group, a 2-iso-propoxy group, a 2-butoxyethyl group, a 2-(2-methoxy)ethyl group, a 2-(2-butoxyethoxy)ethyl group, an ω-methoxyoligoxyethylene group (the number of repeated units of oxyethylene: n=7, 9, 11, etc.), an ω-hydroxyoligoxyethylene group (the number of repeated units of oxyethylene: n=7, 9, 11, etc.), a 1-bromo-2-methoxyethyl group, a 1,1-dichloro-ethoxyethyl group, and the like, and acrylic acid esters as well as methacrylic acid esters acrylic acid esters are listed which are constituted, employing these substituents.

Further, acrylamide derivatives as well as methacrylamide derivatives include non-substituted acrylamides as well as methacrylamides. Substituents of these substituted amides include a methyl group, an ethyl group, an n-propyl group, an n-butyl group, a tert-butyl group, an n-octyl group, a dodecyl group, a cyclohexyl group, a benzyl group, a hydroxymethyl group, a methoxyethyl group, a dimethylaminopropyl group, a phenyl group, an acetoactoxypropyl group. Listed as N-monosubstitients are a cyanoethyl group and the like. Listed as N,N-disubstituted derivatives are acrylamide derivatives or methacrylamide derivatives having an N,N-diethyl group.

Listed as examples of vinyl esters are vinyl acetate, vinyl propionate, vinyl butyrate, vinyl isobutyrate, vinyl caprate, vinyl chloroacetate, vinyl methoxyacetate, vinyl phenylacetate, vinyl benzoate, vinyl salicylate, and the like.

Further, listed as examples of olefins are dichloropentadiene, ethylene, propylene, 1-butene, vinyl chloride, vinylidene chloride, isoprene, chloroprene, butadiene, 2,3-dimethylbutadiene, and the like.

Listed as styrenes are, for example, styrene, methylstyrene, dimethylstyrene, trimethylstyrene, ethylstyrene, isopropylstyrene, chloromethylstyrene, methoxystyrene, acetoxystyrnene, chlorostyrnene, dichlorostyrene, bromostyrnene, methyl vinylbenzoate, and the like.

Listed as crotonic acid ester are butyl crotonate and hexyl crotonate, and the like.

Further, listed as itaconic acid esters are monomethyl itaconate, dimethyl itaconate, monobutyl itaconate, diethyl itaconate, dibutyl itaconate, and the like.

Listed as fumaric acid esters are, for example, diethyl fumarate, dimethyl fumarate, dibutyl fumarate, and the like.

Listed as example of other monomers are those described below.

Listed as vinyl ketones are, for example, methyl vinyl ketone, phenyl vinyl ketone, methoxyethyl vinyl ketone, and the like.

Listed as hetero ring containing vinyl monomers are N-vinylpyridine, 2- and 4-vinylpyridine, vinylimidazole, vinyloxazole, vinyltriazole, N-vinyl-2-pyrrolidone, and the like.

Listed unsaturated nitrites are acrylonitrile, methacrylonitrile, and the like.

In order to improve adhesion properties, said polymers may comprise in the side chain of said polymers chemically reactive groups such as an unsaturated ethylenic group, an epoxy group, and the like.

In the present invention, it is needed that said it is possible to dissolve said polymers in a mixture of at least two organic solvents comprising water in an amount of at least 30 percent by weight, and preferably in an amount of at least 45 percent by weight. As resins of said dissolving-out blocking layer comprised of polymers exhibiting such dissolving properties, preferred are copolymers containing a ring structure having a hetero atom on the polymer side chain, more preferred are copolymers containing N-vinyl-2-pyrrolidone in an amount of at least 60 percent by weight, and most preferred are homopolymers of N-vinyl-2-pyrrolidone. Further, polyvinyl alcohol is also preferably employed.

The higher molecular weight of resins of said dissolving-out blocking layer is preferred due to their minimum diffusion to the orientation layer as well as to the liquid crystal layer. The number average molecular weight is preferably at least 800,000.

Further, when said polymers are employed to prepare the dissolving-out blocking layer, the dried layer thickness on a transparent resinous substrate is preferably from 0.1 to 15

µm. When the dried layer thickness is excessively thin, dissolving-out blocking properties are occasionally degraded, while said thickness is excessively thick, the presence of the optical compensation film (also called the optically anisotropic body) on the film occasionally results in curling.

Employed as coating methods to apply the organic acid group containing polymer layer, the dissolving-out blocking layer (the layer formed by hardening actinic ray hardening monomers), the orientation layer, and the optically anisotropic layer (the liquid crystal layer) onto the transparent resinous substrate are doctor coating, extrusion coating, slide coating, roll coating, gravure coating, wire bar coating, reverse coating, curtain coating, extrusion coating, or extrusion coating employing a hopper described in U.S. Pat. No. 2,681,294. By employing any of these coating methods, it is possible to carry out coating so as to obtain a dried layer thickness of from 0.1 to 10 µm. It is also possible to adjust said dried layer thickness in accordance with the objective.

Said dissolving-out blocking layer is employed for the purpose of minimizing dissolving-out of additives such as plasticizers, UV absorbers, and the like, from the transparent support. In addition to said purpose, said dissolving-out blocking layer is required to exhibit a function of enhancing the adhesion between said support and the optically anisotropic layer or the orientation layer, and of minimizing peeling. In order to achieve said purposes, the application of a plasma treatment to said transparent resinous substrate is effective. The application of the plasma treatment to said transparent resinous substrate under conveyance makes it possible to carry out a continuous process. Specifically, it is preferable that the film surface undergoes necessary reaction in the presence of reactive gas under an atmospheric pressure without utilizing vacuum.

Reactive gases are not particularly limited, and include oxygen, hydrogen, carbon monoxide, carbon dioxide, nitrogen monoxide, nitrogen dioxide, hydrogen peroxide, ozone, and the like. The plasma treatment, as described in the present invention, refers to the utilization of plasma discharge and the generation of a plasma state utilizing discharge. It is preferably carried out by applying voltage to at least two counter electrodes.

The treatment system, as described in the present invention, refers to a treatment space in which said plasma discharge is carried out under the presence of said reactive gases, and specifically refers to an treatment room isolated from the exterior employing partitions such as walls and the like. In the case of a vacuum plasma discharge treatment which is carried out in said treatment room under a pressure of from 0.007 to 27 hPa near true vacuum, it is necessary to regulate the introduction of said reactive gases. In order to increase the rate of treatment, it is necessary to increase the voltage applied to electrodes. However, when the electric field strength excessively increases, a body to be treated may occasionally be damaged. In such a case, caution should be paid.

Further, as another embodiment, in the case of an atmospheric pressure plasma treatment, which is carried out under an atmospheric pressure or a near atmospheric pressure, inert gases are preferably introduced to the treatment room together with said active gases so as to generate stable discharge. The atmospheric pressure or the near atmospheric pressure, as described herein, refers to a pressure of from 133 to 1,064 hPa, and preferably from 931 to 1,037 hPa.

The inert gases are those which result in no reaction through said plasma discharge, and include argon gas, helium gas, xenon gas, and krypton gas. Of these, argon gas as well as helium gas is preferred. During the atmospheric pressure plasma treatment, the pressure of introduced inert gases is preferably at least 60 percent, which is more than the ratio of active gases so as to stabilize discharge. When applied voltage is increased, it is possible to increase the rate of treatment. However cation is required so that a body to be treated results in no damage.

On the other hand, even in said atmospheric pressure plasma treatment, when plasma is generated utilizing a pulsed electric field, inert gases are not always necessary. Accordingly, it is possible to increase the concentration of reactive gases in said treatment system and to increase the production efficiency.

At that time, pulse shapes are not particularly limited and may exhibit pulse shapes shown in FIGS. (a) through (d) of Japanese Patent Publication Open to Public Inspection No. 10-130851.

FIG. 1 shows a pulse shape employed in the present invention. The ordinate (V) represents pulse voltage, and the abscissa (t) represents time. Rising time and falling time of said pulse voltage are preferably in the range of from 40 ns to 100 µs, respectively. The rising (falling) time, as described herein, refers to time during which, in the pulse shape shown in FIG. 1, voltage starts rising (falling) from the base line and reaches the maximum point (the minimum point). The frequency of pulse electric field is preferably in the range of from 1 to 100 kHz. Time for the application of one pulse electric field is preferably from 1 to 1,000 µs. The time for the application of one pulse electric field, as described herein, refers to the time for the application of the pulse having one pulse shape in FIG. 1. The magnitude of voltage, applied to the electrode, results in electric field strength preferably in the range of from 1 to 100 kV/cm. When the applied voltage is high, the rate of treatment increases. However, when the applied voltage is excessively high, a body to be treated results in damage in the same manner as above.

Further, in at least two counter electrodes employed in said atmospheric pressure plasma treatment, it is preferable to provide a solid dielectric on the counter side. It is also preferable to employ sintered ceramics as said dielectric, and the volume resistivity is preferably at least $10^8$ Ω·cm.

The arrangements of the optical compensation film of the present invention will now be detailed with reference to FIGS. 2 and 3.

It is possible to employ the optical compensation film of the present invention in a TN type TFT liquid crystal apparatus in the various arrangements, as long as it is disposed between the glass of a driving liquid crystal cell or the plastic base material and the polarizing plate. The optical compensation film of the present invention is disposed between the polarizing plate on one surface of said liquid crystal panel and the cell glass or the plastic base material. Further, it is possible to provide said optical compensation film on either the light incident side or the light transmitting side. Though cost increases, said optical compensation film may be disposed on both side.

Further, the optical compensation film of the present invention results in difference in a viewing angle compensation effect, depending on the arrangement direction in the plane, due to the anisotropy in the plane of said optical compensation film. The arrangement method to exhibit said compensation effect is one which realizes the form in which the axis of the maximum refractive index direction of a biaxial support is approximately parallel or approximately orthogonal to the transmission axis of the neighboring polarizing plate. Approximately parallel, as described herein, means that the angle between two of said axes is within ±10 degrees, is preferably within ±3 degrees, and is still more preferably within ±1 degree. Further, approximately orthogonal, as described herein, means that the angle between two of said axes is in the range of from 80 to 100 degrees, is preferably in the range of from 89 to 91 degrees, and is still more preferably in the range of from 89 to 91 degrees. Still further, the approximately parallel arrangement exhibits better compensation effect than the approximately orthogonal arrangement. FIGS. 2 and 3 show typical arrangement methods.

Figure 2:
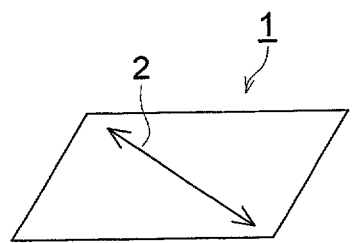
FIG. 2 shows one example of an arrangement form in which the optical compensation film of the present invention is employed.
Figure 2:
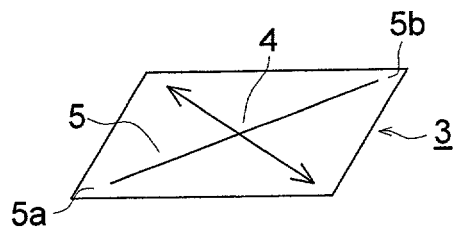
Figure 2:
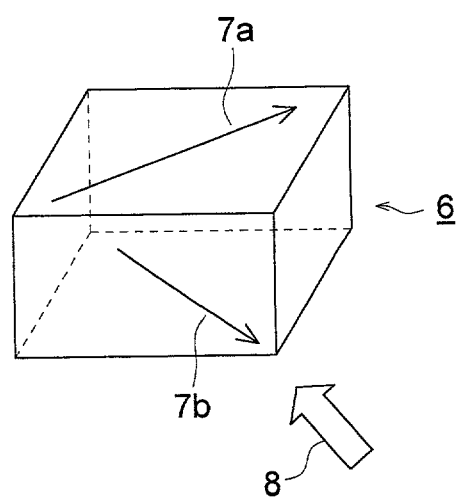
Figure 3:
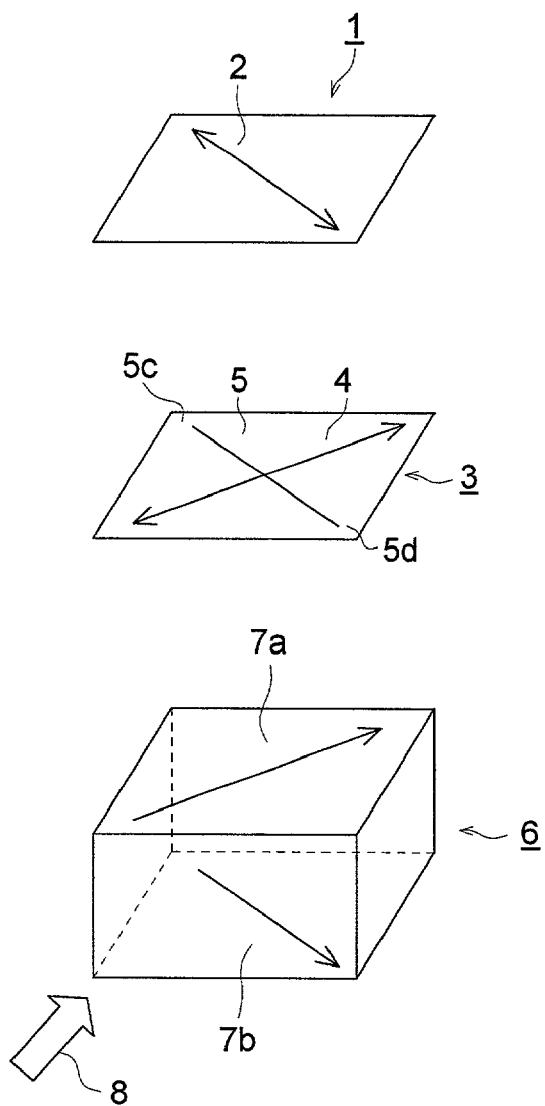
FIG. 3 shows one example of an arrangement form in which the optical compensation film of the present invention is employed.

In FIGS. 2 and 3, on liquid cell 6, optical compensation film 3 is placed, and subsequently, polarizing plate 1 is placed. 7a and 7b are the rubbing axes of a liquid cell, 5 is the rubbing axis of an optical compensation film, 5a and 5b show the rubbing start or end points, 4 shows the maximum refractive index direction of an optically biaxial cellulose ester film support. "2" shows the transmission axis of a polarizing plate.

Since the optical compensation film of the present invention comprises a cellulose ester film support forming thereon a liquid crystal layer, there is distinct difference between the two sides, that is the font and the back. Accordingly, when arranged in a liquid cell (or a liquid crystal panel), improvement effects of the viewing angle varies due to the fact that the surface adjacent to the polarizing plate is on the support side or the liquid crystal layer side.

Specifically, in terms of said improvement effects, it is more preferable that the side of the optically biaxial cellulose ester film support is arranged on the side of the glass of the liquid cell or plastic base material, namely the side of the liquid crystal layer is arranged on the side adjacent to the polarizing plate. However, in the case of reversed front and back, the improvement effects are also noted.

Further, when the relationship between the average direction of the optical axis of each liquid crystal molecule in a liquid crystal layer and the pre-tilt direction of a liquid cell is expressed utilizing the relationship between the rubbing axis of said liquid crystal cell and said pre-tilt angle, the typical configurations described below are preferably used.

First, the following two cases are taken into account and each of them will be described with reference to FIGS. 2, 3, 4, and 5: (1) the projection direction in the plane of the optical compensation film in the average direction of the optical direction of each liquid crystal molecule constituting the liquid crystal layer of an optical compensation film is arranged to be approximately parallel to the rubbing direction on the side of a glass or plastic base material adjacent to a liquid crystal cell, and (2) said axes are arranged to be approximately orthogonal to each other.

Figure 4:
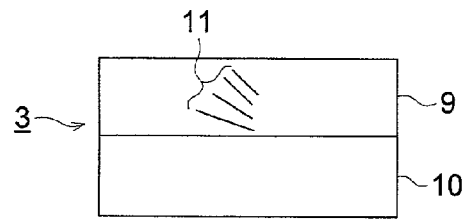
FIGS. 4(a) and 4(b) are cross-sectional views of the optical compensation film installed in a liquid crystal panel.
Figure 4:
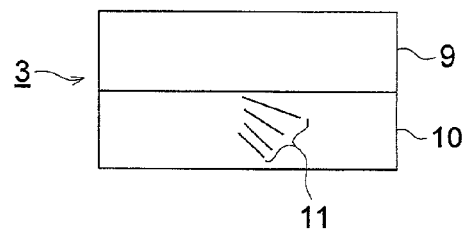

In the case of said (1), when in FIG. 2, the cross-section of said optical compensation film is viewed from the direction of arrow 8, the resultant arrangements are shown as either FIG. 4(*a*) or FIG. 4(*b*).

In FIG. 4(*a*), the rubbing direction in optical compensation film 3 in FIG. 2 is shown as the axis directing from 5b to 5a, while in FIG. 4(*b*), the rubbing direction of the rubbing axis in the optical compensation film in FIG. 2 is shown as the axis directing from 5a to 5b.

In this case, the average tilt angle of entire liquid crystal layer 9 of optical compensation film 3 is commonly from 5 to 85 degrees, is preferably from 20 to 70 degrees, and is still more preferably from 30 to 60 degrees. In each of FIGS. 4(*a*) and 4(*b*), 11 represents orientation configuration. As noted above, said tilt angle may be constant. However, configuration is preferred in which said tilt angle varies continuously or stepwise. Further configuration is acceptable in which said tilt angle increases or decreases toward the air boundary side from the sheet surface side, but the former is preferred.

Figure 5:
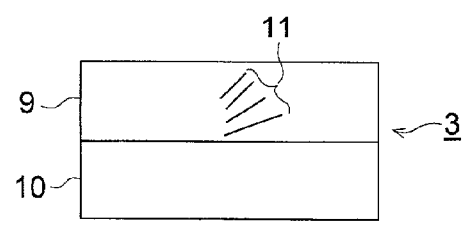
Figure 5:
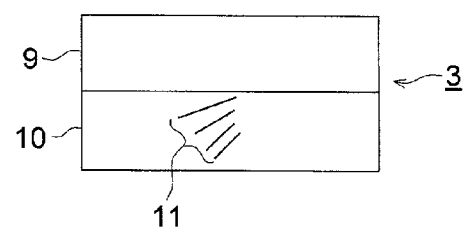

On the other hand, in the case of said (2), when in FIG. 3, the cross-section of the sheet is viewed from the direction of arrow 8, the resultant arrangements are shown as either FIG. 5(*a*) or FIG. 5(*b*).

In FIG. 5(*a*), the rubbing direction in optical compensation film 3 in FIG. 3 is shown as the axis directing from 5c to 5d, while in FIG. 5(*b*), the rubbing direction of the rubbing axis in the optical compensation film in FIG. 3 is shown as the axis directing from 5d to 5c.

In this case, the average tilt angle of the entire liquid crystal layer of said optical compensation film 3 is commonly from 5 to 85 degrees, is preferably from 20 to 70 degrees, and is still more preferably from 30 to 60 degrees. In each of FIGS. 5(*a*) and 5(*b*), 11 represents orientation configuration. As noted above, said tilt angle may be constant. However, configuration is preferred in which said tilt angle varies continuously or stepwise. Further configuration is acceptable in which said tilt angle increases or decreases toward the air boundary side from the sheet surface side, but the former is preferred.

Incidentally, the average tilt angle of liquid crystal layer 9 is determined depending on the orientation layer as well as liquid crystal materials, but may be varied utilizing various factors other than these. Specifically, it is possible to readily control the thickness change of the liquid crystal layer. Generally, the tilt angle tends not to be affected by the orientation limiting force of the boundary surface of the orientation layer as well as the air boundary surface. Therefore, for example, when liquid crystal molecules are in the horizontal state in the intermediate region in the thickness direction, said average tilt angle decreases with an increase in the layer thickness. On the other hand, when liquid crystal molecules are in the perpendicular state in said intermediate region, said tilt angle tends to increase.

The optical compensation film will now be described.

As noted above, the present invention has overcome conventional technical problems, utilizing the optical compensation film which comprises a transparent support, having specified optical characteristics, having thereon a rubbed orientation layer and an optically anisotropic layer which is adjacent to said orientation layer and in which the orientation of liquid crystalline compounds is fixed. Accordingly, through the constitution of the liquid cell itself, it was possible to provide an optical compensation film which exhibited much more improved viewing angle characteristics than before, which were equal to IPS (lateral electric field mode) system as well as VA (perpendicular electric field mode), and an liquid crystal display apparatus employing the same.

The transparent support according to the present invention will now be described.

The transparent support according to the optical compensation of the present invention, as described herein, is the support which exhibits characteristics of transmittance in the visible region of at least 80 percent, and specifically is comprised of cellulose ester derivatives, polyethylene terephthalate, polycarbonates, polyarylates, polysulfone, and the like. Of those noted above, from the viewpoint of the productivity to obtain target optical characteristics, cellulose ester derivatives are preferably employed.

The ratio $R_t/R_o$ of retardation value $R_t$ in the thickness direction to retardation value is preferably from 0.8 to 4.0. And further preferably the optical characteristics, which are required for the transparent support according to the present invention, are, as shown in the aforementioned formulas (a) and (b), that retardation value $R_o$ in the plane direction of said transparent support is from 41 to 95 nm and ratio $R_t/R_o$ of retardation value $R_t$ in the thickness direction to retardation value in the plane direction is from 0.8 to 1.4, and nx>ny>nz is held.

The case of ny=nz results in the conventional uniaxially stretched phase difference plate, which does not results in a sufficient increase in viewing angle, even though the optically anisotropic layer is disposed. The transparent support of the optical compensation of the present invention results in nz value lower than either nx or ny. As a result, by combining said transparent support with said optically anisotropic layer, it is possible to optically compensate birefringent properties specific to the driving liquid crystal cell of a liquid crystal display apparatus.

From the viewpoint of productivity, a preferred production method is that a transparent support solution is cast onto a support (for example, a belt, a drum or the like is employed). Under the condition, under which solvents remain, peeling from said support (the belt or drum) is carried out, and subsequently, the resulting film is stretched during drying. Thus, by allowing the refractive index of said transparent support to hold the relationship described below, it is possible to efficiently produce said cellulose ester film support.

"nx" is the refractive index in the x direction which results in the maximum refractive index in the plane of the transparent support, ny is the refractive index in the y direction in the plane of said support perpendicular to the x direction, nz is the refractive index in the thickness direction of said support, and d is the thickness (in nm) of said support.

Further, in the present intention, it is preferable that the refractive index in the casting direction of a transparent support basically equals to either nx or ny, and the refractive index in the plane direction (the width direction)of said support perpendicular to the casting direction basically equals to either ny or nx.

Basically equal as described herein, means that the difference is within the range of ±4 degrees, and is preferably within the range of ±2 degrees.

It is possible to determine the refractive index of the entire transparent support, employing a common refractometer. After determining the entire refractive index, 3-dimensional indexes are determined at a wavelength of 590 nm at 23° C. and 55 percent relative humidity, employing an automatic birefringence meter KOBRA-21ADH (manufactured by Oji Keisokukiki Co., Ltd.), and subsequently, nx, ny, and nz are calculated. The film thickness is then determined. Thus, it is possible to obtain retardations Ro and Rt.

Preferably employed as resins which satisfy such characteristics are cellulose ester derivatives. Specifically, in order to effectively satisfy $0.5 \leq (R_t/R_o) \leq 2.0$, the degree of acetyl group substitution of cellulose ester is preferably from 2.50 to 2.86. As another embodiment of the present invention, at least two types of cellulose ester having a degree of acetyl group substitution of from 2.40 to 3.00 are employed. In this case, in order to achieve the objective of the present invention, the average degree of acetyl group substitution after mixing is preferably from 2.50 to 2.86. As still another embodiment of the present invention, from the viewpoint of obtaining the effects described in the present invention, it is preferable that at least one type of cellulose ester having a degree of acetyl group substitution of from 2.60 to 3.00, which is employed to prepare said optical compensation film, is mixed with at least one type of cellulose ester having a degree of acetyl group substitution of from 2.40 to 2.60, and cellulose ester having a degree of acetyl group substitution of from 2.50 to 2.86 is employed.

The support, which is prepared as film employing cellulose ester having a degree of acetyl group substitution or an average degree of acetyl group substitution of from 2.50 to 2.86, provides optical characteristics with large difference between the average of refractive indexes on the film plane and the refractive index in the thickness direction. Further, by employing cellulose ester film in which the degree of substitution is controlled to be slightly low, when the same optical characteristics are desired, it is possible to reduce the film thickness compared to the use of cellulose triacetate film having a high degree of acetyl group substitution. It is possible to design the support of the optical compensation film which exhibits excellent viewing angle characteristics, by suitably regulating optical characteristics of the liquid crystal layer as well as of the support, though it is different from the optical compensation properties required for display. The acetyl group substitution or the average degree of acetyl group substitution of the support of the present invention is preferably in the range of from 2.55 to 2.70. When the degree of acetyl group substitution is excessively small, moisture and heat resistance is occasionally degraded. For example, it is possible to carry out synthesis, employing a method described in Japanese Patent Publication Open to Public Inspection No. 10-45804. It is possible to determine the degree of acetyl group substitution, employing a method described in ASTM-D817-96.

The cellulose ester having a degree of acetyl group substitution of from 2.50 to 2.86, as described herein, is the cellulose ester in which the hydroxyl group of cellulose is substituted with an acetyl group to the specified degree of substitution, employing any of conventional methods. In order to obtain preferable mechanical strength, the number average molecular weight of the cellulose ester of the present invention is preferably from 70,000 to 300,000, and is more preferably from 80,000 to 200,000.

The cellulose ester having a degree of acetyl group substitution of from 2.60 to 3.00, as described herein, is the cellulose ester in which the hydroxyl group of cellulose is substituted with an acetyl group to the specified degree of substitution, employing any of conventional methods. In order to obtain preferable mechanical strength, the number average molecular weight of the cellulose ester of the present invention is preferably from 70,000 to 300,000, and is more preferably from 80,000 to 200,000.

The cellulose ester having a degree of acetyl group substitution of from 2.40 to 2.60, as described herein, is the cellulose ester in which the hydroxyl group of cellulose is substituted with an acetyl group to the specified degree of substitution, employing any of conventional methods. In order to obtain preferable mechanical strength, the number average molecular weight of the cellulose ester of the present invention is preferably from 70,000 to 300,000, and is more preferably from 80,000 to 200,000.

Preferably employed as cellulose ester resins are those in which said degree of acetyl group substitution is controlled. On the other hand, it is markedly effective to employ cellulose ester resins having an acetyl group as well as a propionyl group.

Preferred one example of cellulose ester employed to prepare cellulose ester film according to the present invention is one which has an acetyl group as well as a propionyl group as the substituent, and simultaneously satisfies the aforementioned Formulas (1) and (2).

Furthermore, more preferably employed is cellulose ester film which simultaneously satisfies the aforementioned Formulas (3) and (4).

These acyl groups may evenly substitute the 2-position, 3 position, and 6-position of glucose units, while the substation, which results in high frequency, for example, at the 6-pisition, may be carried out.

The degree of substitution, as described herein, is the calculated value in accordance with the measurement and calculation of the degree of acetylation in ASTM-D817-91 (Test Method of Cellulose Acetate, etc.). It is possible to determine the degree of acyl group substitution employing a method based on ASTM-D817-96.

Specifically, the average degree of acetyl group substitution is most preferably less than 2.0, because fluctuation in the phase difference during stretching is minimized.

Further, from the viewpoint of obtaining a cellulose ester film support having excellent mechanical strength, the number average molecular weight of the cellulose ester resin having both acetyl group and propionyl group is commonly from 70,000 to 300,000, and is preferably from 90,000 to 200,000.

Employed as mixed fatty acid esters of cellulose used in the present invention are those which are the same as noted above. Further, employed as cellulose esters and the like synthesized employing cotton linter are those which are the same as noted above.

The thickness of the cellulose ester film support employed in the optical compensation film of the present invention is determined so as to exhibit optical characteristics to improve the viewing angle characteristics of a liquid crystal display. It is possible to control said characteristics depending on the stretching factor and the thickness of a transparent support. The thickness of said cellulose ester film support is preferably from 35 to 250 µm, and is more preferably from 60 µm to 140 µm. When said cellulose ester film support is thinner than the lower limit of said range, it becomes difficult to obtain target optical characteristics. On the other hand, it is thicker than the upper limit of said range, said optical characteristics become more than needed and the viewing angle characteristics of the liquid crystal display are frequently degraded instead.

In the present invention, when the optical compensation film is employed as the polarizing plate protective film, or when said optical compensation film is employed while being adhered to a polarizer adhered with a protective film, it is possible to place said optical compensation film between the liquid cell and the polarizer.

As polarizers, it is possible to utilize those which have conventionally been known in the art. For example, it is possible to employ those which are prepared in such a manner that a film comprised of hydrophilic polymers such as polyvinyl alcohol is processed with dichroism dyes such as iodine and subsequently stretched, and the like.

When the cellulose ester film support of the present invention is comprised of cellulose ester, a method for producing said film will be described.

First, a dope is prepared by dissolving cellulose ester in organic solvents. The concentration of cellulose ester in said dope is from about 10 to about 35 percent by weight.

Employed as organic solvents are non-chlorinated organic solvents such as methyl acetate, ethyl acetate, amyl acetate, acetone, tetrahydrofuran, 1,2-dioxolane, 1,4-dioxolane, cyclohexanone, ethyl formate, 2,2,2-trifluoroethanol, 2,2,3,3-hexafluoro-1-propanol, 1,3-dofluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, and the like. Further, it is possible to use methylene chloride. Lower alcohols such as methanol, ethanol, butanol, and the like are preferably employed in combination, since it is possible to increase the solubility of said cellulose ester to organic solvents and to decrease the viscosity of the resultant dope. Specifically, ethanol is preferred which has a low boiling point and exhibits minimum toxicity.

Into said dope, additives such as said plasticizers, UV absorbers, and the like may be incorporated. Subsequently, the resultant dope is cast onto a support such as a belt or a drum under rotation, dried until the cast dope can be peeled from said support, and then peeled. The peeled film is stretched under a semi-dried state. Subsequently, it is possible to dry the stretched film to almost completely evaporate organic solvents in said film. However, stretching may be carried out after drying. In order to obtain excellent dimensional stability of film, the content of organic solvents in said film is preferably no more than 2 percent by weight, and is more preferably no more than 0.4 percent by weight.

Further, during the production of the support according to the present invention, particularly during casting, in order to improve sliding properties, preferably incorporated into said dope are fine inorganic particles such as, for example, silicon dioxide, titanium dioxide, aluminum oxide, zirconium oxide, calcium carbonate, kaolin, talc, sintered calcium silicate, hydrated calcium silicate, aluminum silicate, magnesium silicate, calcium phosphate, and matting agents such as bridged polymers. Of these, silicon dioxide is preferred, since it is possible to decrease the haze of said film. The average particle diameter of the secondary particle of said fine particles is preferably from 0.01 to 1.0 µm, and the content of said fine particles is preferably from 0.005 to 0.3 percent by weight with respect to the cellulose ester.

Since it is possible to decrease the haze of film, fine particles such as silicon dioxide are preferably subjected to a surface treatment. Listed as preferable organic materials for said surface treatment are halosilanes, alkoxysilanes, silazane, siloxane, and the like. The average diameter of fine particles is the same as fine particles employed for the anti-curling treatment.

Since the optical compensation film of the present invention comprises a support having thereon coatings such as an optically anisotropic layer and the like, said film tends to suffer from curling. Accordingly, in order to maintain functions as the optical compensation film upon overcoming drawbacks due to curling, it is possible to minimize curling by providing an anti-curl layer on the surface of said support opposite the surface on said optically anisotropic layer. Namely, by allowing to have properties which results in curling in such a manner that the surface of said anti-curl layer is placed in the inside of said curling, the degree of curling is balanced. Incidentally, said anti-curl layer is preferably disposed so as to work as the blocking layer. In that case, it is possible to incorporate into the coating composition fine inorganic particles and/or fine organic particles so as to result in a blocking prevention function. Listed as fine inorganic particles may be, for example, silicon oxide, titanium oxide, aluminum oxide, tin oxide, zinc oxide, calcium carbonate, barium sulfate, talc, kaolin, calcium sulfate, and the like. Listed as fine organic particles may be polymethacrylic acid methyl acrylate powders, acryl-styrene based resin powders, polymethyl methacrylate resin powders, silicone based resin powders, polystyrene based resin powders, polycarbonate resin powders, benzoguanamine based resin powders, melamine based resin powders, polyolefin based resin powders, polyester based resin powders, polyamide based resin powders, polyimide based resin powders, polyfluorinated ethylene based resin powders, and the like. These may be added to an anti-curl layer coating composition. Fine particles such as silicon dioxide and the like are preferably subjected to a surface treatment, employing organic materials so as to make it possible to decrease the haze of film. Listed as preferred organic materials for said surface treatment are halosilanes, alkoxysilanes, silazane, siloxane, and the like.

Listed as fine particles of silicon dioxide are Aerosil 200, 200V, R972, R202, OX50, TT600, and the like manufactured by Nippon Aerosil Co., Ltd., and preferably listed are Aerosil R972, R972V, R974, R202, R812, and the like.

Said particles having a volume average particle diameter of from 0.005 to 0.1 µm are preferably added to a resin composition in an amount of from 0.1 to 5 weight parts with respect to 100 weight parts of said resin composition. These fine particles are preferably blended so as to obtain a film haze of no more than 0.5 percent as well as a dynamic fiction coefficient between the front and the back of an optical compensation film of no more than 0.5.

Said fine particles are capable of disposing a layer comprising a resin such as dactyl cellulose. It is also possible to enhance of the strength of said layer employing bridging agents such as isocyanate derivatives.

Anti-curl function is disposed by coating a composition comprising solvents which dissolve or swell resinous film base materials. Employed solvents include those which dissolve or swell said materials, and further occasionally include solvents which do not dissolve the same. The coating composition is prepared by employing these solvents blended in a suitable ratio, depending on the magnitude of curl of a resinous film as well as the type of film, and coating is carried out employing the resultant composition. When the curl minimizing function is to be enhanced, it is effective that the mixing ratio of employed solvents which dissolve or swell said materials is increased, while said ratio of employed solvents which do not dissolve said materials is decreased. Said mixing ratio is preferably in the range of (solvents which dissolve or swell said materials):(solvents which do not dissolve said materials)=10:0 to 1:9. Solvents which dissolve or swell resinous base materials comprised in said mixed composition include, for example, benzene, toluene, xylene, dioxane, acetone, methyl ethyl ketone, N,N-dimethylformamide, methyl acetate, ethyl acetate, trichloroethylene, methylene chloride, ethylene chloride, tetrachloroethane, trichloroethane, chloroform, and the like. Solvents which do not dissolve said materials include, for example, methanol, ethanol, m-propyl alcohol, i-butyl alcohol, n-butanol, and the like.

These costing compositions are applied onto the surface of a resinous film so as to obtain a wet layer thickness of from 1 to 100 µm, and more preferably from 5 to 30 µm, while employing a gravure coater, a dip coater, a reverse coater, an excursion coater, and the like. Resin employed herein include, for example, vinyl based polymers or copolymers such as vinyl chloride/vinyl acetate copolymers, vinyl chloride resins, vinyl acetate resins, vinyl acetate/vinyl alcohol copolymers, partially hydrolyzed vinyl chloride/vinyl acetate copolymers, vinyl chloride/vinylidene chloride copolymers, vinyl chloride/acrylonitrile copolymers, ethylene/vinyl alcohol copolymers, chlorinated polyvinyl chloride, ethylene/vinyl chloride copolymers, ethylene/vinyl acetate copolymers, and the like; cellulose ester based resins such as nitrocellulose, cellulose acetate propionate, diacetyl cellulose, cellulose acetate butyrate, and the like; rubber based resins such as maleic acid and/or acrylic acid copolymers, acrylic acid ester copolymers, acrylonitrile/styrene copolymers, chlorinated polyethylene, acrylonitrile/chlorinated polystyrene/styrene copolymers, methyl methacrylate/butadiene/styrene copolymers, acryl resins, polyvinyl acetal resins, polyvinyl butyral resins, polyester polyurethane resins, polyether polyurethane resins, polycarbonate polyurethane resins, polyester resins, polyether resins, polyamide resins, amino resins, styrene/butadiene resins, butadiene/acrylonitrile resins, and the like; silicone based resins, fluorine based resins, and the like. However, said resins are not limited to these. Cellulose based resins such as diacetyl cellulose are particularly preferred.

The rubbed orientation layer according to the present invention will now be described.

The rubbed orientation layer according to the present invention is disposed on a transparent support and is utilized to fix the orientation of liquid crystalline compounds in said optically anisotropic layer, while being adjacent to said optically anisotropic layer.

Now, a material to compose the alignment layer will be described. Specifically listed are the following resins as well as base boards, though the present invention is not limited to these. For example, listed are polyimides, polyamidoimides, polyamides, polyether imides, polyether ether ketones, polyether ketones, polyketone sulfides, polyether sulfones, polysulfones, polyphenylene sulfides, polyphenylene oxides, polyethylene terephthalate, polybutylene terephthalate, polyethylene naphthalate, polyacetals, polycarbonates, polyallylates, acrylic resins, polyvinyl alcohols, polypropylene, cellulose based plastics, epoxy resins, phenol resins, and the like.

The alignment layer can be obtained in such a manner that after applying any of the aforementioned orientation materials onto a transparent support, and subsequently drying the resultant coating, a rubbing treatment is carried out.

A polyimide layer (preferably polyimide having fluorine atoms), which is widely employed as an LCD alignment layer, is preferred as the alignment layer. It is possible to obtain said layer by applying, onto a transparent support, polyamic acid (for example, LQ/LX Series manufactured by Hitachi Kasei Co., Ltd., and SE Series manufactured by Nissan Kagaku Co., Ltd) and applying thermal treatment to the resultant coating and then rubbing the resultant coated layer.

The aforementioned rubbing treatment may be carried out utilizing a treatment method which is widely employed as an LCD liquid crystal orientation process. Namely, it is possible to employ a method in which orientation is obtained by rubbing the surface of the alignment layer in the definite direction employing paper, gauze, felt, rubber, nylon, polyester fiber, and the like. Commonly, the surface of the alignment layer is rubbed several times employing a cloth prepared by uniformly planted fiber having a uniform length and diameter.

The optically anisotropic layer according to the present invention will now be described.

The optically anisotropic layer according to the present invention comprises liquid crystalline compounds and is subjected to fixation in the state in which said crystalline compounds are oriented, while being adjacent to said rubbed orientation layer.

The thickness of the optically anisotropic layer associated with the optical compensation film of the present invention varies depending on the magnitude of birefringence of liquid crystalline compounds constituting said layer as well as the orientation state of said liquid crystalline compounds for the improvement of the viewing angle characteristics of a liquid crystal display. Said thickness is commonly from 0.2 to 5 µm, and is preferably from 0.4 to 3 µm. When said optically anisotropic layer is thinner than the lower limit, it becomes difficult to obtain the target optical anisotropy. On the other hand when said layer is thicker than the upper limit, the optical anisotropy, which is greater than required, tends to degrade the viewing angle characteristics, and said optical compensation film often results in larger curling tendency as another problem.

It is possible to provide at least one optically anisotropic layer according to the present invention on a cellulose ester film support. Many types of liquid crystal mode are commercially available, and it is possible to design optical characteristics of said optical compensation film which has suitable optical characteristics for display. Further, it is possible to provide a plurality of optical anisotropic layers on a support. When constitution is carried out in such a state that the liquid crystalline compounds incorporated into said optically anisotropic layer are oriented, or the orientation of said liquid crystalline compounds is fixed, it is possible to optionally design suitable optical characteristics for the direction. When at least two optically anisotropic layers are disposed on said cellulose ester film support, it is possible to repeatedly provide a plurality of layers comprised of the orientation layer, and the optically anisotropic layer in the order further from said cellulose ester film support. Since said orientation direction is determined by the orientation layer, it is necessary that said orientation layer is adjacent to the liquid crystal layer. When a plurality of these layers is disposed, it is possible to apply the liquid crystal layer onto the repeatedly applied orientation layer in such a manner that said orientation layer is directly applied onto the liquid crystal layer which has been applied onto the orientation layer, or an intermediate layer comprised of another resinous layer known in the art is disposed, and said orientation is applied thereon.

Since the cellulose ester film support of the present invention exhibits specific optical characteristics, from the viewpoint of cost reduction, it is preferable that the number of liquid crystal layers applied onto said support is one.

The optically anisotropic layer according to the present invention, when viewed from the cross-sectional direction of said optically anisotropic layer, is preferably oblique. The inclination may be constant in the thickness direction of said optically anisotropic layer, and the orientation angle may vary in the thickness direction. In order to compensate the viewing angle of display, the average inclination varies depending on the design of said display, and is preferably from 15 to 50 degrees especially in a TN type liquid crystal display apparatus. The inclination of liquid crystalline compounds constituting said optically anisotropic layer varies more preferably in the thickness direction. In the present invention, it is more effective that said inclination decreases or increases from the side of the orientation layer.

Further, in the present invention, it is preferable that the direction, in which the maximum refractive index direction of said optically anisotropic layer is projected onto the surface of a cellulose ester film support, is basically the same as the ny direction of said cellulose ester film support. Basically the same as the ny direction, as described herein, means that the angle between two axes is within ±2 degrees.

The liquid crystalline compounds according to the present invention will now be described.

The liquid crystalline compounds according to the present invention are not particularly limited, as long as said liquid crystalline compounds can be subjected to orientation. Through said orientation, optical anisotropy is disposed without resulting in light scattering in the visible light region.

When liquid crystalline compounds of the present invention are those of polymers, employed may be compounds having structures which are described in, for example, Japanese Registered Patent Nos. 2592694, 2687035, 2711585, 2660601, and others, and Japanese Patent Publication Open to Public Inspection Nos. 10-186356, 10-206637, 10-333134, and others.

Commonly listed as liquid crystalline compounds except for discotic liquid crystals as well as liquid crystalline polymers are rod-shaped monomeric liquid crystals. From the viewpoint of the fixation of orientation, preferred are liquid crystalline compounds having an unsaturated ethylenic group. For example, employed may be compounds having structures described in, for instance, Japanese Patent Publication Open to Public Inspection Nos. 9-281480, and 9-281481.

The structure of liquid crystalline compounds according to the present invention is not particularly limited. However, it is required that in order to generate the optical anisotropy, the orientation of said liquid crystalline compounds is employed in the state in which liquid crystalline molecules in the oriented state are fixed employing a chemical reaction or temperature difference.

It is preferable that the orientation layer (the orientation film), as noted above, is disposed on a transparent base substrate followed by applying liquid crystalline compounds thereon, and subsequently, an orientation treatment is carried out. Further, it is preferable that the orientation treatment of said liquid crystalline compounds is carried out while heating those at a temperature higher than the liquid crystal transition temperature, and said treatment is carried out at the temperature or lower temperature at which said transparent resinous substrate is not subjected to modification. Further, when the liquid crystalline compounds according to the present inventing are polymer liquid crystals, it is preferable that in order carry out the orientation of said polymer liquid crystals, heat treatment is carried out at higher temperature than the glass transition temperature of said polymer liquid crystals.

Further, when said optically anisotropic layer is prepared by preparing a solution comprised of said liquid crystalline compounds and organic solvents, and coating and drying said solution, it is possible to carry out the orientation treatment of said liquid crystalline compounds at a lower temperature than the liquid crystal transition temperature without hating those to said transition temperature.

When the liquid crystalline compounds according to the present invention are liquid crystalline polymers, listed as the chemical structures are, main chain type liquid crystalline polymers such ads, for example, polyesters, polyimides, polyamides, polyesters, polycarbonates, polyester imides, and the like. Further, employed may be side chain type liquid crystalline polymers such as, for example, polyacrylate, polymethacrylate, polysiloxane, polymalonate, and the like.

In case that liquid containing the liquid crystalline compound is coated, a liquid layer having uniform thickness by removing solvent through drying after the coating. It is possible to fix the orientation of the liquid crystal in the liquid crystal layer through chemical reaction utilizing the action of heat and/or light energy. Specifically, monomeric liquid crystalline compounds, which is not polymer liquid crystalline compounds, generally exhibit low viscosity and the orientation of the resultant liquid crystal tends to vary due to thermal causes. Accordingly, it is possible that the monomeric liquid crystalline compounds are subjected to fixation through hardening reaction such as light radical reaction and the like, employing a photopolymerization initiator.

In the present invention, when the photopolymerization initiator is employed during fixing the orientation, in order to generate radicals, it is possible to employ light sources described below. For example, are preferred light sources such as a high pressure mercury lamp, a metal halide lamp, and the like, which can effectively emits near ultraviolet rays. Those having a maximum molar absorption coefficient of at least 100 are preferred, and those having the same of at least 500 are more preferred. If desired, employed as radiations for photopolymerization may be electron beam, ultraviolet rays, visible light, and infrared rays (heat rays). Generally, however, preferred are ultraviolet rays. Listed as ultraviolet ray emitting sources may be low pressure mercury lamps (such as a bactericidal lamp, a fluorescent light chemical lamp, and a black light), high pressure discharge lamps (such as a high pressure mercury lamp, and a metal halide lamp), and short arc discharge lamps (such as an ultra-high pressure mercury lamp, a xenon lamp, and a mercury xenon lamp).

On the other hand, when polymerization initiators are employed, the following compounds may be listed: for example, azobis compounds, peroxides, hydroperoxides, redox catalysts, and the like, such as potassium persulfate, ammonium persulfate, tert-butyl peroctoate, benzoyl peroxide, isopropyl percarbonate, 2,4-dichlorobenzoyl peroxide, methyl ethyl ketone peroxide, cumene hydroperoxide, dicumyl peroxide, azobisisobutyronitrile, 2,2'-azobis(2-aminodipropane)hydrochloride, or benzophenones, acetophenones, benzoins, thioxanthones, and the like. These are detailed in "Shigaisen Koka System (Ultraviolet Ray Hardening system)", Sogo Gijutsu Center, pages 63 to 146, 1989. Further, for the polymerization of compounds having a epoxy group, generally employed as ultraviolet ray activating cationic catalysts are allyldiazonium salts (such as hexafluorophosphate, and tetrafluoroborate), diallyliodonium salts, VIa Group allylonium salts (such as allylsulfonium salts having an anion such as PFe, AsFe, and SbFe).

In case that the hardening reaction is conducted by employing radical reaction, it is preferable to radiate the actinic rays in the nitrogen circumstances to avoid delaying polymerization reaction due to the existence of oxygen, in view of effective hardening with reduced reaction time and reduced light source.

It is important to select monomeric liquid crystalline compound which is not polymer liquid crystalline compound having reactive group introduced, to hard the liquid crystalline compound employing the reaction. The orientation can be fixed employing the aforementioned hardening reaction.

On the other hand, when liquid crystalline compounds are liquid crystalline polymers, it is unnecessary to fix the orientation of liquid crystals employing hardening reaction, that is the aforementioned chemical reaction. In the temperature range in which an optically anisotropic film is employed without causing problems, for example, when a liquid crystalline polymer has a liquid crystal transition temperature of 90° C. or higher, after applying said liquid crystalline polymer onto an alignment layer, the resultant coating is heated at a temperature within the range of the liquid crystal transition temperature to results in orientation and then cooled to room temperature. By so doing, the orientation of the liquid crystal is maintained.

Further, it is possible to assume such a case that a support is subjected to deformation at a temperature at which the orientation of the liquid crystalline polymer is carried out. The orientation of polymer liquid crystal is fixed by cooling to room temperature, then it is transferred to the support according to the invention by adhesive, and thus the light compensating film can be prepared.

Employed as the dissolving-out blocking layer employed in the present invention may be one which is the same as previously described.

Employed as methods to coat liquid crystalline compounds, orientation materials, organic acid containing polymers, materials constituting the dissolving-out blocking layer, are curtain coating, roll coating, dip coating, spin coating, print coating, spray coating, wire bar coating, slide coasting, and the like, in which, for example, solutions which are prepared by dissolving said liquid crystalline compounds or orientation layer materials are employed. However, coating methods are not limited to these.

For the purpose of improvement of physical properties of the optical compensation film support of the present invention, it is possible to employ plasticizers. Preferably employed as specific plasticizers are phosphoric acid esters or carboxylic acid esters. Representative phosphoric acid esters include triphenyl phosphate (TPP), tricresyl phosphate (TCP), biphenyl-diphenyl phosphate, and dimethyl ethyl phosphate. Representative carboxylic acid esters include phthalic acid esters and citric acid esters. Examples of employed phthalic acid esters include dimethyl phthalate (DMP), diethyl phthalate (DEP), dibutyl phthalate (DBP), dioctyl phthalate (DOP), diethyl hexyl phthalate (DEHP), ethyl phthalyl ethyl glycolate, and the like. Employed as citric acid esters are acetyl trimethyl citrate (OACTE) and acetyl tributyl citrate (OACTB). Preferably employed as examples of other carboxylic acid esters are butyl oleate, methyl acetyl ricinoleate, dibutyl sebacate, and various types of trimellitate acid esters. Further, preferably employed are phosphoric acid based plasticizers (TPP, TCP, biphenyl-diphenyl phosphate, and dimethyl ethyl phosphate), and phthalic acid ester based plasticizers (DMP, DEP, DBP, DOP, and DEHP).

Of these, triphenyl phosphate (TPP), as well as ethyl phthalyl ethyl glycol, is most preferably employed.

Said plasticizers are important elements to provide water resistance to transparent resins as well as to improve the moisture permeability of the same. However, when the added amount is excessively large, problems occur in which a coated layer is more adversely affected. Further, the added amount of said plasticizers is preferably from 2 to 15 percent by weight in said transparent resins.

By incorporating UV absorbers into said transparent resins, it is possible to obtain an optical compensation film resulting in excellent light fastness. Useful UV absorbers for the present invention include salicylic acid derivatives, benzophenone derivatives, benzotriazole derivatives, benzoic acid derivatives, organic metallic complex salts, and the like. Specific examples are not particularly limited. For example, listed as salicylic acid derivatives may be phenyl salicylate, 4-t-butylphenyl salicylate, and the like; as benzophenone derivatives may be 2-dihydroxybenzophenone, 2-hydroxy-4-methoxybenzophenone, and the like; as benzotriazole derivatives may be 2-(2'-hydroxy-5'-methylphenyl)benzotriazole, 2-(2'-hydroxy-3'-5'-dibutylphenyl)-5-chlorobenzotriazole, and the like; as benzoic acid derivatives may be resorcinol-monobenzoate, 2',4'-di-t-butylphenyl-3,5-t-butyl-4-hydroxybenzoate, and the like; as organic metallic complex salts may be nickel bis-octylphenylsulfamide, ethyl-3,5-di-t-butyl-4-hydroxybenzyl phosphoric acid nickel salts, and the like. In the present invention, it is preferable that at least one type of UV absorber is employed. At least two different types of UV absorbers may be incorporated. Further, polymer UV absorbers may be employed, which are exemplified, for example, in Japanese Patent Publication Open to Public Inspection No. 6-148430. From the viewpoint of the ultraviolet ray absorbing shape and retaining properties, UV absorbers which are preferably employed are those having excellent absorbing capability of the ultraviolet rays in wavelengths of shorter than 370 nm from the point of minimizing the degradation of liquid crystals and minimum absorption of the visible light having a wavelength of 400 nm or longer from the point of excellent liquid crystal display properties. Specifically, it is required that transmittance at a wavelength of 370 nm be no more than 10 percent. Further, said transmittance is preferably no more than 5 percent, and is more preferably no more than 2 percent. From such a viewpoint, benzotriazole derivatives or benzophenone derivatives are preferably employed.

Methods for adding UV absorbers are as follows. Said UV absorbers are dissolved in organic solvents such as alcohol, methylene chloride, dioxolan, and the like, and subsequently added to a dope, or said UV absorbers may be added directly to a dope. Materials such as organic powders, which are insoluble in organic solvents, are dispersed into a mixture of organic solvents and cellulose ester, employing a dissolver or a sand mill, and subsequently added to said dope.

An anti-curl layer may be applied to a resinous film base martial before or after the optically anisotropic layer is applied to the opposite side of said resinous film base material. However, when said anti-curl layer is employed so as to work as the blocking minimizing layer, it is preferable that said anti-curl layer is first applied.

In order to minimize optical modification due to abrasion and the like, a protective layer may be disposed on the liquid crystal layer of the optical compensation film of the present invention. When said liquid crystal layer is comprised of a plurality of layers, an intermediate layer may be disposed. Listed as materials of said protective layer as well as said intermediate layer may be polymethyl methacrylate, acrylic acid/methacrylic acid copolymers, styrene/anhydride maleimide copolymers, polyvinyl alcohol, poly(N-methylolacrylamide), styrene/vinyltoluene copolymers, nitrocellulose, polyvinyl chloride, chlorinated polyolefin, polyester, polyimide, vinyl acetates/vinyl chloride copolymers, ethylene/vinyl acetate copolymers, polyethylene, polypropylene, and polycarbonates, or polymers of acrylates, methacrylates, and the like, and derivatives thereof. The solution of any of these is prepared, coated employing any of coating methods noted above, and subsequently dried.

When a layer is disposed on the cellulose ester film support of the optical compensation film, it is possible to coat a solution which is prepared by dissolving the constituting materials in solvents. From the viewpoint of obtaining a uniformly coated layer, the production method, as noted above, is preferable. Said solvents may be employed individually or in combination of two or more types of solvent to control drying properties during coating. Solvents of said solution for coating are preferably organic solvents. Listed as alcohols are, for example, methanol, ethanol, n-propyl alcohol, iso-propyl alcohol, n-butanol, 2-butanol, tert-butanol, pentanol, 2-methyl-2-butanol, cyclohexanol, and the like. Ketones include acetone, methyl ethyl ketone, methyl isobutyl ketone, cyclopentanone, cyclohexanone, and the like. Esters include methyl formate, ethyl formate, methyl acetate, ethyl acetate, isopropyl acetate, amyl acetate, ethyl lactate, methyl lactate, and the like. Glycol ethers (having from 1 to 4 carbon atoms) include methyl cellosolve, ethyl cellosolve, propylene glycol monomethyl ether (PGME), propylene glycol monoethyl ether, propylene glycol mono-n-propyl ether, propylene glycol monoisopropyl ether, propylene glycol monobutyl ether, or propylene glycol monoalkyl (having from 1 to 4 carbon atoms). Alkyl ether esters include propylene glycol monomethyl ether acetate, and propylene glycol monoethyl ether acetate. Solvents other than those include methylene chloride, N-methyl pyrrolidone, and the like. However, said organic solvents are not particularly limited to these compounds.

It is possible to produce the cellulose ester film support according to the present invention, employing the same method as for producing the aforementioned cellulose ester film support.

It is preferable that the cellulose ester film support according to the present invention be subjected to a stretching operation. Said stretching method will now be described hereunder.

During the production of the cellulose ester film support of the present invention, a cellulose ester dissolved dope is cast onto a casting support, and subsequently, the resulting web is peeled from said casting support. At that time, it is possible to obtain the residual solvent amount in the peeled web (film), employing the aforementioned formula which is used to obtain said residual solvent amount.

When the stretching factor is excessively small, it is difficult to obtain sufficient phase difference, while if it is excessively large, it becomes difficult to carry out stretching, and film breakage occasionally occurs. The stretching factor is more preferably in the range of from 1.0 to 2.5.

When a film, which is produced by casting a solution comprising the cellulose ester according to the present invention, contains residual solvents in an amount of the specified range, it is possible to stretch it without application of heat. Thus, stretching is preferably carried out during drying, because overall processing is shortened. However, when the temperature of the web is excessively high, plasticizers are sublimed. As a result, a range of from 15 to 160° C. is preferred.

Further, biaxial stretching, in which the stretching directions are orthogonal to each other, is an effective method so that film refractive indexes nx, ny, and nz are included in the range of the present invention. For example, in the case of stretching a film in the casting direction, when the contraction in the width direction is excessively large, nz becomes excessively large. In this case, it is possible to decrease nz by minimizing the contraction in the width direction or carrying out stretching in said width direction. In the case of stretching in the width direction, the refractive index occasionally results in non-uniform distribution across the width. Said non-uniform distribution of refractive index occurs when a tenter method is utilized. This phenomenon occurs in such a manner that stretching in the width direction results in a contraction force in the central area of the stretched film while the film edges are fixed. This phenomenon is assumed to be the same as a so-called Boing phenomenon. Even in this case, it is possible to minimize the Boing phenomenon by carrying out stretching in the casting direction and to improve the non-uniform phase difference distribution across the width.

The optical characteristics, which are required for the cellulose ester film support of the optical compensation film of the present invention, are obtained employing a method in which after drying a film, said film is heated at a higher temperature than the glass transition temperature of the film resins, stretched, and cooled to the lower temperature than said temperature, or a method in which without heating said film at a higher temperature than said glass transition temperature, a film is swelled employing solvents such as, for example, water/acetone=1/1 (in weight ratio) which swell said film, and the film in the swelled state can be stretched. However, in these stretching methods, caution is required. Namely, when a film is heated at a higher temperature than the glass transition temperature, plasticizers in the film may be melted out to the film surface. In the method in which when a film in the swelled state is stretched, plasticizers may be dissolved out depending on the types of solvents employed for said swelling. Therefore, it is most preferable that during film casting employing the solution casting method, stretching is carried out under the presence of residual solvents during drying.

When the optical compensation film of the present invention is subjected to mass-production, due to the reasons described below, it is preferable that the aforementioned various types of conditions, during casting, are regulated so that the refractive index in the width direction of the cellulose ester film, cast on a casting support, reaches the maximum value.

As noted above, the optically biaxial cellulose ester support according to the present invention is constituted so that film refractive indices nx, ny, and nx satisfy the relationship of nx>ny>nz. In the present invention, "the refractive index in the width direction reaches the maximum" means that refractive index nx in the width direction reaches the maximum.

The integration of the optical compensation film with the polarizing plate results in easer handling. Methods for said integration with the polarizing plate are not particularly limited, and the method for preparing the polarizing plate adhered with the phase difference plate is generally accepted. One of these arrangements, which most efficiently exhibit the effects of the present invention, is that adhesion is continuously carried out employing the optical compensation film of the present invention and said polarizing plate in the form of a long-roll film. "Long", as described in the present invention, means at least 100 m, preferably at least 1,000 m, and more preferably from 1,000 to 5,000 m.

In this case, it is preferable that the refractive index maximum direction of the transparent support and the light transmission axis direction of said polarizing plate are the same as the width direction of each of said long-roll films.

After continuously carrying out said adhesion employing the film rolls, the resulting adhered film is cut into a shape matching the size of a common TN mode liquid crystal cell panel (specifically, rectangular pieces with the required size are cut out with an angle of 45 degrees in the machine direction of said long film). As a result, it is possible to obtain the polarizing plate integrated with the optical compensation film under high production efficiency.

Polarizing plate of the present invention comprises a polarizer and an optical compensation film of the present invention. The Further, besides the method in which the optical compensation film of the present invention is adhered to the previously prepared polarizing plate, it is possible to directly prepare the polarizing plate of the present invention by employing the optical compensation film of the present invention as the support of the polarizer. For example, when a transparent support, comprised of cellulose ester, is integrated with a polarizer by arranging said transparent support on said polarizer side and a liquid crystal layer on the exterior side, it is possible to employ said cellulose ester instead of a cellulose ester (for example, cellulose triacetate) which is employed to prepare a common polarizing plate support.

In this case, it is preferable that adhesion is carried out so that the light transmission axis of the polarizer, comprising dichroic materials, is approximately parallel to the casting direction in the width direction during casting of optically biaxial cellulose ester films. Incidentally, "being orthogonal to each other", as described in the present invention, means that as noted above, axes are approximately orthogonal to each other. Further, "directions are the same", as described herein, means that the angle between said axes is within ±10 degrees, is preferably within ±3 degrees, and is more preferably within ±1 degree.

It is possible to obtain a liquid crystal display apparatus in such a manner that adhesion is carried out so that the optical compensation film of the present invention is disposed between the polarizer of a polarizing plate and the liquid crystal cell, and the rubbing axis direction of the substrate surface adjacent to said liquid crystal cell is orthogonal to the transmission axis (herein, the stretching direction of the polarizer is orthogonal to the light transmission axis) of said polarizing plate.

The polarizing plate of the present invention as well as the liquid crystal display apparatus will now be described.

Employed as polarizers employed in the polarizing plate of the present invention may be those conventionally known in the art. For example, a film comprised of a hydrophilic polymer such as polyvinyl alcohol, which is treated with dichroic dyes such as iodine and stretched, and a plastic film such as vinyl chloride, which is subjected to treatment and orientation, are employed. The polarizer, obtained as above, is laminated with a cellulose ester film.

At that time, it is necessary that at least one of said cellulose ester films is of the present invention. Cellulose triacetate (TAC) film, which has been employed as the support for the polarizing plate conventionally known in the art, may be employed to be laminated to the surface of other polarizers. However, in order to obtain the maximum effects described in the present invention, it is preferable that the cellulose ester film of the present invention is employed as all cellulose ester films which constitute said polarizing plate.

Further, said polarizing plate is constituted in such a manner that the compensation film of the present invention is laminated onto at least one side of the polarizer. When laminated onto only one side, it may be possible to use either the cellulose ester film support according to the present invention, having no coated liquid crystal layer on the other side, other transparent supports, or TAC (triacetate) film.

The polarizing plate, obtained as above, is disposed on either one side or on both sides of the liquid crystal cell. When disposed on one side, it is possible to obtain the liquid crystal display apparatus of the present invention by adhering the optical compensation film of the present invention to the place which is nearer the liquid crystal cell with respect to the polarizer.

The liquid crystal display according to the present invention comprises a first polarizing plate, liquid crystal cell and a second polarizing plate which is provided at a side closer to viewer side than the side of the first polarizer and the liquid crystal cell. The liquid crystal display further comprises an optical compensating film of the invention between the first polarizing plate and the liquid crystal cell, or between the second polarizing plate and the liquid crystal cell.

The preferable embodiment of the liquid crystal display is described below.

It is preferable that the liquid crystal display comprises the optical compensating film of the invention between the first polarizing plate and the liquid crystal cell, or between the second polarizing plate and the liquid crystal cell.

The optical compensating film is provided in such way that the support of the optical compensating film is faced to the liquid crystal cell. In another way, it is preferable that the optical compensating film is provided in such way the rubbing direction of the liquid cell at a side closer to the optical compensating film is crossing orthogonally or almost orthogonally to the direction giving maximum index of the refraction of the support. Further, it is also preferable that rubbing direction of the liquid crystal cell closer to the optical compensating film is same or almost same as the rubbing direction of the optical compensating film.

Generally, an upper polarizer is disposed in the upper part of a pair of substrates positioned on both sides of the driving liquid cell, and a lower polarizer is disposed in the lower part of the same. In such an arrangement, at least one optical compensation film of the present invention is disposed between said substrate and the upper side polarizer or between said substrate and the lower side polarizer. In order to reduce cost as well as to effectively achieve the objective of the present invention, it is preferably that one optical compensation film of the present invention is disposed in each space of said upper side and lower side.

When the liquid crystal display apparatus is specifically the twisted magnetic type (TN type) liquid crystal display apparatus, it is possible to effectively achieve the objective of the present invention in such a manner that said optical compensation film is adhered in the direction in which the surface of the cellulose ester film support of said optical compensation film comes into contact with the substrate nearest the TN type liquid crystal cell, and adhesion is carried out in the direction in which the maximum refractive index direction in the plane of the cellulose ester film support of said optical compensation film is basically orthogonal to the orientation direction of the nematic liquid crystal of the substrate nearest said liquid crystal cell. Basically orthogonal, as described herein, refers to 90±5 degrees. However, it is preferable that 90 degrees be achieved.

Preferred arrangements of the optical compensation film of the present invention will now be described with reference to FIGS. 6, 7 and 8.

When the optical compensation film of the present invention is disposed between the glass substrate of the driving liquid crystal cell or the plastic substrate and the polarizer, it is possible to use said optical compensation film under various arrangement in the TN type TFT liquid crystal apparatus.

The optical compensation film of the present invention is disposed between each polarizer on both sides of said liquid crystal panel and the cell glass or the plastic substrate. It is also possible to dispose said optical compensation film on either the light incident side or the light releasing side. Further, one or at least two optical compensation films may be disposed on one side in the same manner as above.

Further, the method for disposing the optical compensation film, which effectively achieves the objective of the present invention is as follows: Said optical compensation film is disposed in such a direction that the surface of the transparent support of said optical compensation film comes into contact with the rubbing direction of the substrate nearest said driving liquid cell and preferably, the maximum refractive index direction is basically orthogonal to the rubbing direction which comes into contact with the substrate nearest said liquid crystal cell. Basically orthogonal, as described herein, means that the angle between each of said items and the standard direction is in the range of from 80 to 100° C., preferably from 87 to 93 degrees, and more preferably from 89 to 91 degrees. However, 90 degrees is substantially preferred.

Figure 6:
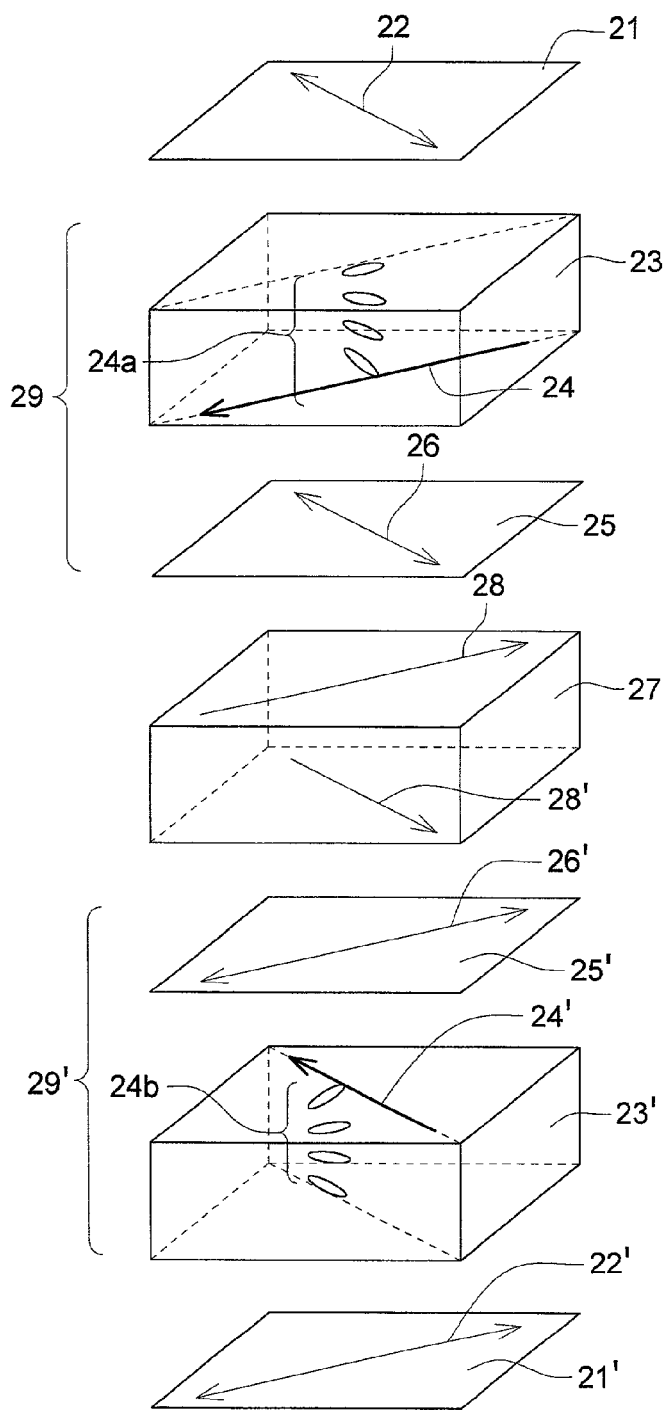
FIG. 6 is a conceptual view showing one example of a liquid crystal display in which the optical compensation film of the present invention i s installed.
Figure 7:
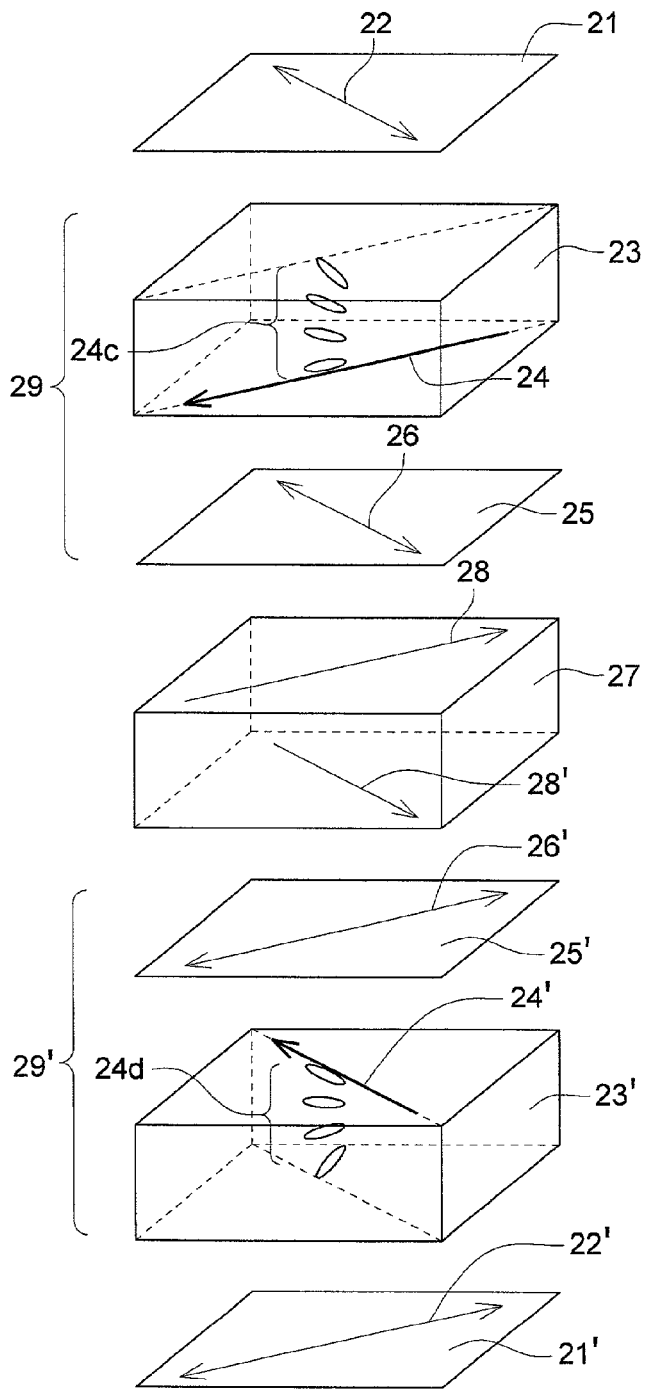
FIG. 7 is a conceptual view showing one example of a liquid crystal display in which the optical compensation film of the present invention is installed.
Figure 8:
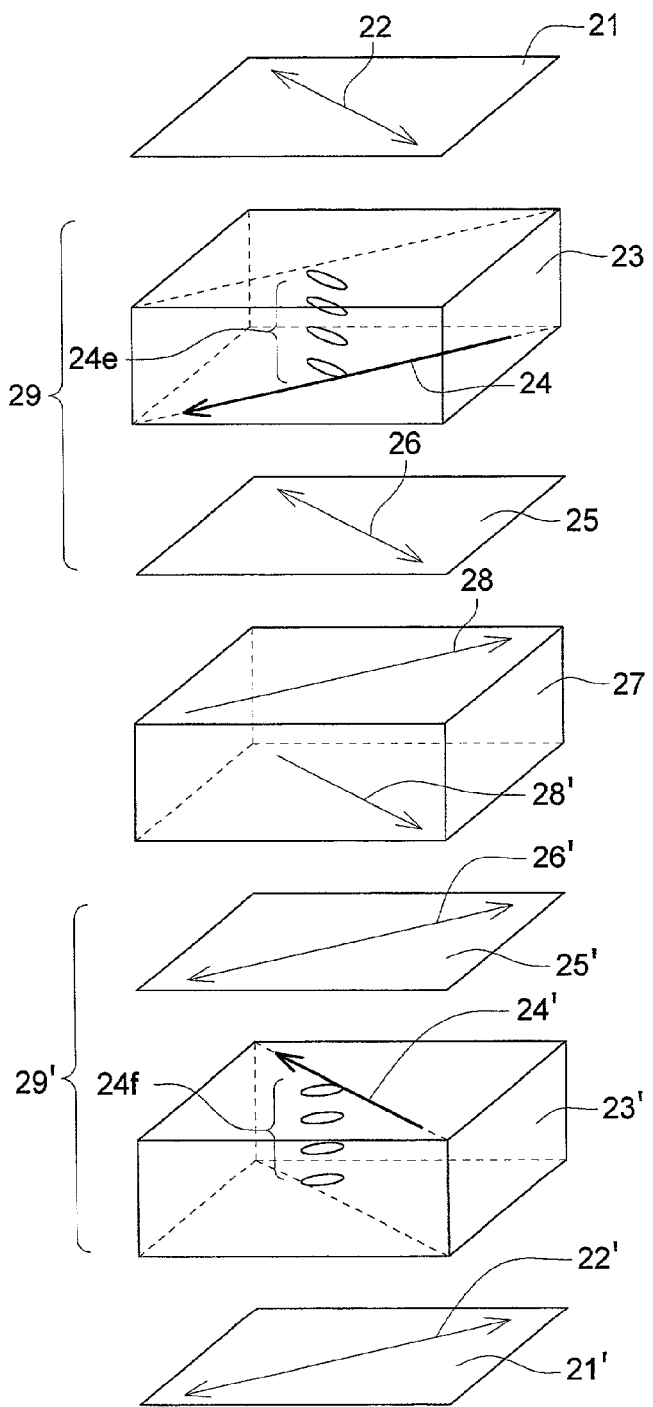
FIG. 8 is a conceptual view showing one example of a liquid crystal display in which the optical compensation film of the present invention is installed.

FIGS. 6, 7, and 8 are schematic views showing one example of a liquid crystal display in which the optical compensation film of the present invention is disposed.

In FIGS. 6, 7, and 8, optical compensation films 29 and 29' are disposed above and below liquid cell 27, and polarizer 21 and 21' are installed. 28 and 28' show the rubbing direction and tilt direction of the liquid crystal cell. 24 and 24' show the orientation direction of liquid crystalline compounds of the optically anisotropic layer. 24a and 24b are schematic views of the tilt direction of liquid crystalline compounds of the optically anisotropic layer. As shown in FIGS. 6, 7, and 8, effects are exhibited either in the case in which the tilt angle of the optical compensation film continuously varies in the thickness direction, or in the case in which said tilt angle is constant.

Specifically, it is effective that the tilt angle of the side of the transparent support of the optically compensation film is greater than the tilt angle of the air boundary surface during the production of the optically anisotropic layer, and the tilt angle continuously varies in the thickness direction as shown in the schematic view of the liquid crystalline compounds of FIG. 24a and 24b. It is more effective that in the arrangement of the optical compensation film, the side of the transparent support is the side of the liquid cell substrate. 24 and 24', orientation directions of liquid crystalline compounds of optically anisotropic layer, are directions in which said liquid crystalline compounds are projected onto the support surface. It is demanded that these directions are basically orthogonal to each of maximum refractive index directions 26 and 26' in the plane of the adjacent transparent support. Basically orthogonal, as described herein, is the same as noted above. In this optical compensation film, the dissolving-out blocking layer, the optical orientation layer, the plasma treatment of the transparent support, the organic acid group containing polymer layer, and the like are optimally disposed. However, these are not shown in Fib. 6. The layer configuration of the optical compensation film is detailed in examples. The objective of the present invention is the arrangement in which the constitution, shown in FIG. 6, is most effectively realized.

As shown in FIG. 6, the optical compensation film of the present invention is disposed between the polarizer and the driving cell. The polarizer may be replaced with a polarizing plate which is prepared by adhering TAC film as the polarizing plate protective film on both sides of said polarizer, and said polarizing plate may be disposed in said position. The optical compensation film of the present invention may be employed instead of the polarizing plate protective film on the side of the driving cell of the polarizing plate protective film.

EXAMPLES

The present invention will now be detailed with reference to examples.

Example 1

<<Preparation of Optical Compensation Films 1A and 1B>>

Each of Optical Compensation Films 1A and 1B was prepared as described hereunder.

<<Preparation of Cellulose Ester Film Support "a1">>

Charged into a tight-sealed vessel were 100 weight parts of cellulose acetate propionate having a degree of acetyl group substitution of 2.00, a degree of propionyl substitution of 0.80, and a viscosity average degree of polymerization of 350, 5 weight parts of ethylphthalyl ethyl glycolate, 3 weight parts of triphenyl phosphate, 290 weight parts of methylene chloride, and 60 weight parts of ethanol, and the resultant mixture was heated while slowly stirred. Then, dissolution was carried out while being heated to 45° C. over 60 minutes. Interior pressure of said vessel became 1.2 atmospheric pressures. The resultant dope was filtered employing Azumi Filter Paper No. 244, manufactured by Azumi Roshi Co., Ltd. Afterward, the filtered dope was kept at a still state for 24 hours to allow bubbles to dissipate. Further, separately, 5 weight parts of said cellulose acetate propionate, 6 weight parts of Tinuvin 326 (manufactured by Ciba Specialty Chemicals Co., Ltd.), 4 weight parts of Tinuvin 109 (also manufactured by Ciba Specialty Chemicals Co., Ltd.), 5 weight parts of Tinuvin 171 (again manufactured by Ciba Specialty Chemicals Co., Ltd.) were mixed with 94 weight parts of methylene chloride, and 8 weight parts of ethanol were mixed and dissolved while stirring, whereby a UV absorber solution was prepared. Then, blending was carried out at a ratio of 100 weight parts of said dope to 2 weight parts of said UV absorber solution. After sufficiently mixing the resultant blend employing a static mixer, the resultant dope maintained at 30° C. was cast onto a stainless steel belt from a die. Subsequently, drying was carried out for one minute on said belt of which back surface was subjected to temperature regulation through contact of 25° C. heated water. Thereafter, chilling was carried out for 15 seconds on said belt of which back surface came into contact with 15° C. chilled, and peeling from said belt was then carried out. The residual solvent in the web during peeling was 100 percent by weight. Subsequently, both edges of the peeled web were clipped employing a simultaneous biaxially stretching tenter, and by simultaneously varying the distance between the clips in the width direction as well as in the casting direction (in the length direction), stretching was carried our at 120° C. by a factor of 1.65 in the width direction and by a factor of 1.1 in the casting direction (in the length direction). After stretching, the resultant film was temporarily cooled to 80° C. Afterward, said film was stretched at 130° C. by a factor of 1.1 in the length direction, employing rollers rotated at different circumferential speeds. The resultant film was dried at 130° C. for 10 minutes while being roller-conveyed, whereby a 100 μm thick cellulose ester film (Cellulose Ester Film Support "a1") was obtained.

Said Cellulose Ester Film Support "a1" was wound onto a 200 mm diameter and 1 m wide glass fiber reinforced resin core, to form a 1,000 m long film roll, utilizing a taper tensioning method. During said winding, knurling treatment was carried out by forcedly contacting the film edge with an embossing ring kept at 250° C., whereby close contact of said film is minimized.

Samples were obtained from the central area in the film width direction of the obtained roll film. Refractive index nx in the lagging phase axis direction, refractive index ny in the leading phase axis direction, and refractive index nz in the thickness direction were determined as described below, and $R_o$ and $R_t$ were calculated employing formulas also described below, whereby at said central area, values of 84.0 nm and 175 nm were obtained, respectively.

$$R_o = (nx - ny) \times d$$

$$R_t = [(nx+ny)/2 - nz] \times d$$

wherein "d" represents the thickness (in nm) of the film. Further, it was found that the delayed phase axis direction of each sample was within the range of 1.6 degrees with respect to the film width direction.

Three-dimensional refractive indices were obtained at 25° C. and 55 percent relative humidity, employing an automatic birefringence meter KOBRA-21ADH (manufactured by Oji Keisokukiki Co., Ltd.), and values for refractive indices nx, ny, and nz were obtained. Further, the moisture content was determined employing the method described below, resulting in 1.8 percent.

<<Method for Measuring Moisture Content>>

Said cellulose ester film sample was cut into 10 cm² pieces, and was set aside under 23° C. and 80 percent relative humidity for 48 hours. Thereafter, the weight was measured and was termed "W1". Subsequently, after said film sample was subjected to heating and drying treatment at 120° C. for 45 minutes, the weight was again measured and was termed "W2". The moisture content at 23° C. and 80 percent relative humidity was determined by the calculation formula below, employing each of the two measurement values.

$$\text{Moisture content (in percent)} = [(W1 - W2)/W2] \times 100$$

<<Preparation of Orientation Layer A>>

Subsequently, an orientation layer was applied onto Cellulose Ester Film Support "a1" employing the method described below and said orientation layer was prepared as described below.

(Preparation of Orientation Layer "A")

A thin gelatin layer (at a thickness of 0.1 μm) was applied onto said Cellulose Ester Film Support "a1", and onto the resulting gelatin layer applied was a methanol/water=1:4 solution of straight chain alkyl modified polyvinyl alcohol (MP203, manufactured by Kuraray Co., Ltd.), employing a #3 wire bar. After drying the coating, employing heated air at 80° C., a rubbing treatment was carried out in the direction which is orthogonal to the direction of the maximum refractive index of Cellulose Ester Film Support "a1", whereby an orientation layer was formed. The resultant layer was designated as Orientation Layer "A".

(Preparation of Orientation Layer "B")

A thin gelatin layer (at a thickness of 0.1 μm) was applied onto said Cellulose Ester Film Support "a1", and onto the resulting gelatin layer, applied was an alkyl modified polyvinyl alcohol having the structure shown below: methanol/water=1:4 solution, employing a #3 wire bar. After drying the coating, employing heated air at 65° C., a rubbing treatment was carried out in the direction which is orthogonal to the direction of the maximum refractive index of Cellulose Ester Film Support "a1", whereby an orientation layer was formed. The resultant layer was designated as Orientation Layer "B".

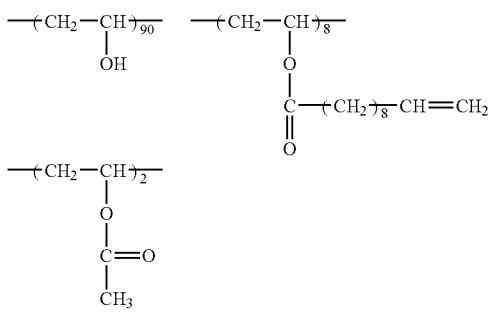

Incidentally, regarding the direction of the optical compensation film which has been subjected to a rubbing treatment, when an orientation layer applied support is viewed from the surface of the orientation layer, the linear rubbing direction is regarded as the +direction of the Y axis, and the X axis, which is orthogonal to said Y axis, is arranged within the support surface, and the resultant arrangement is determined as the standard one. Thereafter, when the plane direction of the surface of said optical compensation film is specified, the rubbing direction is determined as the standard, unless otherwise specified.

Characteristics of Orientation Films "A" and "B", as well as orientation characteristics of liquid crystalline compounds obtained by the combination of liquid crystalline compounds were determined employing the steps described below.

Each orientation layer (each type of A and B) and each of Solutions LC-1 and LC-2 described below were combined, and characteristics of each orientation layer were examined. It was found that regarding liquid crystalline properties of liquid crystalline compound solutions LC-1 and LC-2, each formed an enantiotropic nematic layer.

Orientation characteristics were examined employing the methods described below. Each orientation treatment was applied to an orientation layer-coated slide glass. After applying solutions LC-1 and LC-2 onto said orientation layer, solvents were removed by drying, whereby said orientation layer was adjusted to be anti-parallel. Further, employing a hot stage, an orthoscope image and a conoscope image were observed in the liquid crystal temperature range. Further, the average tilt angle when an anti-parallel treatment was carried out, was determined employing an automatic birefringence meter.

Further, samples were prepared in which the orientation layer comprised of liquid crystalline compounds was formed on only one surface by applying Solutions LC-1 and LC-2 onto each orientation layer, and subsequently, drying and thermally treating the resulting coating, and the other surface became an air boundary. Obtained samples were observed and measured in the same manner as described above, and an average tilt angle, which was obtained by the combination of liquid crystalline compounds and the orientation layer, was determined.

All hardened layers comprising each liquid crystalline compound were an 0.9 μm thick optically anisotropic layer. The average tilt angle of these films was determined employing KOBRA, manufactured by Oji Keisoku.

| (Composition of LC-1) | |
| --- | --- |
| MEK | 89.5 parts |
| Compound 1 | 2 parts |
| Compound 2 | 4 parts |
| Compound 3 | 3 parts |
| Irugacure 369 (manufactured by Ciba Specialty Chemicals) | 1.5 parts |
| (Composition of LC-2) | |
| MEK | 89.5 parts |
| Compound 1 | 3 parts |
| Compound 2 | 3 parts |
| Compound 3 | 5 parts |
| Irugacure 369 (manufactured by Ciba Specialty Chemicals) | 1.5 parts |

Compound 1

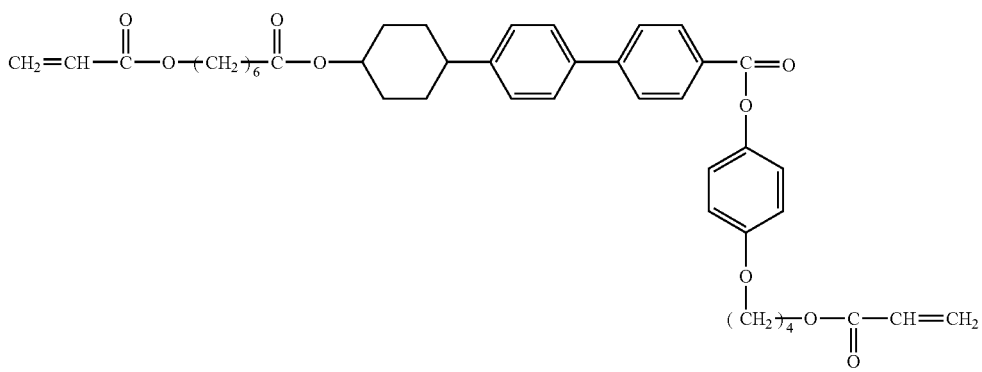

Compound 2

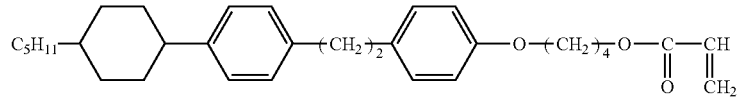

Compound 3

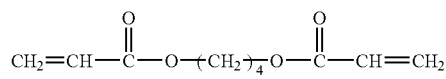

| Orientation Layer | Liquid Crystal Solution | Average Tilt Angle With Anti-parallel Treatment | Average Tilt Angle Having Air Boundary Surface at One Side |
|---|---|---|---|
| A | LC-1 | 4° | 36° |
| A | LC-2 | 4° | 7° |
| B | LC-1 | homeotropic | 83° |
| B | LC-2 | homeotropic | 47° |

These results showed that each of the pre-tilt angles of Orientating Layers "A" and "B" was no more than about 5 degrees and at least 80 degrees, respectively, and Solution LC-1 resulted in a high tilt angle at the air boundary surface, while LC-2 resulted in a low tilt angle at the air boundary surface.

<<Preparation of an Optical Compensation Film>>

Subsequently, an optical compensation film was prepared as described hereunder.

(Preparation of Optical Compensation Film "1A")

Applied onto Orientation Layer "A", prepared as above, was said Solution LC-1 employing a #5 wire bar. Further, the resultant coating was dried in still air at 55° C. for 30 seconds, and thermally treated at 75° C. for 30 seconds. After carrying out a nitrogen purge at 98 kPa for 60 seconds, a layer was prepared which was hardened employing ultraviolet rays of 450 mJ/cm², under an oxygen concentration of 0.1 percent. Optical Compensation Film "1B" was obtained, comprised of one liquid crystal orientation layer obtained as above.

(Preparation of Optical Compensation Film "1B")

Applied onto Orientation Layer "B" prepared as above was said Solution LC-2 employing a #5 wire bar. Further, the resultant coating was dried in still air at 55° C. for 30 seconds, and thermally treated at 75° C. for 30 seconds. After carrying out a nitrogen purge at 98 kPa for 60 seconds, a layer was prepared which was hardened employing ultraviolet rays of 450 mJ/cm², under an oxygen concentration of 0.1 percent. Optical Compensation Film "1B" was obtained, comprised of one liquid crystal orientation layer obtained as above.

The viewing angle of Optical Compensation Films "1A" and "1B" was determined employing the method described below.

Each of Optical Compensation Films "1A" and "1B" was arranged between a glass substrate, on the observer's side, and a polarizing plate, and was adhered, as described below.

Evaluation was carried out employing a panel. Said optical compensation film was arranged so that the liquid crystal side came into contact with a support, and the rubbing direction on the substrate surface near said liquid cell was equal to the rubbing axis-Y direction of Optical Compensation Films "1A" and "1B" of the present invention, and adhesion was carried out so that said rubbing axis was orthogonal to the transmission axis of the polarizing plate. Employed as the liquid cell were those which were obtained by peeling the optical compensation film and the polarizing plate which had been adhered to a 15-inch Display Multi-Sync LCD 1525J, manufactured by NEC. The viewing angle of said liquid crystal panel pasted to the optical compensation film, prepared as above, was determined employing EZ-contrast manufactured by Eldim Co. Said viewing angle was expressed employing a range of inclination angle from the normal line direction against the panel surface which exhibited a contrast ratio of at least 10 of the white display to the black display of the liquid crystal panel. Table 1 shows the values of viewing angles obtained in the optical compensation film of the present invention.

<<Preparation of Optical Compensation Films "2A" and "2B">>

Charged into a tightly sealed vessel were 100 weight parts of cellulose acetate propionate having a degree of acetyl group substitution of 1.60, a degree of propionyl substitution of 1.20, and a viscosity average degree of polymerization of 400, 5 weight parts of ethylphthalyl ethyl glycolate, 3 weight parts of triphenyl phosphate, 290 weight parts of methylene chloride, and 60 weight parts of ethanol, and the resultant mixture was heated while slowly stirred. Then, dissolution was carried out while being heated to 45° C. over 60 minutes. Interior pressure of said vessel became 1.2 atmospheric pressures. The resultant dope was filtered employing Azumi Filter Paper No. 244, manufactured by Azumi Roshi Co., Ltd. Afterward, the filtered dope was set aside for 24 hours to allow bubbles to dissipate. Further, separately, 5 weight parts of said cellulose acetate propionate, 6 weight parts of Tinuvin 326 (manufactured by Ciba Specialty Chemicals Co., Ltd.), 4 weight parts of Tinuvin 109 (also manufactured by Ciba Specialty Chemicals Co., Ltd.), 1 weight part of Tinuvin 171 (again manufactured by Ciba Specialty Chemicals Co., Ltd.), and 1 weight part of Aerosil R972V (manufactured by Nippon Aerosil Co., Ltd.) were mixed with 94 weight parts of methylene chloride, and 8 weight parts of ethanol and dissolved while stirred, whereby a UV absorber solution was prepared. Then, blending was carried out at a ratio of 100 weight parts of said dope to 2 weight parts of said UV absorber solution. After sufficiently mixing the resultant blend, employing a static mixer, the resultant dope, at 30° C., was cast onto a stainless steel belt from a die. Subsequently, drying was carried out for one minute on said belt of which opposite surface was subjected to temperature regulation through the contact of 25° C. heated water. Thereafter, chilling was carried out for 15 seconds on said belt of which back surface came into contact with 15° C. chilled water, and peeling from said stainless steel belt was then carried out. The residual solvent in the web during separation was 100 percent by weight. Subsequently, both edges of the peeled web were clipped employing a monoaxially stretching tenter, and by simultaneously varying the distance between said clips in the width direction, stretching was carried out at 120° C. by a factor of 1.35 in the width direction and by a factor of 1.00 in the casting direction (in the length direction). The resultant film was dried at 130° C. for 10 minutes while being roller-conveyed, whereby a 80 μm thick cellulose ester film (Cellulose Ester Film Support "a2") was obtained.

Said Cellulose Ester Film Support "a2" was wound onto a 200 mm diameter and 1 m wide glass fiber reinforced resin core in the form of a 1,000 m long film roll, utilizing a taper tensioning method. During said winding, knurling treatment was carried out by forcedly contacting the film edge with an embossing ring kept at 250° C., whereby close contact of said film was minimized.

Samples were obtained from the central area in the film width direction of the obtained film roll. Refractive index nx in the lagging phase axis direction, refractive index ny in the leading phase axis direction, and refractive index nz in the thickness direction, were determined in the same manner as the case in which Optical Compensation Films "1A" and 1B, was prepared and evaluated, and $R_o$ and $R_t$ were calculated, whereby 32 nm and 125 nm, at the central area, were obtained, respectively.

Further, it was found that the direction of the lagging phase axis was within the range of ±1.1 degrees. The resulting moisture content, which was determined according to said method, was 2.1 percent.

By employing said support, an orientation layer was prepared on said support in the same manner as in the preparation of Optical Compensation Films "1A" and "1B", and subsequently, crystalline compounds were applied onto the resultant orientation layer, whereby Optical Compensation Films "2A" and "2B" were obtained. Incidentally, the direction of a rubbing treatment, which was applied to said optical compensation film, was determined in the same manner.

Subsequently, the viewing angle of prepared Optical Compensation Films 2A and 2B was determined. Table 1 shows the obtained viewing angles.

<<Preparation and Evaluation of Optical Compensation Films "3A" and "3B">>

Charged into a tightly sealed vessel were 100 weight parts of cellulose acetate propionate having a degree of acetyl group substitution of 2.30, a degree of propionyl substitution of 0.5, and a viscosity average degree of polymerization of 300, 5 weight parts of ethylphthalyl ethyl glycolate, 3 weight parts of triphenyl phosphate, 290 weight parts of methylene chloride, and 60 weight parts of ethanol, and the resultant mixture was heated while slowly stirred. Then, dissolution was carried out while being heated to 45° C. over 60 minutes. Interior pressure of said vessel became 1.2 atmospheric pressures.

The resultant dope was filtered employing Azumi Filter Paper No. 244, manufactured by Azumi Roshi Co., Ltd. Afterward, the filtered dope was set aside for 24 hours to allow to dissipate bubbles. Further, mixed separately were 5 weight parts of said cellulose acetate propionate, 3 weight parts of Tinuvin 326 (manufactured by Ciba Specialty Chemicals Co., Ltd.), 4 weight parts of Tinuvin 109 (also manufactured by Ciba Specialty Chemicals Co., Ltd.), and 5 weight parts of Tinuvin 171 (again manufactured by Ciba Specialty Chemicals Co., Ltd.) added to 90 weight parts of methylene chloride and 10 weight parts of ethanol, and dissolved while stirring, whereby a UV absorber solution was prepared.

Blending was then carried out at a ratio of 100 weight parts of said dope to 2 weight parts of said UV absorber solution. After sufficiently mixing the resultant blend employing a static mixer, the resultant dope maintained at 35° C. was cast onto a stainless steel belt from a die. Subsequently, drying was carried out for one minute on said belt of which opposite surface was subjected to temperature regulation through the contact of 35° C. heated water. Thereafter, chilling was carried out for 15 seconds on said belt of which back surface came into contact with 15° C. chilled water, and peeling from said stainless steel belt was carried out. The residual solvent in the web during peeling was 70 percent by weight.

Subsequently, while conveying said web through a 120° C. oven employing rolls, stretching by a factor of 2.7 in the casting direction (the film length direction) was carried out by setting the circumferential speed of the rolls at the end of said oven to be 2.7 times higher than that of the roll at the beginning of said oven. After stretching, said web was immediately cooled to 60° C. Further, both edges of said web were clipped employing a tenter, and while maintaining the distance between clips, said web was dried at 140° C. for 5 minutes, whereby a 165 μm thick cellulose ester film (Cellulose Ester Film support "a3") was obtained.

Said Cellulose Ester Film Support "a3" was wound on a 200 mm diameter and 1 m wide glass fiber reinforced resin core into the form of 1,000 m long film roll, utilizing a taper tensioning method. During said winding, a knurling treatment was carried out by forcedly contacting the film edges with a 270° C. embossing ring, whereby close contact of said film was minimized.

Samples were obtained from the central area in the film width direction of the obtained roll film. Refractive index nx in the lagging phase axis direction, refractive index ny in the leading phase axis direction, and refractive index nz in the thickness direction were determined in the same manner as above, and $R_o$ and $R_t$ were calculated, whereby, at the central area, 197 nm and 155 nm were obtained, respectively.

Further, it was found that the lagging phase axis direction with respect to the length direction (the casting direction) was 0 degree at the center in the film width direction, and from 0.9 to −0.9 degree at the edges. The moisture content, which was measured according to said method, resulted in 2.0 percent.

By employing the resultant support, an orientation layer was applied onto said support in the same manner as in the preparation of Optical Compensation Films "1A" and "1B", and subsequently, crystalline compounds were applied onto the resultant orientation layer, whereby Optical Compensation Films "3A" and "3B" were obtained.

Incidentally, the direction of a rubbing treatment, which was applied to said optical compensation film, was determined in the same manner.

The viewing angle of prepared Optical Compensation Films "3A" and "3B" was determined employing the same method as previously described. Table 1 shows the obtained viewing angles.

<<Preparation of Optical Compensation Films "4A" and "4B">>

Cellulose Ester Film Support "a4", at a thickness of 100 μm, as well as its film roll was prepared in the same manner as Optical Compensation Films "1A" and "1B", except that cellulose ester employed to prepare said cellulose ester film support was replaced with one having a degree of acetyl group substitution of 1.90, a degree of butyryl substitution of 0.75, and a viscosity average degree of polymerization of 300.

Samples were obtained from the central area in the film width direction of the obtained roll film. Refractive index nx in the lagging phase axis direction, refractive index ny in the leading phase axis direction, and refractive index nz in the thickness direction were determined in the same manner, and $R_o$ and $R_t$ were calculated, whereby at the central area, 150 nm and 135 nm were obtained, respectively.

Further, it was found that the lagging phase axis direction with respect to the width direction was 0 degree at the center in the film width direction, and from 5 to −5 degrees at the edges. The moisture content, which was measured according to said method, resulted in being 1.3 percent.

By employing the resultant support, an orientation layer was applied onto said support in the same manner, and subsequently, crystalline compounds were applied onto the resultant orientation layer, whereby Optical Compensation Films "4A" and "4B" were obtained.

Incidentally, the direction of a rubbing treatment, which was applied to said optical compensation film, was determined in the same manner. The viewing angle of prepared Optical Compensation Films "4A" and "4B" was determined.

Table 1 shows the obtained viewing angles.

<<Preparation of Optical Compensation Films "5A" and "5B">>

Charged into a tightly sealed vessel were 100 weight parts of cellulose acetate propionate having a degree of acetyl group substitution of 2.00, a degree of propionyl substitution of 0.80, and a viscosity average degree of polymerization of 350, 5 weight parts of ethylphthalyl ethyl glycolate, 3 weight parts of triphenyl phosphate, 175 weight parts of methyl acetate, and 75 weight parts of ethanol, and the resultant mixture was heated while slowly stirred. Then, dissolution was carried out while being heated to 65° C. over 60 minutes. Interior pressure of said vessel became 1.2 atmospheric pressures. The resultant dope was filtered employing Azumi Filter Paper No. 244, manufactured by Azumi Roshi Co., Ltd. Afterward, the filtered dope was set side for 24 hours to allow bubbles to dissipate. Further, separately, 5 weight parts of said cellulose acetate propionate, 6 weight parts of Tinuvin 326 (manufactured by Ciba Specialty Chemicals Co., Ltd.), 4 weight parts of Tinuvin 109 (also manufactured by Ciba Specialty Chemicals Co., Ltd.), 5 weight parts of Tinuvin 171 (again manufactured by Ciba Specialty Chemicals Co., Ltd.), were mixed with 94 weight parts of methyl acetate and 8 weight parts of ethanol, and dissolved while stirring, whereby a UV absorber solution was prepared. Then, blending was carried out at a ratio of 100 weight parts of said dope to 2 weight parts of said UV absorber solution. After sufficiently mixing the resultant blend, employing a static mixer, the resultant dope was cast at 50° C. onto a stainless steel belt from a die. Subsequently, drying was carried out for one minute on said belt of which back surface was subjected to temperature regulation through the contact 55° C. heated water. Thereafter, chilling was carried out for 15 seconds on said belt of which back surface came into contact with 15° C. chilled water, and peeling from said belt was then carried out. The residual solvent in the web during peeling was 70 percent by weight. Subsequently, both edges of the peeled web were clipped employing a simultaneous biaxially stretching tenter, and by simultaneously varying the distance between clips in the width direction as well as in the casting direction (in the length direction), stretching was carried out at 190° C. by a factor of 1.9 in the width direction and by a factor of 1.05 in the casting direction (in the length direction). After stretching, the resultant film was temporarily cooled to 80° C. Afterward, said film was stretched at 130° C. by a factor of 1.05 in the length direction, employing rollers rotated at different circumferential speeds. Further, the resultant film was dried at 130° C. for 10 minutes while being conveyed employing rollers, whereby a 120 μm thick cellulose ester film (Cellulose Ester Film Support "a5") was obtained.

Said Cellulose Ester Film Support "a5" was wound onto a 200 mm diameter and 1 m wide glass fiber reinforced resin core in the form of 1,000 m long film roll, utilizing a taper tensioning method. During said winding, a knurling treatment was carried out by forcedly contacting the film edges with a 250° C. embossing ring, whereby close contact of said film was minimized.

Samples were obtained from the central area in the film width direction of the obtained roll film. Refractive index nx in the lagging phase axis direction, refractive index ny in the leading phase axis direction, and refractive index nz in the thickness direction were determined in the same manner as above, and $R_o$ and $R_t$ were calculated, whereby 165.0 nm and 185 nm were obtained, respectively.

Further, it was found that the direction of the lagging phase axis of each sample was within the range of ±1 degree. The moisture content, which was determined according to said method, resulted in being 1.6 percent.

By employing the resultant support, an orientation layer was prepared on said support in the same manner, and subsequently, crystalline compounds were applied onto the resultant orientation layer, whereby Optical Compensation Films "5A" and "5B" were obtained.

<<Preparation of Optical Compensation Films 6A and 6B>>

Each of Optical Compensation Films 6A and 6B was prepared as described hereunder.

<<Preparation of Cellulose Ester Film Support "a6" >>

Charged into a tight-sealed vessel were 100 weight parts of cellulose acetate propionate having a degree of acetyl group substitution of 2.00, a degree of propionyl substitution of 0.80, and a viscosity average degree of polymerization of 350, 5 weight parts of ethylphthalyl ethyl glycolate, 3 weight parts of triphenyl phosphate, 290 weight parts of methylene chloride, and 60 weight parts of ethanol, and the resultant mixture was heated while slowly stirred. Then, dissolution was carried out while being heated to 45° C. over 60 minutes. Interior pressure of said vessel became 1.2 atmospheric pressures. The resultant dope was filtered employing Azumi Filter Paper No. 244, manufactured by Azumi Roshi Co., Ltd. Afterward, the filtered dope was kept at a still state for 24 hours to allow bubbles to dissipate. Further, separately, 5 weight parts of said cellulose acetate propionate, 6 weight parts of Tinuvin 326 (manufactured by Ciba Specialty Chemicals Co., Ltd.), 4 weight parts of Tinuvin 109 (also manufactured by Ciba Specialty Chemicals Co., Ltd.), 5 weight parts of Tinuvin 171 (again manufactured by Ciba Specialty Chemicals Co., Ltd.) were mixed with 94 weight parts of methylene chloride, and 8 weight parts of ethanol were mixed and dissolved while stirring, whereby a UV absorber solution was prepared. Then, blending was carried out at a ratio of 100 weight parts of said dope to 2 weight parts of said UV absorber solution. After sufficiently mixing the resultant blend employing a static mixer, the resultant dope maintained at 30° C. was cast onto a stainless steel belt from a die. Subsequently, drying was carried out for one minute on said belt of which back surface was subjected to temperature regulation through contact of 25° C. heated water. Thereafter, chilling was carried out for 15 seconds on said belt of which back surface came into contact with 15° C. chilled, and peeling from said belt was then carried out. The residual solvent in the web during peeling was 100 percent by weight. Subsequently, both edges of the peeled web were clipped employing a simultaneous biaxially stretching tenter, and by simultaneously varying the distance between the clips in the width direction as well as in the casting direction (in the length direction), stretching was carried our at 110° C. by a factor of 1.40 in the width direction and by a factor of 1.0 in the casting direction (in the length direction). The resultant film was dried at 130° C. for 10 minutes while being roller-conveyed, whereby a 80 μm thick cellulose ester film (Cellulose Ester Film Support "a6") was obtained.

Said Cellulose Ester Film Support "a6" was wound onto a 200 mm diameter and 1 m wide glass fiber reinforced resin core, to form a 1,000 m long film roll, utilizing a taper tensioning method. During said winding, knurling treatment was carried out by forcedly contacting the film edge with an embossing ring kept at 250° C., whereby close contact of said film is minimized.

Samples were obtained from the central area in the film width direction of the obtained roll film. Refractive index nx in the lagging phase axis direction, refractive index ny in the leading phase axis direction, and refractive index nz in the thickness direction were determined as described below, and $R_o$ and $R_t$ were calculated employing formulas also described below, whereby at said central area, values of 41.0 nm and 105 nm were obtained, respectively.

$$R_o = (nx - ny) \times d$$

$$R_t = [(nx + ny)/2 - nz] \times d$$

wherein "d" represents the thickness (in nm) of the film. Further, it was found that the delayed phase axis direction of each sample was within the range of 1.6 degrees with respect to the film width direction.

Three-dimensional refractive indices were obtained at 25° C. and 55 percent relative humidity, employing an automatic birefringence meter KOBRA-21ADH (manufactured by Oji Keisokukiki Co., Ltd.), and values for refractive indices nx, ny, and nz were obtained. Further, the moisture content was determined employing the method described below, resulting in 1.6 percent.

<<Method for Measuring Moisture Content>>

Said cellulose ester film sample was cut into 10 cm² pieces, and was set aside under 23° C. and 80 percent relative humidity for 48 hours. Thereafter, the weight was measured and was termed "W1". Subsequently, after said film sample was subjected to heating and drying treatment at 120° C. for 45 minutes, the weight was again measured and was termed "W2". The moisture content at 23° C. and 80 percent relative humidity was determined by the calculation formula below, employing each of the two measurement values.

Moisture content (in percent) = $[(W1 - W2)/W2] \times 100$

<<Preparation of Orientation Layer A>>

Subsequently, an orientation layer was applied onto Cellulose Ester Film Support "a6" employing the method described below and said orientation layer was prepared as described below.

By employing the resultant support, an orientation layer was prepared on said support in the same manner, and subsequently, crystalline compounds were applied onto the resultant orientation layer, whereby Optical Compensation Films "6A" and "6B" were obtained.

Incidentally, the direction of a rubbing treatment which was applied to said optical compensation film was determined in the same manner. Subsequently, the viewing angle of prepared Optical Compensation Films "6A" and "6B" was determined.

Table 1 shows the obtained viewing angle values.

Further, as a comparative example, the previously adhered optical compensation film, in a 15-inch display Multi Sync LCD1525J manufactured by NEC, was peeled off and the cellulose ester film (being Protective Film 1 which exhibited no optical biaxial properties) described in Example 2 was alternatively adhered. The viewing angle of said comparative example was measured in the same manner as said Optical Compensation Films "1A" and "1B".

Incidentally, the direction of a rubbing treatment which was applied to said optical compensation film was determined in the same manner. Subsequently, the viewing angle of prepared Optical Compensation Films "5A" and "5B" was determined.

Table 1 shows the obtained viewing angle values.

Further, as a comparative example, the previously adhered optical compensation film, in a 15-inch display Multi Sync LCD1525J manufactured by NEC, was peeled off and the cellulose ester film (being Protective Film 1 which exhibited no optical biaxial properties) described in Example 2 was alternatively adhered. The viewing angle of said comparative example was measured in the same manner as said Optical Compensation Films "1A" and "1B".

TABLE 1

| Optical Compensation Film Sample No. | Viewing Angle Left | Viewing Angle Right | Viewing Angle Upper | Viewing Angle Lower | Remarks |
| --- | --- | --- | --- | --- | --- |
| 1A | 60° | 60° | 45° | 30° | Present Invention |
| 1B | 60° | 60° | 40° | 30° | Present Invention |
| 2A | 65° | 65° | 40° | 35° | Present Invention |
| 2B | 65° | 65° | 40° | 35° | Present Invention |
| 3A | 65° | 65° | 45° | 30° | Present Invention |
| 3B | 60° | 60° | 45° | 30° | Present Invention |
| 4A | 65° | 65° | 40° | 35° | Present Invention |
| 4B | 60° | 60° | 45° | 30° | Present Invention |
| 5A | 65° | 65° | 45° | 35° | Present Invention |
| 5B | 60° | 60° | 40° | 30° | Present Invention |
| 6A | 65° | 65° | 50° | 40° | Present Invention |
| 6B | 60° | 60° | 45° | 40° | Present Invention |

TABLE 1-continued

| Optical Compensation Film Sample No. | Viewing Angle Left | Viewing Angle Right | Viewing Angle Upper | Viewing Angle Lower | Remarks |
|---|---|---|---|---|---|
| Protective Film 1 | 35° | 35° | 25° | 20° | Comparative Example |

As can be clearly seen from Table 1, the optical compensation films of the present invention result in markedly pronounced improvement of the viewing angle compared to the Comparative Example.

Example 2

<<Preparation of Polarizing Plate>>

(Preparation of Protective Film 1)

Charged into a tightly sealed vessel were 100 weight parts of cellulose triacetate having a degree of acetyl group substitution of 2.92 and a viscosity average degree of polymerization of 300, 2 weight parts of ethylphthalyl ethyl glycolate, 10 weight parts of triphenyl phosphate, 350 weight parts of methylene chloride, and 50 weight parts of ethanol, and the resultant mixture was heated while slowly stirred. Then, dissolution was carried out while being heated to 45° C. over 60 minutes. Interior pressure of said vessel became 1.2 atmospheric pressures.

The resultant dope was filtered employing Azumi Filter Paper No. 244, manufactured by Azumi Roshi Co., Ltd. Afterward, the filtered dope was set aside for 24 hours to allow bubbles to dissipate.

Further, separately, 5 weight parts of said cellulose triacetate, 3 weight parts of Tinuvin 326 (manufactured by Ciba Specialty Chemicals Co., Ltd.), 7 weight parts of Tinuvin 109 (manufactured by Ciba Specialty Chemicals Co., Ltd.), 5 weight parts of Tinuvin 171 (manufactured by Ciba Specialty Chemicals Co., Ltd.), and 1 weight part of Aerosil 200V (manufactured by Nippon Aerosil co., Ltd.) were mixed with 90 weight parts of methylene chloride and 10 weight parts of ethanol, and dissolved while stirring, whereby a UV absorber solution was prepared. Then, blending was carried out at a ratio of 100 weight parts of said dope to 2 weight parts of said UV absorber solution. After sufficiently mixing the resultant blend employing a static mixer, the resultant dope was cast at 35° C. onto a stainless steel belt from the die. Subsequently, drying was carried out for one minute on said belt of which back surface was subjected to temperature regulation through the contact of 35° C. heated water. Thereafter, chilling was carried out for 15 seconds on said belt of which back surface came into contact with 15° C. chilled water, and peeling from said belt was then carried out.

The residual solvent in the web during peeling was 70 percent by weight. Subsequently, both edges of the peeled web were fixed and drying was carried out at 120° C. for 10 minutes, whereby an 80 μm thick cellulose ester film (Protective Film 1) was obtained.

Each of Optical Compensation Films "5A" and "5B" obtained in Example 1 was immersed in a 2 mol/liter sodium hydroxide solution at 60° C. for 2 minutes, washed with water for 2 minutes, and subsequently dried at 100° C. for 10 minutes, whereby an alkali saponified cellulose ester film was obtained.

Further, a 120 μm thick polyvinyl alcohol film was immersed in 100 weight parts of an aqueous solution containing 1 weight part of iodine and 4 weight parts of boric acid, and was stretched by a factor of 4 at 50° C., whereby a polarizing layer (Polarizer 1) was prepared.

Each of polarizing plates (Polarizing Plates "A" and "B") was prepared in such a manner that one surface of said Polarizer 1 was adhered to the surface of the support of each of Optical Compensation Films "5A" and "SB", of which one surface had been alkali-saponified in the same manner as said back surface of Protective Film 1, employing as the adhesive a 5 percent aqueous solution of completely saponified type polyvinyl alcohol. Adhesion was carried out in such a manner that the angle between the polarizing axis of said polarizer and the width direction of said cellulose ester film support was adjusted so that the absorption axis of said polarizing axis was parallel to the rubbing axis of said optical compensation film.

The polarizing plate prepared as above was arranged and adhered onto the substrate surface on the side of the operator who observed the liquid cell so that the rubbing direction on the said substrate surface was the same as the +Y direction of Optical Compensation Films "5A" and "5B". Further, a polarizing plate, which was prepared employing only Protective Film 1 on the back surface of said liquid cell, was arranged to be parallel to the rubbing axis near the transmission axis.

Further, the direction of the rubbing treated optical compensation film was determined according to Example 1.

The viewing angle of the liquid crystal panel, adhered to prepared Polarizing Plates "A" and "B", was determined employing the method of Example 1. The table below shows obtained viewing angles of the polarizing plates of the present invention.

| | Viewing Angle | | | |
|---|---|---|---|---|
| | Left | Right | Upper | Lower |
| Liquid Crystal Panel (employing Polarizing Plate "A") | 60° | 60° | 40° | 30° |
| Liquid Crystal Panel (employing Polarizing Plate "B") | 60° | 60° | 40° | 30° |
| Comparative (employing Protective Film 1) | 35° | 35° | 25° | 20° |

As can be clearly seen from the above table, the polarizing plates of the present invention resulted in markedly pronounced improved effects of the viewing angle compared to Comparative Liquid Crystal Panel which is comprised of the protective film described in Example 1.

Example 3

Cellulose Ester Film Supports 1 through 4 shown in Table 2 were prepared employing Production Method 1 described below and Cellulose Ester Film Supports 5 through 9 shown in Table 2 were prepared employing Production Method 2 described below.

(Production Method 1)

Charged into a tightly sealed vessel were 100 weight parts of each of cellulose resins (detailed hereunder) shown in Table 2, 5 weight parts of ethylphthalyl ethyl glycolate, 3 weight parts of triphenyl phosphate, 290 weight parts of methylene chloride, and 60 weight parts of ethanol, and the resultant mixture was gradually heated while slowly stirred. Then, dissolution was carried out while being heated to 45° C. over 60 minutes. Interior pressure of said vessel was adjusted to 1.2 atmospheric pressures. The resultant dope was filtered employing Azumi Filter Paper No. 244, manufactured by Azumi Roshi Co., Ltd. Afterward, the filtered dope was set aside for 24 hours to allow bubbles to dissipate.

Further, separately, 5 weight parts of said cellulose acetate propionate, 6 weight parts of Tinuvin 326 (manufactured by Ciba Specialty Chemicals Co., Ltd.), 4 weight parts of Tinuvin 109 (manufactured by Ciba Specialty Chemicals Co., Ltd.), 1 weight part of Tinuvin 171 (manufactured by Ciba Specialty Chemicals Co., Ltd.), 1 weight part of Aerosil R971V (manufactured by Nippon Aerosil Co., Ltd.) were mixed with 94 weight parts of methylene chloride, and 8 weight parts of ethanol and dissolved while stirring, whereby a UV absorber solution was prepared. Then, blending was carried out at a ratio of 100 weight parts of said dope to 2 weight parts of said UV absorber solution. After sufficiently mixing the resultant blend employing a static mixer, the resultant dope was cast at 30° C. onto a stainless steel belt from a die. Subsequently, drying was carried out for one minute on said belt of which back surface was subjected to temperature regulation through the contact of 25° C. heated water. Thereafter, chilling was carried out for 15 seconds on said belt of which back surface came into contact with 15° C. chilled water, and peeling from said belt was then carried out. The residual solvent in the web during peeling was 100 percent by weight.

Subsequently, both edges of the peeled web were clipped employing a simultaneous biaxially stretching tenter, and by simultaneously varying the distance between clips in the width direction as well as in the casting direction (in the length direction), stretching was carried out at 120° C. by a factor of 1.05 in the width direction and by a factor of 1.15 in the casting direction (in the length direction). After stretching, the resultant film was temporarily cooled to 80° C. Afterward, said film was stretched at 130° C. by a factor of 1.05 in the length direction, employing rollers rotated at different circumferential speeds. The resultant film was dried at 130° C. for 10 minutes while being roller-conveyed, whereby a 100 µm thick cellulose ester film was obtained. Cellulose ester film, prepared by Production Method 1, was wound on a 200 mm diameter and 1 m wide glass fiber reinforced resin core in the form of a 1,000 m long film roll, utilizing a taper tensioning method. During said winding, knurling treatment was carried out by forcedly contacting the film edge portion with an 250° C. embossing ring, whereby close contact of said film was minimized.

(Production Method 2)

Charged into a tightly sealed vessel were 100 weight parts of each of cellulose resins (detailed hereunder), 5 weight parts of ethylphthalyl ethyl glycolate, 3 weight parts of triphenyl phosphate, 290 weight parts of methylene chloride, and 60 weight parts of ethanol, and the resultant mixture was gradually heated while slowly stirred. Then, dissolution was carried out while being heated to 45° C. over 60 minutes. Interior pressure of said vessel became 1.2 atmospheric pressures.

The resultant dope was filtered employing Azumi Filter Paper No. 244 manufactured by Azumi Roshi Co., Ltd. Afterward, the filtered dope was set aside for 24 hours to allow bubbles to dissipate. Further, separately, 3 weight parts of said cellulose acetate propionate, 3 weight parts of Tinuvin 326 (manufactured by Ciba Specialty Chemicals Co., Ltd.), 4 weight parts of Tinuvin 109 (manufactured by Ciba Specialty Chemicals Co., Ltd.), 5 parts of Tinuvin 171 (manufactured by Ciba Specialty Chemicals Co., Ltd.), 90 weight parts of methylene chloride, and 10 weight parts of ethanol were mixed and dissolved while stirring, whereby a UV absorber solution was prepared.

Blending was then carried out at a ratio of 100 weight parts of said dope to 2 weight parts of said UV absorber solution. After sufficiently mixing the resultant blend employing a static mixer, the resultant dope was cast at 35° C. onto a stainless steel belt from a die. Subsequently, drying was carried out for one minute on said belt of which back surface was subjected to temperature regulation through the contact of 35° C. heated water. Thereafter, chilling was carried out for 15 seconds on said belt of which back surface came into contact with 15° C. chilled water, and peeling from said belt was then carried out. The residual solvent in a web during peeling was 70 percent by weight.

Subsequently, while conveying said web through a 120° C. oven employing rolls, stretching in the casting direction (the film length direction) by a factor of 1.15 was carried out by setting the circumferential speed of the rolls at the end of said oven which was 1.15 times higher than that of the rolls of the beginning of said oven. After stretching, said web was immediately cooled to 60° C. Further, both edges of said web were clipped employing a tenter, and while maintaining the distance between clips, said web was dried at 140° C. for 5 minutes, whereby an 80 µm thick cellulose ester film (Cellulose Ester Film support a3) was obtained.

Said cellulose ester film was wound on a 200 mm diameter and 1 m wide glass fiber reinforced resin core into the form of 1,000 m long film roll, utilizing a taper tension method. During said winding, a knurling treatment was carried out by forcedly contacting the film edge portion with a 250° C. embossing ring, whereby close contact of said film was minimized.

The cellulose resin, which was employed in each of Production Methods 1 and 2 previously described, is detailed hereunder.

Cellulose Resin 1: cellulose acetate (having a number average molecular weight of 170,000) at a degree of acetyl group substitution of 2.65.

Cellulose Resin 2: cellulose acetate (having a number average molecular weight of 200,000) at a degree of acetyl group substitution of 2.92, and cellulose acetate (having a number average molecular weight of 100,000) at a degree of acetyl group substitution of 2.45, were mixed so that the average degree of acetyl group substitution, after mixing, resulted in 2.65.

Cellulose Resin 3: cellulose acetate (having a number average molecular weight of 150,000) at a degree of acetyl group substitution of 2.51 and cellulose acetate (having a number average molecular weight of 180,000) at a degree of acetyl group substitution of 2.86 were mixed so that the average degree of acetyl group substitution, after mixing, resulted in 2.65.

Cellulose Resin 4: cellulose acetate propionate (having a number average molecular weight if 120,000) at a degree of acetyl group substitution of 2.10 and a degree of propionyl substitution of 0.80.

Cellulose Resin 5: cellulose acetate propionate (having a number average molecular weight if 120,000) at a degree of acetyl group substitution of 1.80 and a degree of propionyl substitution of 0.90.

The number average molecular weight of cellulose ester resins according to the present invention was determined based on GPC (gel permeation chromatography) while employing high speed liquid chromatography. The measurement conditions are shown hereunder.

<<Measurement Conditions>>

Solvent: methylene chloride

Column: three columns of Shodex K806, K805, and K803G (manufactured by Showa Denko Co., Ltd.) were employed in series.

Column temperature: 25° C.

Sample concentration: 0.1 percent by weight

Detector: RI Model 504 (manufactured by GL Science Co., Ltd.)

Pump: L6000 (manufactured by Hitachi, Ltd.)

Flow rate: 1.0 ml/minute

Calibration curve: Standard Polystyrene STK standard (several types of polystyrenes, manufactured by TOSOH Corp., were prepared, a calibration curve was drawn, and conversion to the number average molecular weight of cellulose ester was carried out)

Further, retardation value $R_o$ (in nm) in the in-plane direction, and retardation value $R_t$ (in nm) in the thickness direction of each of obtained Cellulose Ester Film Support 1 through 9 were determined at 23° C. and 55 percent relative humidity, employing an automatic birefringence meter KOBRA-21ADH (manufactured by Oji Keisokukiki Co., Ltd.), and an angle characteristic value of the retardation at a wavelength of 590 nm was obtained.

Table 2 shows characteristics of said Cellulose Ester Film Supports 1 through 9.

TABLE 2

| Cellulose Ester Film Support No. | Resin | Production Method | Layer Thickness (in μm) | $R_o$ (in nm) | $R_t$ (in nm) | $R_t/R_o$ |
|---|---|---|---|---|---|---|
| 1 | 1 | Production Method 1 | 100 | 66.0 | 70.1 | 1.06 |
| 2 | 2 | Production Method 1 | 100 | 65.0 | 72.1 | 1.11 |
| 3 | 3 | Production Method 1 | 100 | 70.0 | 64.1 | 0.92 |
| 4 | 4 | Production Method 1 | 100 | 69.0 | 73.5 | 1.07 |
| 5 | 1 | Production Method 2 | 80 | 55.2 | 50.8 | 0.92 |
| 6 | 2 | Production Method 2 | 80 | 54.6 | 58.8 | 1.08 |
| 7 | 3 | Production Method 2 | 80 | 60.1 | 52.5 | 0.87 |
| 8 | 4 | Production Method 2 | 80 | 63.2 | 70.8 | 1.12 |
| 9 | 5 | Production Method 2 | 80 | 65.0 | 72.3 | 1.11 |

<<Separation of Optical Compensation Film Sample "A">>

As shown in Table 3, after applying the plasma treatment, described below, to Cellulose Ester Film Support 1, Dissolving-out Blocking Layer 2, Orientation Layer 2, and Optically Anisotropic Layer LC-2, described hereunder, were laminated in said order, whereby Optical Compensation Film Sample "A" was prepared.

<<Preparation of Optical Compensation Film Samples "B" through "M">>

Each of Optical Compensation Film Samples "B" through "O" was prepared in the same manner as Optical Compensation Film Sample "A", except that the constitution shown in Table 3 was utilized. Table 3 lists prepared Optical Compensation Film Samples "B" through "M".

TABLE 3

| Optically Anisotropic Material | | A | B | C | D | E | F | G | H | I | J | K | L | M |
|---|---|---|---|---|---|---|---|---|---|---|---|---|---|---|
| Optical Compensating Film | Liquid Crystal Layer 2 | Y | — | Y | — | — | — | Y | Y | Y | Y | Y | Y | — |
| | Liquid Crystal Layer 1 | — | Y | — | Y | Y | Y | — | — | — | — | — | — | — |
| Light Orientation Layer | Orientation Layer 2 | Y | — | Y | — | — | — | Y | Y | Y | Y | Y | Y | — |
| | Orientation Layer 1 | — | Y | — | Y | Y | Y | — | — | — | — | — | — | — |
| Dissolving-out blocking Layer | 2 | Y | — | — | — | — | Y | — | — | — | Y | — | — | — |
| | 1 | — | — | — | — | Y | — | Y | Y | Y | — | Y | Y | — |
| Organic Acid Polymer Layer | | — | Y | Y | Y | — | — | — | — | — | Y | — | — | — |
| Plasma Treatment | | X | — | — | — | — | Y | — | — | — | — | — | — | — |
| Cellulose Ester Film Support No. | | 1 | 2 | 3 | 4 | 1 | 3 | 4 | 6 | 7 | 8 | 9 | 10 | — |

Y: Employed
—: Not employed

Detailed hereunder are the plasma treatment, application of organic acid group containing polymer, preparation of Dissolving-out Blocking Layer 1 or 2, application of Orientation Layer 1 or 2, application of Liquid Crystal Layer 1 or 2, and the like, which are employed to prepare said optical compensation film samples.

<<Plasma Treatment>>

Figure 9:
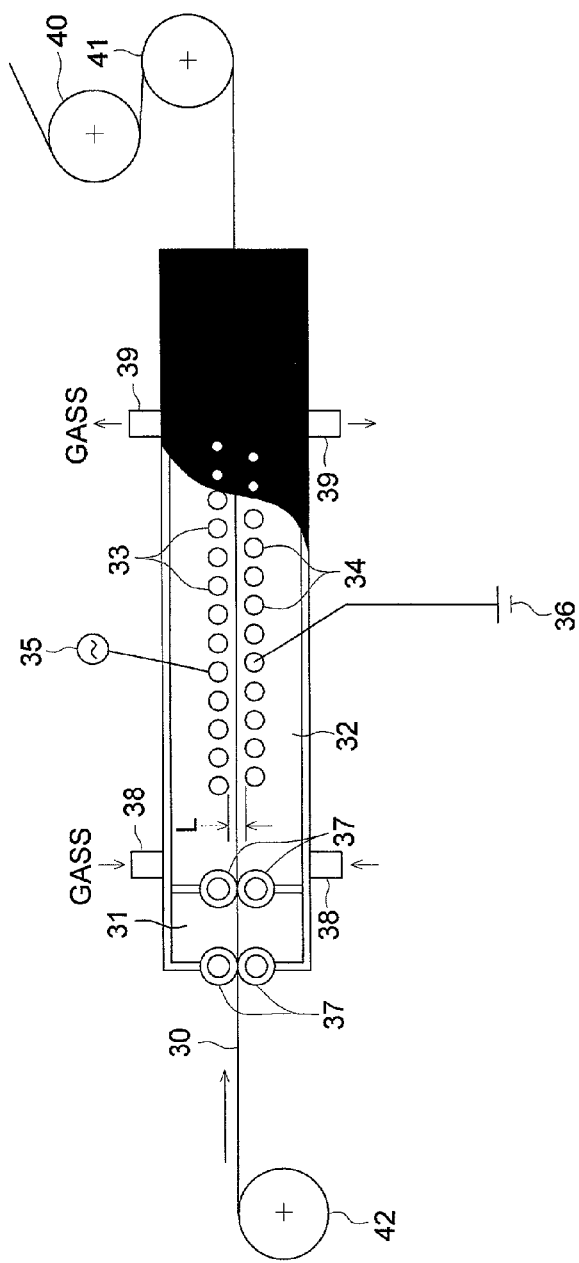
FIG. 9 shows a continuous atmospheric pressure plasma discharge apparatus.

Apparatus 1: continuous atmospheric pressure plasma discharge processing apparatus (the schematic view is shown in FIG. 9)

Power source: PHF-4K manufactured by Haiden Kenkyusha

Power source frequency: 10 kHz

By employing Apparatus 1, the plasma treatment was applied to samples which required the transparent resinous film under the constitution shown in Table 2.

Power source output: 400 W/m$^2$

Processing gas: the flow rate was controlled employing a mass flow controller so as to obtain a ratio of argon:oxygen:hydrogen=10:1:0.38 (pressure ratio), and the resultant gas mixed by a mixer was introduced into a processing chamber. The processing time was set to be 60 seconds.

<<Application of Organic Acid Group Containing Polymer Layer>>

Dissolved in a mixture consisting of 500 g of anhydrous acetone and 500 g of ethyl acetate, were 50 g of a copolymer of vinyl acetate:maleic anhydride:maleic acid=2:2:1 (as a mole ratio), and the resultant mixture was applied onto a cellulose ester film support, employing a wire bar so as to obtain a dried layer thickness of 100 nm, and was subsequently dried.

<<Preparation of Dissolving-Out Blocking Layer>>

(Preparation of Dissolving-Out Blocking Layer 1)

After applying the actinic radiation hardening layer coating composition described below onto said cellulose ester film support employing a wire bar and subsequently dried, the resulting layer was hardened by being subjected to irradiation of ultraviolet rays of 200 mJ/cm$^2$ (radiation amount at 365 nm) under a nitrogen atmosphere. The layer thickness of said dissolving-out blocking layer after hardening was 3 µm.

(Actinic Radiation Hardening Layer Coating Composition)

| | |
|---|---|
| Dipentaerythritol hexacrylate monomer | 70 g |
| Dipentaerythritol hexacrylate dimer | 15 g |
| Dipentaerythritol hexacrylate trimer or more | 15 g |
| Diethoxybenzophenone photochemical reaction initiator | 4 g |
| Propylene glycol monomethyl ether | 75 g |
| Methyl ethyl ketone | 75 g |

(Preparation of Dissolving-Out Blocking Layer 2)

The polymer coating composition described below was prepared, and subsequently applied onto said cellulose ester film support so as to obtain a dried layer thickness of 0.2 µm, employing a wire bar.

| (Preparation of Polymer Coating Composition) | |
|---|---|
| Polyvinylpyrrolidone (having a number average molecular weight of 1,100,000) | 1 g |
| Solvent composition of water:methanol: propylene glycol monomethyl ether = 50:45:5 (as a weight ratio) | 200 g |
| <<Application of Orientation Layer>> | |
| (Application of Orientation Layer 1) | |

Sunever 5291 (manufactured by Nissan Kagaku) was applied onto the dissolving-out blocking layer which had been applied onto said cellulose ester film support, employing an extrusion coating device so as to obtain a dried layer thickness of 0.1 µm. After drying the resultant coating at 110° C. for 3 hours, a rubbing treatment was carried out, whereby an orientation layer was formed. The rubbing treatment direction was set so as to be orthogonal to the x direction on the support surface.

(Application of Orientation Layer 2)

Said plasma treatment was applied to said cellulose ester film support. Alternatively, straight chain alkyl modified polyvinyl alcohol (MP203, manufactured by Kuraray Co., Ltd.), was dissolved in a solvent consisting of water:methanol=60:40 (as a weight ratio) in an amount of 1 percent by weight; the resultant solution was applied to said cellulose ester film support to obtain a dried layer thickness of 0.2 µm, employing an extrusion coating device, and after drying the resulting coating, employing heated air flow at 80° C., a rubbing treatment was carried out to form an orientation layer. The rubbing treatment direction was set so as to be orthogonal to the x direction on the support surface. The resultant orientation layer may also function as the dissolving-out blocking layer.

<<Application of Liquid Crystal Layer>>

(Application of Liquid Crystal Layer 1)

Employing a printing method, onto the rubbing treated orientation layer, which had been applied onto said cellulose ester film support, applied was a solution prepared by dissolving 5 g of LC-1 in 45 g of chloroform at a concentration of 10 percent by weight. The resultant coating was dried on a hot plate at 110° C., and in order to achieve orientation, subsequently, was thermally treated in an oven at 110° C. for 30 minutes. Thereafter, the resulting coating was allowed to cool to room temperature, whereby LC-1 was subjected to orientation fixation. It was found that the glass transition temperature of LC-1 was 90° C., while the layer thickness of said liquid crystal layer was 1.5 µm.

(Application of Liquid Crystal Layer 2)

Employing an extrusion coating device, applied onto the rubbing treated orientation layer, which had been applied onto said cellulose ester film support, was a coating solution prepared by dissolving 1.6 g of LC-2, 0.4 g of phenoxydiethylene glycol acrylate (M101, manufactured by Toa Gosei Co., Ltd.), 0.01 g of a photopolymerization initiator (Irgacure 907, manufactured by Ciba-Geigy Co., Ltd.) in 3.65 g of methyl ethyl ketone. The resultant coating was adhered onto a metal flame and fixed, and heated in a high temperature tank at 120° C. for 3 minutes for drying as well as orientation, whereby the liquid crystalline compound was oriented. Subsequently said coating was irradiated with ultraviolet rays at 120° C. for 10 seconds under an illuminance of 10 mW/cm$^2$ and a nitrogen atmosphere employing a high pressure mercury lamp, whereby the resulting orientation was fixed through a cross-liking reaction. Thereafter, the resulting layer was set aside and cooled to room temperature, whereby a sample was obtained. It was found that the thickness of the resultant liquid crystal layer was 1.2 µgm.

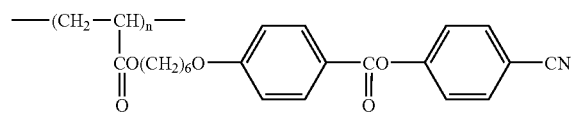

LC-1

-continued

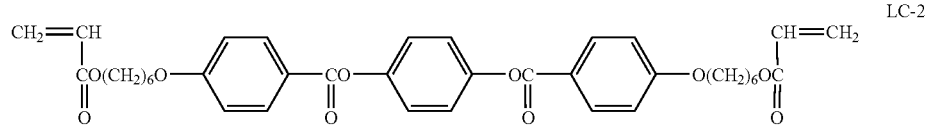
LC-2

Each of Optical Compensation Films "A" though "M" was subjected to evaluation described below.

<<Measurement of Average Tilt Angle of the Optically Anisotropic Layer>>

The angle dependency (in the range of from −40 to +40 degrees, measured at 10 degrees interval) of said optical compensation film as well as the cellulose ester film support itself employed to prepare said optical compensation film was determined employing an automatic double refractive index meter KOBRA-21ADH (manufactured by Oji Keisokukiki Co., Ltd.). Measurements of said optical compensation film were carried out in the direction which resulted in the maximum refractive index of the optically anisotropic layer. Differences between retardation of each angle component of said cellulose ester film support, with respect to the angle dependency of the entire retardation of said optical compensation film, was obtained. The observed angle which disposed the maximum value of the retardation which was dependent on the measured angle was designated as the average tilt angle of the liquid crystalline compound, which constituted said optically anisotropic layer. In the present example, it was confirmed that the observed angle, which disposed a maximum value, deviated from the normal direction (zero degree) with respect to the sample surface, and the liquid crystal molecule of said optically anisotropic layer, was declined. Further, it was confirmed that said angle varies in the thickness direction due to the fact that the minimum retardation value was not zero in the direction of the thickness of said liquid crystal molecule.

<<Measurement of Tilt Angle of Orientation Layer Side of Optically Anisotropic Layer>>

Instead of the cellulose ester film support of said example, a 1.5×2.5 cm transparent glass substrate was coated with an orientation layer which was then subjected to a rubbing treatment. Two glass substrates, which had been subjected to the rubbing treatment in the same manner, were prepared, and Liquid Crystalline compounds LC-1 and LC-2, and 5 μm spherical spacers were applied onto each of the orientation layers under an atmosphere of the isotropic temperature. The resultant substrate was brought into pressure contact with the other rubbing treated glass substrate so that the rubbing directions were opposite to each other and were approximately parallel to each other, and further, one of the rubbing treated glass substrates came into contact with the liquid crystal. Then, the resulting height was adjusted to be uniform. Subsequently, the surroundings were sealed with a silicone resin which was then hardened.

Herein, "approximately parallel" means that the angle between the two axes is within ±2 degrees.

The glass cell comprising the liquid crystalline compound was prepared employing the resultant glass substrate. Said prepared glass cell was subjected to a heat treatment in the same manner as the preparation of said optical compensation film. The glass cell comprising LC-1 was set aside and allowed to cool to room temperature. On the other hand, the glass cell comprising LC-2 was subjected to ultraviolet hardening, and then set aside to cool to room temperature.

The angle dependency of retardation was determined in the same manner as previously described. It was confirmed that all tilt angles of the samples shown in Table 4 were greater than the average tilt angle which had been obtained from the optical compensation films, and were at least 50 degrees. Based on this, it was confirmed that the variation of the tilt angle in the thickness direction of liquid crystalline compounds constituting the optical compensation film was such that the tilt angle which came into contact with the side of the orientation layer was greater, and the tilt angle in the side (the air boundary surface) opposite the orientation layer was small or 0 degree. Based on said results, as shown in FIG. 6, the direction trend of the tilt angle of Liquid Crystalline Compounds 24a and 24B were assumed.

<<Evaluation of Viewing Angles>>

The polarizing plate of the TFT-TN liquid crystal panel of an LA-1529HM Type manufactured by NEC was peeled off. Subsequently, in accordance to the constitution (the constitution being such that the polarizing plate was employed instead of the polarizer itself) described in FIG. 6, the prepared optical compensation film was adhered to the driving liquid cell so as to match the angle, and the peeled polarizing plate was adhered at the same angle. The contrast ratio of each sample during white/black display was determined employing Ez-Contrast manufactured by Eldim Co. employing a personal computer. Each angle from the normal direction of the liquid crystal panel, which resulted in at least 10 of contrast in the up, down, left, and right was determined, whereby the obtained angles were designated as the viewing angles.

However, the results of Optical Compensation Film Sample "M" show a case of the absence of an optically anisotropic layer. Table 4 shows the obtained results.

TABLE 4

| Optical Compensating Film | A | B | C | D | E | F | G | H | I | J | K | L | M |
|---|---|---|---|---|---|---|---|---|---|---|---|---|---|
| Average Tilt Angle of Optically Anisotropic Layer (in degrees) | 30 | 27 | 30 | 27 | 27 | 27 | 30 | 30 | 30 | 30 | 30 | 30 | — |
| Viewing Angle (upper) (in degrees) | 48 | 51 | 45 | 52 | 45 | 45 | 53 | 53 | 53 | 48 | 48 | 53 | 24 |

TABLE 4-continued

| Optical Compensating Film | A | B | C | D | E | F | G | H | I | J | K | L | M |
|---|---|---|---|---|---|---|---|---|---|---|---|---|---|
| Viewing Angle (lower)) (in degrees) | 65 | 69 | 65 | 72 | 62 | 62 | 73 | 73 | 73 | 70 | 70 | 75 | 47 |
| Viewing Angle (left) (in degrees) | 69 | 71 | 61 | 74 | 67 | 67 | 75 | 75 | 75 | 63 | 63 | 76 | 41 |
| Viewing Angle (right) (in degrees) | 69 | 71 | 61 | 74 | 67 | 67 | 75 | 75 | 75 | 63 | 63 | 76 | 41 |
|  | Inv. | Inv. | Inv. | Inv. | Inv. | Inv. | Inv. | Inv. | Inv. | Inv. | Inv. | Inv. | Comp. |

Inv.: Present Invention
Comp.: Comparative Example

As can clearly seen from Table 4, the optical compensation films of the present invention markedly improved the viewing angle of the liquid crystal display.

Example 4

Sample "A'" was prepared in the same manner as Sample "A", except that no plasma treatment was carried out. Sample "A'" exhibited the same optical characteristics.

Sample "J'" was prepared in the same manner as Sample "J" of Example 3, except that no organic acid group containing polymer layer was disposed. Sample "K'" exhibited the same optical characteristics.

These samples were subjected to the adhesion test described below.

A check pattern test, based on JIS K 5400, was carried out. Specifically, 11 break lines at the interval of 1 mm were made perpendicularly and horizontally on the coated surface, that is, 100 squares having a side length of 1 mm were made. Cellophane tape was adhered onto the prepared check pattern and then quickly peeled off at an angle of 90 degrees. The number of remaining check patterns was represented by "m" and adhesion property was represented by m/100.

A: $0 \leq m < 30$ high adhesion and excellent adhesion property resulted
B: $31 \leq m < 50$ peeling occurred somewhat but adhesion was at a level of no problems of commercial viability
C: $51 \leq m < 100$ marked peeling occurred and also problems of commercial viability occurred.

| Sample No. | A | A' | J | J' |
|---|---|---|---|---|
| Adhesion Property | A | B | A | B |

Based on the above results, it is found that by applying the plasma treatment onto the cellulose ester film support or by providing the organic acid group containing polymer layer onto the same, the adhesion property of the optical compensation film of the present invention is markedly improved.

The plasma treatment, as well as the application of the organic acid group containing polymer layer, of other samples of Example 3 were compared in the same manner. As a result, the improvement of the adhesion property was found.

Example 5

Support 1' was prepared employing Production Method 1 in the same manner as for Support 1, except that neither 5 weight parts of ethylphthalyl ethyl glycolate nor 3 weight parts of triphenyl phosphate was added. Optical Compensation Film "G'" having the same constitution as Optical Compensation Film "G" in Table 2 were prepared. optical Compensation Film "G" as well as Optical Compensation Film "G'" was cut to 50 m×1 cm, and the resulting cut film was subjected to a degradation test for 50 hours under an ambience of 80° C. and 90 percent relative humidity.

The dimensional change, in the maximum refractive index providing direction on the plane of the cellulose ester film support of the optical compensation film, was compared before and after said degradation treatment.

Dimensional change (in percent)=(length after the degradation test/length before degradation test−1)×100

|  | Optical Compensation Film H | Optical Compensation Film H' |
|---|---|---|
| Dimensional Change | 0.02% | −0.5% |

Dimensional Change

Based on the above results, it was found that the addition of plasticizers to the cellulose ester film support made it possible to decrease the dimensional change. When said optical compensation film is utilized in a liquid crystal apparatus in which optical characteristics are particularly important, it is clear that a minimum variation of the optical characteristics due to the dimensional change is desirable.

Samples were prepared in the same manner while employing other samples of Example 3 and were then evaluated. It was noted that it was possible to decrease the dimensional change of all samples.

Example 6

| <Preparation of Resinous Film 1> | |
|---|---|
| Cellulose triacetate | 100 weight parts |
| Ethylphthalyl ethyl glycolate | 2 weight parts |
| Triphenyl phosphate | 8.5 weight parts |
| Methylene chloride | 430 weight parts |
| Methanol | 90 weight parts |
| Ultra fine particle silica (Aerosil 200, manufactured by Nippon Aerosil Co. Ltd.) | 0.01 weight part |

The composition described above was charged into a tightly sealed vessel and completely dissolved while stirring at 80° C. under application of pressure, whereby a dope composition was obtained. Subsequently, said dope composition was filtered, and cooled to 35° C. While maintaining said dope composition at 35° C., it was uniformly cast onto a stainless steel band. Solvents were evaporated until it was possible to peel the cast dope composition. Then, said cast dope composition was peeled from said stainless steel band. After peeling, the peeled dope composition was dried in a drying zone at a residual solvent amount of from 60 to 5 percent by weight, while maintaining the width employing a tenter. Further, drying was carried out until the amount of residual solvents became no more than one percent by weight while being conveyed employing a number of rolls, whereby a 80 μm thick film was obtained.

<<Preparation of a Polarizing Plate>>

A 120 μm thick polyvinyl alcohol film was immersed into an aqueous solution containing 1 weight part of iodine and 4 weight parts of boric acid, and subsequently, stretched at 50° C. by a factor of 4, whereby a polarizer was prepared. Separately, said 80 μm thick polarizing plate protective film was immersed into a 2 mole/liter sodium hydroxide aqueous solution at 60° C. for 2 minutes and subsequently washed. The washed film was then dried at 100° C. for 10 minutes. Subsequently both surfaces of the resultant polarizer were adhered to the resultant protective film, employing an adhesive comprised of a 5 percent aqueous completely saponified type polyvinyl alcohol solution, whereby a polarizing plate was prepared.

Each of the optical compensation films prepared in Example 3 was adhered to said polarizing plate, employing an acryl based adhesive, so that the direction resulting in the maximum refractive index on the plane of the cellulose ester film of the optical compensation film was approximately parallel to the transmitting axis of said polarizing plate, and the optically anisotropic layer was located on the side of the polarizing plate protective film.

On the other hand, an optical compensation film was prepared in the same manner, while the amount of each of UV absorbers in the cellulose ester film support prepared in Example 3 was changed as follows and 2 weight parts of 2-hydroxy-4-benzyloxybenzophenone was added: 6 weight parts of Tinuvin 326 (manufactured by Ciba-Geigy Specialty Chemicals Co., Ltd.), 4 weight parts of Tinuvin 109 (manufactured by Ciba-Geigy Specialty Chemicals Co., Ltd.), and 1 weight part of Tinuvin 171 (manufactured by Ciba-Geigy Specialty Chemicals Co., Ltd.). The resultant optical compensation film was adhered to said polarizing plate in the same manner as above.

An optical compensation film was prepared in the same manner, except that 6 weight parts of Tinuvin 326 (manufactured by Ciba-Geigy Specialty Chemicals Co., Ltd.), 4 weight parts of Tinuvin 109 (manufactured by Ciba-Geigy Specialty Chemicals Co., Ltd.), and 1 weight part of Tinuvin 171 (manufactured by Ciba-Geigy Specialty Chemicals Co., Ltd.), which were employed as UV absorbers in the cellulose ester film support in Example 3, were not incorporated. The resultant optical compensation film was adhered onto said polarizing plate in the same manner as above.

A polarizing plate adhered to any of these optical compensation films were subjected to enforced degradation at 40° C. for 500 hours under 70,000 lux in such a manner that the surface of the adhered optical compensation film was irradiated from the normal direction with respect to the film surface, employing a xenon long life weather meter. The polarizing plate adhered to the resultant optical compensation film was disposed so as to result in the same constitution as Example 3. Prior to the degradation test, in all samples, the liquid crystal display was white display and black display.

After said degradation test, no variation of a black-and-white display was observed in the sample which comprised 2-[5-chloro(2H)-benzotriazole-2-yl]-4-methyl-6-(tert-butyl) phenol and 2-[2H-benzotriazole-2-yl]-4,6-di-tert-pentylphenol, as well as in the sample which comprised of 2-hydroxy-4-bvenzyloxybenzophenone. In addition, both samples exhibited the same viewing angle characteristics as Example 3. However, samples, which comprised no UV absorbers in the cellulose ester film support of the optical compensation film, resulted in slight degradation of the black-and-white display through said degradation test, and particularly, the decrease in contrast was notable due to a slight light leak during black display.

By so doing, it was verified that an increase in durability was preferably carried out by incorporating UV absorbers into the cellulose ester film support of the optical compensation film.

Example 7

Polarizing plates were prepared by replacing the polarizing plate protective layer on the liquid crystal cell with each of Optical Compensation Films "D", "K", and "L" in the polarizing plate which was prepared by adhering the polarizer prepared in Example 6 to the polarizing plate protective film. Namely, each of Optical Compensation Films "D", "K", and "L" was immersed into a 2 mole/liter aqueous sodium hydroxide solution at 60° C. for 2 minutes, washed with water, and subsequently dried at 100° C. for 10 minutes. Thereafter, adhesion was carried out employing an acryl based adhesive so that the side comprising the anisotropic layer of the optical compensation film was located on the polarizer side, and the transmitting axis of the polarizer was the same as the maximum refractive index resulting direction of the optical compensation film support, whereby each polarizing plate was prepared.

After peeling the polarizing plate of TFT-TN liquid crystal panel of LA-1529HM, manufactured by NEC, a polarizing plate prepared employing each of said Optical Compensation Films "D", "L", and "M", instead of the above, was installed together with the optical compensation film which coincided with the rubbing direction of the liquid cell. The contrast ratio during white/black display of the liquid crystal display as well as the upper, lower, left, and right viewing angles was evaluated in the same manner as Examples 3 and 6. As a result, the effects of the present invention were confirmed.

Example 8

<Preparation of Cellulose Ester Film Supports 10 through 18>>

Each of Cellulose Ester Film Supports 10 through 13, shown in Table 5, was prepared employing Production Method 3; each of Cellulose Ester Film Supports 14 through 18, shown in Table 5, was prepared employing Production Method 4.

(Production Method 3)

Charged into a tightly sealed vessel were 100 weight parts of each of cellulose resins (detailed hereunder) shown in Table 5, 5 weight parts of ethylphthalyl ethyl glycolate, 3 weight parts of triphenyl phosphate, 290 weight parts of methylene chloride, and 60 weight parts of ethanol, and the resultant mixture was gradually heated while slowly stirred. Then, dissolution was carried out while being heated to 45° C. over 60 minutes. The interior pressure of said vessel was adjusted to 1.2 atmospheric pressures. The resultant dope was filtered employing Azumi Filter Paper No. 244, manufactured by Azumi Roshi Co., Ltd. Afterward, the filtered dope was set aside for 24 hours to allow to dissipate bubbles.

Further, separately, 5 weight parts of said cellulose acetate propionate, 6 weight parts of Tinuvin 326 (manufactured by Ciba Specialty Chemicals Co., Ltd.), 4 weight parts of Tinuvin 109 (manufactured by Ciba Specialty Chemicals Co., Ltd.), 1 part of Tinuvin 171 (manufactured by Ciba Specialty Chemicals Co., Ltd.), 1 part of Aerosil R971V (manufactured by Nippon Aerosil Co., Ltd.) were mixed with 94 weight parts of methylene chloride, and 8 weight parts of ethanol and dissolved while stirring, whereby a UV absorber solution was prepared.

Then, blending was carried out at a ratio of 100 weight parts of said dope to 2 weight parts of said UV absorber solution. After sufficiently mixing the resultant blend employing a static mixer, the resultant dope was at 30° C. cast onto a stainless steel belt from a die. Subsequently, drying was carried out for one minute on said belt of which back surface was subjected to temperature regulation through the contact of 25° C. heated water. Thereafter, chilling was carried out for 15 seconds on said belt of which back surface came into contact with at 15° C. chilled water, and peeling from said belt was then carried out. The residual solvent in a web during peeling was 100 percent by weight.

Subsequently, both edges of the peeled web were clipped employing a simultaneous biaxially stretching tenter, and by simultaneously varying the distance between clips in the width direction as well as in the casting direction (in the length direction), stretching was carried out at 120° C. by a factor of 1.21 in the width direction and by a factor of 1.04 in the casting direction (in the length direction). After stretching, the resultant film was temporarily cooled to 80° C. Afterward, said film was stretched at 130° C. by a factor of 1.01 in the length direction, employing rollers rotated at different circumferential speed. The resultant film was dried at 130° C. for 10 minutes while being roller-conveyed, whereby a 100 μm thick cellulose ester film was obtained. Cellulose ester film. prepared by Production Method 4, was wound on a 200 mm diameter and 1 m wide glass fiber reinforced resin core in the form of a 1,000 m long film roll, utilizing a taper tension method. During said winding, knurling treatment was carried out by forcing into contact with the film edge portion with a 250° C. embossing ring, whereby close contact of said film was minimized.

(Production Method 4)

Charged to a tightly sealed vessel were 100 weight parts of each of cellulose resins (detailed hereunder) shown in Table 5, 5 weight parts of ethylphthalyl ethyl glycolate, 3 weight parts of triphenyl phosphate, 290 weight parts of methylene chloride, and 60 weight parts of ethanol, and the resultant mixture was gradually heated while slowly stirred. Then, dissolution was carried out while being heated to 45° C. over 60 minutes. The interior pressure of said vessel reached 1.2 atmospheres.

The resultant dope was filtered employing Azumi Filter Paper No. 244 manufactured by Azumi Roshi Co., Ltd. Afterward, the filtered dope was set aside for 24 hours to allow bubbles to dissipate. Further, separately, 3 weight parts of said cellulose acetate propionate, 3 weight parts of Tinuvin 326 (manufactured by Ciba Specialty Chemicals Co., Ltd.), 4 weight parts of Tinuvin 109 (manufactured by Ciba Specialty Chemicals Co., Ltd.), 5 parts of Tinuvin 171 (manufactured by Ciba Specialty Chemicals Co., Ltd.), 90 weight parts of methylene chloride, and 10 weight parts of ethanol were mixed and dissolved while stirring, whereby a UV absorber solution was prepared.

Then, blending was carried out at a ratio of 100 weight parts of said dope to 2 weight parts of said UV absorber solution. After sufficiently mixing the resultant blend employing a static mixer, the resultant dope was at 35° C. cast onto a stainless steel belt from the die. Subsequently, drying was carried out for one minute on said belt of which back surface was subjected to temperature regulation through the contact of 35° C. heated water. Thereafter, chilling was carried out for 15 seconds on said belt of which back surface came into contact with at 15° C. chilled water, and peeling from said belt was then carried out. The residual solvent in the web during separation was 70 percent by weight.

Subsequently, both edges of the peeled web were clipped employing a simultaneous biaxially stretching tenter, and by simultaneously varying the distance between clips in the width direction as well as in the casting direction (in the length direction), stretching was carried our at 120° C. by a factor of 1.33 in the width direction and by a factor of 1.00 in the casting direction (in the length direction). After stretching, the resultant film was temporarily cooled to 80° C. Afterward, said film was stretched at 130° C. by a factor of 1.01 in the length direction, employing rollers rotated at different circumferential speed. The resultant film was dried at 130° C. for 10 minutes while being roller-conveyed, whereby an 80 μm thick cellulose ester film was obtained.

Said cellulose ester film was wound on a 200 mm diameter and 1 m wide glass fiber reinforced resin core into the form of a 1,000 m long film roll, utilizing a taper tension method. During said winding, a 10 μm knurling treatment was carried out by forcedly contacting the film edge portion with a 250° C. embossing ring, whereby close contact of said film was minimized.

The cellulose resin, which was employed in each of Production Methods 3 and 4, previously described, is detailed hereunder.

Cellulose Resin 11: cellulose acetate (having a number average molecular weight of 170,000) at a degree of acetyl group substitution of 2.65.

Cellulose Resin 12: cellulose acetate (having a number average molecular weight of 200,000) at a degree of acetyl group substitution of 2.92, and cellulose acetate (having a number average molecular weight of 100,000) at a degree of acetyl group substitution of 2.45, were mixed so that the average degree of acetyl group substitution after mixing resulted in 2.65.

Cellulose Resin 13: cellulose acetate (having a number average molecular weight of 150,000) at a degree of acetyl group substitution of 2.51, and cellulose acetate (having a number average molecular weight of 180,000) at a degree of acetyl group substitution of 2.86, were mixed so that the average degree of acetyl group substitution after mixing resulted in 2.65.

Cellulose Resin 14: cellulose acetate propionate (having a number average molecular weight if 120,000) at a degree of acetyl group substitution of 2.10 and a degree of propionyl substitution of 0.80.

Cellulose Resin 15: cellulose acetate propionate (having a number average molecular weight if 120,000) at a degree of acetyl group substitution of 1.80 and a degree of propionyl substitution of 0.90.

The number average molecular weight of cellulose ester resins according to the present invention was determined in the same manner as described in Example 3.

Further, retardation value $R_o$ (in nm) in the in-plane direction, and retardation value $R_t$ (in nm) in the thickness direction of each of obtained Cellulose Ester Film Supports 10 through 18 was determined at 23° C. and 55 percent relative humidity, employing an automatic birefringence meter KOBRA-21ADH (manufactured by Oji Keisokukiki Co., Ltd.), and an angle characteristic value of said retardation at a wavelength of 590 nm was obtained.

Table 5 shows characteristics of said Cellulose Ester Film Supports 10 through 18.

TABLE 5

| Cellulose Ester Film Support No. | Resin | Production Method | Layer Thickness (in μm) | $R_o$ (in nm) | $R_t$ (in nm) | $R_t/R_o$ |
|---|---|---|---|---|---|---|
| 12 | 11 | Production Method 3 | 100 | 67.3 | 70.8 | 1.05 |
| 13 | 12 | Production Method 3 | 100 | 66.3 | 72.8 | 1.10 |
| 14 | 13 | Production Method 3 | 100 | 71.4 | 64.7 | 0.91 |
| 15 | 14 | Production Method 3 | 100 | 70.4 | 74.2 | 1.05 |
| 16 | 11 | Production Method 4 | 80 | 54.6 | 50.3 | 0.92 |
| 17 | 12 | Production Method 4 | 80 | 54.1 | 58.2 | 1.08 |
| 18 | 13 | Production Method 4 | 80 | 59.5 | 52.0 | 0.87 |
| 19 | 14 | Production Method 4 | 80 | 62.6 | 70.1 | 1.12 |
| 20 | 15 | Production Method 4 | 80 | 64.4 | 71.6 | 1.11 |

The maximum refractive index direction on the plane of these films is almost orthogonal (also referred to as approximately orthogonal) to the casting direction in Production Methods 4 through 6, and all said directions were within +1 degree with respect to the casting direction.

<<Preparation of Optical Compensation Film "AA">>

As shown in Table 6, after applying the plasma treatment, described below, onto Cellulose Ester Film Support 12, Dissolving-out Blocking Layer 2, Orientation Layer 2, and Optically Anisotropic Layer LC-2 described hereunder, were laminated in said order employing long length coating (having a coating length of 200 m and a coating width of 0.97 m), whereby Optical Compensation Film Sample "AA" was prepared. Each process was the same as each process of Example 3. A long length roll was conveyed and was continuously subjected to treatments. Thus, one layer was disposed by winding into a roll. Subsequently, said process was repeated whereby the optical compensating film, constituted as shown in Table 5, was obtained.

<<Preparation of Optical Compensation Film Samples "BB" through "MM">>

As shown in Table 6, each of Optical Compensation Film Samples "BB" through "MM" was prepared in the sane manner as Optical Compensation Film Sample "AA", except that the constitution shown in Table 6 was utilized.

The plasma treatment, the applying of the organic acid containing polymer layer, the preparation of Dissolving-out Blocking Layer 1 or 2, the application of orientation Layer 1 or 2, and the applying of Liquid Crystal Layer 1 or 2, which were employed to prepare the optical compensation film, were carried out in the same manner, and as noted above, the resulting film was stored in the form of a length coating. The coating length of each sample was 200 m and the coated width was 0.97 m with respect to a support width of 1 m, and the processing same as in Example 3 was carried out. On the other hand, the direction of the rubbing treatment onto Orientation Layers 1 and 2 was carried out by the rotation, which matched the casting direction of the support, employing a rubbing roll.

The average tilt angle of the optically anisotropic layer and the tilt angle of the orientation layer side of each of Optical Compensation Films "AA" through "MM", prepared as above, were determined in the same manner as Example 3. Further, each viewing angle was evaluated in the same manner as Example 3. Table 7 shows the results for each sample. However, the results of Optical Compensation Film Sample "MM" were obtained when no optical compensation film was incorporated. Table 7 again shows the obtained results.

TABLE 6

| Optical Compensation Film | | AA | BB | CC | DD | EE | FF | GG | HH | II | JJ | KK | LL | MM |
|---|---|---|---|---|---|---|---|---|---|---|---|---|---|---|
| Optically Anisotropic Layer | Liquid Crystal Layer 2 | Y | — | Y | — | — | — | Y | Y | Y | Y | Y | Y | — |
| | Liquid Crystal Layer 1 | — | Y | — | Y | Y | Y | — | — | — | — | — | — | — |
| Light Orientation | Orientation Layer 2 | Y | — | Y | — | — | — | Y | Y | Y | Y | Y | Y | — |

TABLE 6-continued

| Optical Compensation Film | | AA | BB | CC | DD | EE | FF | GG | HH | II | JJ | KK | LL | MM |
|---|---|---|---|---|---|---|---|---|---|---|---|---|---|---|
| Layer | Orientation Layer 1 | — | Y | — | Y | Y | Y | — | — | — | — | — | — | — |
| Dissolving-out blocking Layer | 2 | Y | — | — | — | — | Y | — | — | — | Y | — | Y | — |
| | 1 | — | — | — | — | Y | — | Y | Y | Y | — | Y | — | — |
| Organic Acid Polymer Layer | | — | Y | Y | Y | — | — | — | — | — | Y | — | — | — |
| Plasma Treatment | | Y | — | — | — | — | Y | — | Y | — | — | — | Y | — |
| Cellulose Ester Film Support No. | | 12 | 13 | 14 | 15 | 12 | 14 | 15 | 17 | 18 | 19 | 20 | 22 | — |

Y: Employed
—: Not employed

TABLE 7

| Optically Anisotropic Material | AA | BB | CC | DD | EE | FF | GG | HH | II | JJ | KK | LL | MM | NN | OO |
|---|---|---|---|---|---|---|---|---|---|---|---|---|---|---|---|
| Average Tilt Angle of Optically Anisotropic Layer (in degrees) | 30 | 27 | 30 | 27 | 30 | 27 | 27 | 30 | 30 | 30 | 30 | 30 | 30 | 30 | — |
| Viewing Angle (upper) (in degrees) | 49 | 52 | 47 | 53 | 31 | 46 | 44 | 54 | 46 | 48 | 47 | 51 | 52 | 39 | 24 |
| Viewing Angle (lower) (in degrees) | 68 | 71 | 66 | 73 | 49 | 64 | 65 | 74 | 68 | 72 | 69 | 72 | 73 | 50 | 47 |
| Viewing Angle (left) (in degrees) | 70 | 72 | 63 | 75 | 50 | 69 | 62 | 76 | 63 | 66 | 62 | 73 | 74 | 42 | 41 |
| Viewing Angle (right) (in degrees) | 70 | 72 | 63 | 75 | 50 | 69 | 62 | 76 | 63 | 66 | 62 | 73 | 74 | 42 | 41 |
| | Inv. | Inv. | Inv. | Inv. | Comp. | Inv. | Inv. | Inv. | Inv. | Inv. | Inv. | Inv. | Inv. | Comp. | Comp. |

Inv.: Present Invention
Comp.: Comparative Example

As can clearly be seen from Table 7, compared to comparative samples, the optical compensation films (optically anisotropic bodies) of the present invention make it possible to markedly improve the viewing angle characteristics of the liquid crystal display.

Example 9

Sample "AA'" was prepared in the same manner as Optical Compensation Film (optically anisotropic body) Sample "AA", described in Example 8, except that the plasma treatment was not carried out. Sample "AA'" exhibited the same optical characteristics.

Sample "JJ'" was prepared in the same manner as Sample "JJ" described in Example 8, except that the organic acid group containing polymer layer was not disposed.

These samples were subjected to the adhesion test described below.

A check pattern test, based on JIS K 5400, was carried out. Specifically, 11 break lines at intervals of 1 mm were made perpendicularly and horizontally on the coated surface, that is, 100 squares having a side length of 1 mm were made. Cellophane tape was adhered onto the prepared check pattern and then quickly peeled off at an angle of 90 degrees. The number of remaining check patterns was represented by "m" and adhesion property was represented by m/100.

A: $0 \leq m < 30$ high adhesion and excellent adhesion property resulted

B: $31 \leq m < 50$ peeling occurred somewhat but adhesion was at a level of no problems of commercial viability C: $51 \leq m < 100$ marked peeling occurred and also problems of commercial viability occurred.

| Sample No. | AA | AA' | JJ | JJ' |
|---|---|---|---|---|
| Adhesion Property | A | B | A | B |

Based on the above results, it was found that by applying the plasma treatment to the cellulose ester film support, or providing the organic acid group containing polymer layer onto the same, the adhesion properties of the optical compensation film (optically anisotropic body) of the present invention were markedly improved.

The effects of the plasma treatment or the presence of the organic acid group containing polymer layer were compared in the same manner while employing other samples of Example 8. As a result, any improvement of the adhesion property was noticed.

Example 10

Support 12' was prepared in the same manner as Support 12, employing Production Method 4, except that neither 5 parts of ethylphthalyl ethyl glycolate nor 3 weight parts of triphenyl phosphate were added. Employing the resultant support, Optical Compensation Film "JJ'" having the same layer configuration as Optical Compensation Film "JJ" shown in Table 5, was prepared. Said Optical Compensation Films "GG" and "JJ'" were cut into 50 cm×1 m strips, and were subjected to a degradation test for 50 hours under an ambience of 80° C. and 90 percent relative humidity.

Before and after said degradation test, the dimensional change in the maximum refractive index resulting direction on the plane of the cellulose ester film of the optical compensation film was compared.

Dimensional change (in percent)=(length after the degradation test/length before the degradation test−1)×100

|  | Optical Compensation Film GG | Optical Compensation Film JJ' |
|---|---|---|
| Dimensional Change | 0.02% | −0.06% |

Based on the above results, it is seen that the addition of plasticizers to the cellulose ester film support can decrease the dimensional change. When the optical compensation film is employed in a liquid crystal display apparatus in which optical characteristics are particularly important, it clear that a minimum change of optical characteristics due to the dimensional change is preferred.

Employing the other samples of Example 8, said samples were prepared in the same manner and evaluated. As a result, it was possible to reduce the dimensional change of all samples.

Example 11

A polarizing plate protective film was prepared in the same manner as Example 8. At that time, the employed protective film was wound in the form of a 1 m wide and 1,000 m long film roll, utilizing a taper tensioning method. The resultant film was designated as a polarizing plate protective film.

<<Preparation of a Polarizing Plate>>

Polyvinyl alcohol was subjected to the same treatment to a thickness of 120 μm, as for Example 6, and an 800 m long polarizing plate film roll was prepared.

Each 80 m long optical compensation film roll prepared in Example 8 was adhered onto the surface of the long polarizing plate roll while being conveyed, employing the same method as Example 6. At that time, the transmission axis of said polarizing plate was orthogonal to the roll conveying direction on the plane of the roll film. Said adhesion was continually carried out, employing long roll films and also an acryl based adhesive, so that the maximum refractive index resulting direction of the cellulose ester film support of the adhered optical compensation film was approximately parallel to the transmission axis of said polarizing plate film, and the optically anisotropic layer was arranged on the side of the polarizing plate protective film.

An optical compensation film was prepared in the same manner, while the amount of each of UV absorbers in the cellulose ester film support prepared in Example 8 was changed as follows and 2 weight parts of 2-hydroxy-4-benzyloxybenzophenone were added: 6 weight parts of Tinuvin 326 (manufactured by Ciba-Geigy Specialty Chemicals Co., Ltd.), 4 weight parts of Tinuvin 109 (manufactured by Ciba-Geigy Specialty Chemicals Co., Ltd.), and 1 weight part of Tinuvin 171 (manufactured by Ciba-Geigy Specialty Chemicals Co., Ltd.). The resultant optical compensation film was adhered to said polarizing plate in the same manner as above.

Further, an optical compensation film was prepared in the same manner, except that 6 weight parts of Tinuvin 326 (manufactured by Ciba-Geigy Specialty Chemicals Co., Ltd.), 4 weight parts of Tinuvin 109 (manufactured by Ciba-Geigy Specialty Chemicals Co., Ltd.), and 1 weight part of Tinuvin 171 (manufactured by Ciba-Geigy Specialty Chemicals Co., Ltd.), which were employed as UV absorbers in the cellulose ester film support in Example 8, were not incorporated. The resultant optical compensation film was adhered to said polarizing plate in the same manner.

Polarizing plates adhered to any of these optical compensation films were cut into sheets and each sheet was subjected to enforced degradation at 40° C. for 500 hours under 70,000 lux in such a manner that the surface of the adhered optical compensation film was irradiated from the normal direction with respect to the film surface, employing a xenon long-life weather meter. The polarizing plate adhered to the resultant optical compensation film was installed so as to result in the same constitution as Example 8. Prior to the degradation test, in all samples, the liquid crystal display was a white display and a black display.

After said degradation test, no variation of black-and-white display was observed in the sample which comprised 2-[5-chloro(2H)-benzotriazole-2-yl]-4-methyl-6-(tert-butyl) phenol and 2-[2H-benzotriazole-2-yl]-4,6-di-tert-pentylphenol, as well as in the sample which comprised of 2-hydroxy-4-bvenzyloxybenzophenone. In addition, both samples exhibited the same viewing angle characteristics as Example 8. However, samples, which comprised no UV absorbers in the cellulose ester film support of the optical compensation film, resulted in slight degradation of the black-and-white display through said degradation test, and particularly, the decrease in contrast was noticed due to the slight light leak during black display.

By such action, it was verified that a preferable increase in durability was carried out by incorporating UV absorbers into the cellulose ester film support of the optical compensation film.

Example 12

Polarizing plates were prepared in the same manner as Example 11, by replacing the polarizing plate protective film, which was positioned on the liquid crystal cell, with each of Optical Compensation Films "DD", "KK", and "LL" which was prepared in Example 8. Namely, each of Optical Compensation Films "DD", "KK", and "LL" was immersed into a 2 mole/liter aqueous sodium hydroxide solution at 60° C. for 2 minutes, washed with water, and subsequently dried at 100° C. for 10 minutes. Thereafter, adhesion was carried out employing an acrylic based adhesive so that the side comprising the anisotropic layer of the optical compensation film was located on the polarizer side, and the transmitting axis of the polarizer was the same as the maximum refractive index resulting direction of the optical compensation film support, whereby each polarizing plate was prepared.

In the same manner as Example 8, after peeling the polarizing plate of TFT-TN liquid crystal panel of LA-1529HM, manufactured by NEC, a polarizing plate, prepared employing each of said Optical Compensation Films "DD", "KK", and "LL" instead of the above, was installed together with the optical compensation film which matched the rubbing direction of the liquid cell. The contrast ratio during white/black display of the liquid crystal display as well as the upper, lower, left, and right viewing angles was evaluated in the same manner as Examples 3 and 6. As a result, the effects of the present invention were confirmed.

Example 13

Sunever 5291 (manufactured by Nissan Kagaku Co.) was applied onto a heat resistant polyimide film so as to obtain a dried layer thickness of 0.1 μm. After drying the resultant coating at 110° C. for 3 hours, a rubbing treatment was carried out, whereby an orientation layer was obtained. Subsequently, Orientation Layer 1 and Liquid Crystal Layer 1 in Example 3 were disposed employing the same treatment.

Subsequently, after applying an ultraviolet hardening type adhesive onto said liquid crystal layer, lamination was carried out in such a manner that the direction obtained by projecting the maximum refractive index direction of said Liquid Crystal Layer 1 onto said polyimide film surface was orthogonal to the x direction of Support 1 of the present invention. After hardening said adhesive upon light irradiation of a high pressure mercury lamp, said polyimide film was peeled and removed, whereby Optical Compensation Film P was prepared. At that time, the liquid crystal layer was formed on the support of the present invention via the adhesive. Said adhesive was optically isotropic.

Optical Compensation Film "P" of the present invention was provided in the same manner as Example 3, under the constitution of FIG. 6. The average inclination of the optically anisotropic layer was determined employing the same method as Example 3. It was found that the resultant inclination was the same as Optical Compensation Film "A". However, the inclination of the liquid crystalline compound in the optically anisotropic layer was constituted opposite of the optically anisotropic layer of FIG. 6. This was due to the lamination employing said method. Accordingly, FIG. 24a shows a constitution in which the inclination is high on the orientation layer side in the optically anisotropic layer, while the inclination decreases with respect to the thickness direction. By contrast, however, Optical Compensation Film results in low inclination on the orientation layer side and results in an increase in the thickness direction.

Optical Compensation Film "P" was evaluated in the same manner as Example 3. As a result, the same effects as Optical Compensation Film "A" was noted.

As noted above, the present invention shows that by changing orientation layer materials as well as liquid crystal materials, it is possible to constitute Optical Compensation Film "P" through direct coating onto the support of the present invention. Thus, coating methods are not limited to examples of the present invention.

Example 14

(Production Method 5)

Charged into a tightly sealed vessel were 100 weight parts of said cellulose resin, 5 weight parts of ethylphthalyl ethyl glycolate, 3 weight parts of triphenyl phosphate, 290 weight parts of methylene chloride, and 60 weight parts of ethanol, and the resultant mixture was gradually heated while slowly stirred. Then, dissolution was carried out while being heated to 45° C. over 60 minutes. Interior pressure of said vessel was adjusted to 1.2 atmospheres. The resultant dope was filtered employing Azumi Filter Paper No. 244, manufactured by Azumi Roshi Co., Ltd. Afterward, the filtered dope was left untouched for 24 hours to allow bubbles to dissipate.

Further, separately, 11 weight parts of said cellulose resin, 6 weight parts of Tinuvin 326 (manufactured by Ciba Specialty Chemicals Co., Ltd.), 4 weight parts of Tinuvin 109 (manufactured by Ciba Specialty Chemicals Co., Ltd.), 1 weight part of Tinuvin 171 (manufactured by Ciba Specialty Chemicals Co., Ltd.), and 1 weight part of Aerosil R972V (manufactured by Nippon Aerosil Co., Ltd.) were mixed with 94 weight parts of methylene chloride, and 8 weight parts of ethanol and dissolved while stirring, whereby a UV absorber solution was prepared. Then, blending was carried out at a ratio of 100 weight parts of said dope to 2 weight parts of said UV absorber solution. After sufficiently mixing the resultant blend employing a static mixer, the resultant dope was cast at 30° C. onto a stainless steel belt from the die. Subsequently, drying was carried out for one minute on said belt of which back surface was subjected to temperature regulation through the contact of 25° C. heated water. Thereafter, chilling was carried out for 15 seconds on said belt of which back surface came into contact with 15° C. chilled water, and peeling from said belt was then carried out. The residual solvent in a web during peeling was 100 percent by weight.

Subsequently, both edges of the peeled web were clipped employing a simultaneously biaxially stretching tenter, and by simultaneously varying the distance between clips in the width direction as well as in the casting direction (in the length direction), stretching was carried our at 120° C. by a factor of 1.1 in the width direction and by a factor of 1.1 in the casting direction (in the length direction). Further, drying was carried out at 130° C. for 10 minutes under conveyance utilizing rollers, whereby a cellulose ester film was obtained. The resultant cellulose ester film was wound on a 200 mm diameter and 1 m wide glass fiber reinforced resin core in the form of 1,000 m long film roll, utilizing a taper tension method. During said winding, a knurling treatment was carried out by forcedly contacting the film edge portion with a 250° C. embossing ring, whereby the close contact of said film was minimized. Thus Support 23 was prepared. At that tome, optical characteristics, $R_o$ and $R_t$ were 4 nm and 95 nm, respectively.

Said Support 12 roll film was stretched by a factor of 1.2 in the width direction and by a factor of 1.02 in the conveying direction, employing a tenter stretching method, in a 15 m long and 140° C. heating zone. During stretching, the conveying rate was set at 1 m/second. After treating said film conveyed from said heating zone at 80° C. for 5 minutes, said film was wound, while chilling it at room temperature, whereby Support 12' was predated.

At that time, optical characteristics were such that Ro was 65 nm, $R_t$ was 70.1 nm, and the layer thickness was 95 nm. Further, the x direction was the same as said stretched width direction.

Employing said Support 12', Optical Compensation Film "Q" was prepared in the same manner as Optical Compensation Film "A" of Example 3. As a result, effects of the present invention were more noticeable compared to Example 3.

Example 15

(Production Method 6)

Support 24 was prepared in the same manner as Support 23 prepared by employing Production Method 5.

Said Support 24 roll film was processed as described below. A methylene chloride bath (1.5 m×0.5 m×1.5 m) was installed. Support 24 was wound onto a stainless steel roll (having a diameter of 100 mm and a length of 1.3 m) and said stainless steel roll was moved so that dip coating was carried out. The dip coated roll film was conveyed into a heat processing zone in the same manner as Example 12, while being dried. The amount of methylene chloride, as the solvent at the inlet of the heat processing zone, was 70 percent by weight with respect to the weight of the dried roll film. In a 50° C. heat processing zone, stretching was carried out by a factor of 1.35 in the width direction and by a factor or 1.02 in the conveying direction, employing a tenter stretching method. After processing the film conveyed outside of the heat processing zone at 80° C. for 5 minutes, the resultant film was wound while being cooled at room temperature, whereby Support 24' was prepared.

At that time, optical characteristics were such that $R_o$ was 61 nm, $R_t$ was 68.5 nm, and the layer thickness was 98 nm. Further, the x direction was the same as said stretched width direction.

Employing said Support 24', Optical Compensation Film "R" was prepared in the same manner as Optical Compensation Film "A" of Example 3. As a result, effects of the present invention were more noticeable compared to Example 3.

According to the present invention, it is possible to provide an optical compensation film which readily improves viewing angle properties of TN type LCD such as TN-TFT, and the like, that is, image area contrast, coloring, and reversal phenomena of light-and-shadow, which are obliquely viewed, and further, to provide a polarized plate and a liquid crystal display apparatus with marked improvement of the viewing angle under a simplified constitution, while employing said optical compensation film.

Disclosed embodiment can be varied by a skilled person without departing from the spirit and scope of the invention.

The invention claimed is:

1. An optical compensation film comprising a support and an optically anisotropic layer,
   wherein the optically anisotropic layer is a layer on which orientation of a liquid crystalline compound is fixed and the support is an optically biaxial cellulose ester film,
   wherein the liquid crystalline compound of the optical anisotropic layer is rod-shaped, and an average angle between the direction resulting in the maximum refractive index of said rod-shaped liquid crystalline compound and the surface of said cellulose ester film exceeds 0 degree but is less than 80 degrees, and
   wherein an angle between direction resulting in maximum refractive index of the rod-shaped liquid crystalline compound and the surface of the support varies from 0 to 90 degrees continuously or stepwise in a direction of thickness of the support.

2. The optical compensation film of claim 1, wherein retardation value $R_o$ in the plane direction of the support is from 25 to 95 nm, radiation ratio $R_t/R_o$ of the retardation value $R_t$ in the thickness direction to the retardation value $R_o$ is from 0.8 to 4.0, and nx>ny>nz is held, $$R_o = (nx - ny) \times d$$

$$R_t = [(nx + ny)/2 - nz] \times d$$

wherein nx represents a refractive index of the support in x direction which gives maximum refractive index in a plane of the support and ny represents a refractive index of the support in the y direction perpendicular to x in the plane of the support, nz represents a refractive index of the support in the z direction perpendicular to the plane of the support, and d represents the thickness (in nm) of the support.

3. The optical compensation film of claim 2, wherein radiation ratio $R_t/R_o$ is from 1.4 to 4.0.

4. The optical compensation film of claim 3, wherein radiation ratio $R_t/R_o$ is from 2.0 to 3.5.

5. The optical compensation film of claim 4, wherein the refractive index of the support in a direction perpendicular to a direction of film conveyance is maximum in the plane of the support.

6. The optical compensation film of claim 2, wherein radiation ratio $R_t/R_o$ is from 0.8 to 1.4.

7. The optical compensation film of claim 6, wherein refractive index of the support in a direction of film conveyance is maximum in the plane of the support.

8. The optical compensation film of claim 1, which comprises an alignment layer on which the liquid crystalline compound of the optically anisotropic layer is oriented.

9. The optical compensation film of claim 8, wherein the alignment layer is prepared by rubbing the surface of the support.

10. The optical compensation film of claim 8, wherein the alignment layer is a layer oriented by light.

11. The optical compensation film of claim 1, wherein the optical anisotropic layer consists of a single layer.

12. The optical compensation film of claim 1, wherein an angle between direction resulting in maximum refractive index of the rod-shaped liquid crystalline compound located farthest to the support and the surface of the support is larger than an angle between direction resulting in maximum refractive index of the rod-shaped liquid crystalline compound located closest to the support and the surface of the support.

13. The optical compensation film of claim 1, wherein the liquid crystalline compound of the optical anisotropic layer is rod-shaped, a projection direction within the surface of a cellulose ester film in the direction resulting in the maximum refractive index of the rod-shaped liquid crystalline compound on a surface of the support is perpendicular to the direction resulting in the maximum refractive index of the support.

14. The optical compensation film of claim 1, wherein the rod-shaped liquid crystalline compound in the optical anisotropic layer is exhibits optically positive uniaxial properties.

15. The optical compensation film of claim 14, wherein plane retardation value of the optically anisotropic layer is from 10 to 300 nm and retardation value of the optically anisotropic layer in the thickness direction is from 15 to 300 nm.

16. The optical compensation film of claim 1, which comprises a dissolving-out blocking layer between the support and the optically anisotropic layer.

17. The optical compensation film of claim 1, wherein the optically biaxial cellulose ester film comprises cellulose ester resin having degree of acetyl group substitution of from 2.50 to 2.86.

18. The optical compensation film of claim 1, wherein the optically biaxial cellulose ester film comprises cellulose ester resin satisfying $$2.0 \leq (A+B) \leq 3.0, \text{ and}$$

$$A < 2.4$$

wherein "A" is a degree of acetyl group substitution of the cellulose ester resin, and "B" is a degree of propionyl group substitution of the cellulose ester resin.

19. A polarizing plate comprising a polarizing element and the optical compensation film of claim 1.

20. A liquid crystal display comprising a first polarizing plate, a liquid crystal cell and a second polarizing plate provided at a side closer to viewer side than the side of the first polarizer and the liquid crystal cell,
   wherein the optical compensation film of claim 1 is provided between the first polarizing plate and the liquid crystal cell or between the second polarizing plate and the liquid crystal cell, and
   wherein only one optical compensation film is provided between the first polarizing plate and the liquid crystal cell or between the second polarizing plate and the liquid crystal cell.

21. A liquid crystal display comprising a first polarizing plate, a liquid crystal cell and a second polarizing plate provided at a side closer to viewer side than the side of the first polarizer and the liquid crystal cell,
   wherein the optical compensation film of claim 1 is provided between the first polarizing plate and the liquid crystal cell or between the second polarizing plate and the liquid crystal cell, and
   wherein the optical compensation film is placed so that the support of the optical compensation film is faced to the liquid crystal cell.

22. A liquid crystal display comprising a first polarizing plate, a liquid crystal cell and a second polarizing plate provided at a side closer to viewer side than the side of the first polarizer and the liquid crystal cell, wherein the optical compensation film of claim 1 is provided between the first polarizing plate and the liquid crystal cell or between the second polarizing plate and the liquid crystal cell, and
   wherein the optical anisotropic layer of the optical compensating film is composed of a single layer.

23. A liquid crystal display comprising a first polarizing plate, a liquid crystal cell, a second polarizing plate provided at a side closer to viewer side than the side of the first polarizer and the liquid crystal cell, and an optical compensation film provided between the first polarizing plate and the liquid crystal cell or between the second polarizing plate and the liquid crystal cell,
   wherein the optical compensation film is an optical compensation film of claim 1, in which rubbing direction of the liquid crystal cell closer to the optical compensation film is crossing orthogonally or almost orthogonally to direction giving maximum refractive index of the support.

24. A liquid crystal display comprising a first polarizing plate, a liquid crystal cell, a second polarizing plate provided at a side closer to viewer side than the side of the first polarizer and the liquid crystal cell, and an optical compensation film provided between the first polarizing plate and the liquid crystal cell or between the second polarizing plate and the liquid crystal cell,
   wherein the optical compensation film is an optical compensation film of claim 1, in which rubbing direction of the liquid crystal cell closer to the optical compensation film is crossing parallel or almost parallel as the rubbing direction of the optical compensation film.

25. A liquid crystal display comprising a first polarizing plate, a liquid crystal cell, a second polarizing plate provided at a side closer to viewer side than the side of the first polarizer and the liquid crystal cell, and an optical compensation film provided between the first polarizing plate and the liquid crystal cell or between the second polarizing plate and the liquid crystal cell,
   wherein the optical compensation film comprises a support and an optically anisotropic layer, in which the optically anisotropic layer is a layer on which orientation of a rod-shaped liquid crystalline compound is fixed and the support is an optically biaxial cellulose ester film, an average angle between the direction resulting in the maximum refractive index of said rod-shaped liquid crystalline compound and the surface of said cellulose ester film exceeds 0 degree but is less than 80 degrees, and rubbing direction of the liquid crystal cell closer to the optical compensation film is crossing orthogonally or almost orthogonally to direction giving maximum index of the refraction of the support.

26. A liquid crystal display comprising a first polarizing plate, a liquid crystal cell, a second polarizing plate provided at a side closer to viewer side than the side of the first polarizer and the liquid crystal cell, and an optical compensation film provided between the first polarizing plate and the liquid crystal cell or between the second polarizing plate and the liquid crystal cell,
   wherein the optical compensation film comprises a support and an optically anisotropic layer, in which the optically anisotropic layer is a layer on which orientation of a rod-shaped liquid crystalline compound is fixed and the support is an optically biaxial cellulose ester film, an average angle between the direction resulting in the maximum refractive index of said rod-shaped liquid crystalline compound and the surface of said cellulose ester film exceeds 0 degree but is less than 80 degrees, and rubbing direction of the liquid crystal cell closer to the optical compensation film is parallel or almost parallel as the rubbing direction of the optical compensation film.

27. A liquid crystal display comprising a first polarizing plate, a liquid crystal cell, a second polarizing plate provided at a side closer to viewer side than the side of the first polarizer and the liquid crystal cell, and an optical compensation film provided between the first polarizing plate and the liquid crystal cell or between the second polarizing plate and the liquid crystal cell,
   wherein the optical compensation film comprises a support and an optically anisotropic layer, in which the optically anisotropic layer is a layer on which orientation of a liquid crystalline compound is fixed and the support is an optically biaxial cellulose ester film, and an angle between direction resulting in maximum refractive index of the liquid crystalline compound and the surface of the support varies from 0 to 90 degrees continuously or stepwise in a direction of thickness of the support, and an angle between direction resulting in maximum refractive index of the rod-shaped liquid crystalline compound located farthest to the support and the surface of the support is larger than an angle between direction resulting in maximum refractive index of the rod-shaped liquid crystalline compound located closest to the support and the surface of the support.

28. A liquid crystal display comprising a first polarizing plate, a liquid crystal cell, a second polarizing plate provided at a side closer to viewer side than the side of the first polarizer and the liquid crystal cell, and an optical compensation film provided between the first polarizing plate and the liquid crystal cell or between the second polarizing plate and the liquid crystal cell, wherein the optical compensation film comprises a support and an optically anisotropic layer, wherein the optically anisotropic layer is a layer on which orientation of a liquid crystalline compound is fixed and the support is an optically biaxial cellulose ester film, and a projection direction within the surface of the support in direction resulting in maximum refractive index of a liquid crystalline compound is orthogonal or almost orthogonal to the direction resulting in the maximum refractive index of the support, wherein retardation value $R_o$ in the plane direction of the support is from 25 to 95 nm, radiation ratio $R_t/R_o$ of the retardation value $R_t$ in the thickness direction to the retardation value $R_o$ is from 0.8 to 4.0, and nx>ny>nz is held, $$R_o=(nx-ny)\times d$$

$$R_t=[(nx+ny)/2-nz]\times d$$

wherein nx represents a refractive index of the support in x direction which gives maximum refractive index in a plane of the support and ny represents a refractive index of the support in the y direction perpendicular to x in the plane of the support, nz represents a refractive index of the support in the z direction perpendicular to the plane of the support, and d represents the thickness (in nm) of the support.

* * * * *